(12) United States Patent
Burgess et al.

(10) Patent No.: US 8,011,333 B2
(45) Date of Patent: Sep. 6, 2011

(54) VEHICLE AND PROPULSION SYSTEM INCLUDING AN INTERNAL COMBUSTION ENGINE

(75) Inventors: Geoffrey W. Burgess, Gastonia, NC (US); Roy Meyer, Richland Center, WI (US); Bill Swiggum, Viroqua, WI (US); Dan Kinsey, LaFarge, WI (US); Scott Sjovall, Westby, WI (US); Joseph A. Gudgeon, LaFarge, WI (US); Jeffrey Bailey, Westby, WI (US); Kyle Ridlon, Hartford, WI (US); Michael J. Scaletta, Lacrosse, WI (US); Nathan L. Oium, LaFarge, WI (US)

(73) Assignee: S & S Cycle, Inc., Viola, WI (US)

( * ) Notice: Subject to any disclaimer, the term of this patent is extended or adjusted under 35 U.S.C. 154(b) by 150 days.

(21) Appl. No.: 12/481,195

(22) Filed: Jun. 9, 2009

(65) Prior Publication Data

US 2009/0241869 A1    Oct. 1, 2009

Related U.S. Application Data

(63) Continuation of application No. 11/667,999, filed as application No. PCT/US2005/041876 on Nov. 18, 2005, now Pat. No. 7,703,423.

(60) Provisional application No. 60/628,541, filed on Nov. 18, 2004.

(51) Int. Cl.
*F02B 75/22* (2006.01)
*F01L 1/04* (2006.01)

(52) U.S. Cl. ........... 123/54.4; 123/90.6; 123/195 R

(58) Field of Classification Search ........... 123/54.4, 123/90.39, 90.4, 90.6–90.63, 195 R
See application file for complete search history.

(56) References Cited

U.S. PATENT DOCUMENTS

| 1,060,101 | A | 4/1913 | Kitlitschko |
|---|---|---|---|
| 1,711,882 | A | 5/1929 | Fomaca |
| 1,787,717 | A | 1/1931 | Boulet |
| 1,812,262 | A | 6/1931 | Gardner et al. |
| 1,830,046 | A | 11/1931 | White |
| 1,885,576 | A | 11/1932 | Barkeij |
| 2,047,419 | A | 7/1936 | Lee |
| 2,062,583 | A | 12/1936 | Kruczek |
| 2,407,102 | A | 9/1946 | Ryder |

(Continued)

FOREIGN PATENT DOCUMENTS

DE    3933943    5/1990

(Continued)

OTHER PUBLICATIONS

PCT Search Report.

(Continued)

*Primary Examiner* — Noah Kamen
(74) *Attorney, Agent, or Firm* — Price Heneveld LLP

(57) ABSTRACT

An internal combustion engine for a vehicle, such as a motorcycle, includes a crankcase, two banks of cylinders projecting from the crankcase in a 56-57 degree V-configuration, a plurality of pushrods, and a plurality of camshafts supported by the crankcase. The two banks of cylinders include a first cylinder bank that projects from the crankcase to a first cylinder head, and a second cylinder bank that projects from the crankcase to a second cylinder head. The plurality of intake and exhaust valve pushrods extend between the crankcase and the first and second cylinder heads, driven by one intake camshaft and two exhaust camshafts.

30 Claims, 40 Drawing Sheets

U.S. PATENT DOCUMENTS

| | | |
|---|---|---|
| 2,593,769 A | 4/1952 | Kollsman |
| 3,927,655 A | 12/1975 | Goto et al. |
| 4,320,671 A | 3/1982 | Curasi |
| 4,370,953 A | 2/1983 | Van de Walker |
| 4,480,600 A | 11/1984 | Gill |
| 4,496,020 A | 1/1985 | Mitsuishi |
| 4,519,344 A | 5/1985 | Ohyama et al. |
| 4,520,688 A | 6/1985 | Ban |
| 4,546,746 A | 10/1985 | Sato et al. |
| 4,558,676 A | 12/1985 | Seidl |
| 4,607,601 A | 8/1986 | Kohler |
| 4,615,308 A | 10/1986 | Asanomi et al. |
| 4,643,142 A | 2/1987 | Klomp |
| 4,671,216 A | 6/1987 | Itoh |
| 4,726,331 A | 2/1988 | Oyaizu |
| 4,794,887 A | 1/1989 | Valentine |
| 4,858,567 A | 8/1989 | Knapp |
| 4,869,332 A | 9/1989 | Fujita et al. |
| 4,889,011 A | 12/1989 | Steahly |
| 4,960,081 A | 10/1990 | Atsuumi |
| 4,964,384 A | 10/1990 | Getz |
| 5,016,592 A | 5/1991 | Onodera |
| 5,020,486 A | 6/1991 | Unger |
| 5,020,973 A | 6/1991 | Lammers |
| 5,052,350 A | 10/1991 | King |
| 5,111,791 A | 5/1992 | Onodera |
| 5,174,263 A | 12/1992 | Meaney |
| 5,174,602 A | 12/1992 | Nakayama et al. |
| 5,215,504 A | 6/1993 | Wong et al. |
| 5,259,269 A | 11/1993 | Swenson |
| 5,485,815 A | 1/1996 | Shida |
| 5,560,329 A | 10/1996 | Hayman |
| 5,586,527 A | 12/1996 | Kreuter |
| 5,588,405 A | 12/1996 | Sawa et al. |
| 5,605,123 A | 2/1997 | Ohmura et al. |
| 5,615,642 A | 4/1997 | Coughlin |
| 5,636,263 A | 6/1997 | Thomson |
| 5,636,602 A | 6/1997 | Meister |
| 5,765,451 A | 6/1998 | Carone |
| 5,823,156 A | 10/1998 | Thiel et al. |
| 5,878,703 A | 3/1999 | Sweeney |
| 5,894,763 A | 4/1999 | Peters |
| 5,924,398 A | 7/1999 | Choi |
| 5,934,235 A | 8/1999 | Astner et al. |
| 5,943,997 A | 8/1999 | Kinsey et al. |
| 5,983,849 A * | 11/1999 | Wangen et al. ............ 123/90.61 |
| 6,047,667 A | 4/2000 | Leppanen et al. |
| 6,065,459 A | 5/2000 | Stevens |
| 6,095,105 A | 8/2000 | Lohr et al. |
| 6,112,712 A | 9/2000 | Safarik et al. |
| 6,155,125 A | 12/2000 | Negherbon et al. |
| 6,164,159 A | 12/2000 | Saker |
| 6,189,496 B1 | 2/2001 | Heffner et al. |
| 6,240,892 B1 | 6/2001 | Sweeney |
| 6,318,321 B1 | 11/2001 | Kensok et al. |
| 6,321,698 B1 | 11/2001 | Rau et al. |
| 6,357,401 B1 | 3/2002 | Moriyama et al. |
| 6,467,562 B2 | 10/2002 | Laimbock |
| D466,133 S | 11/2002 | Kinsey et al. |
| 6,508,223 B2 | 1/2003 | Laimbock et al. |
| D475,720 S | 6/2003 | Lundgreen et al. |
| 6,584,946 B2 | 7/2003 | Cardn et al. |
| 6,691,661 B2 | 2/2004 | Lundgreen et al. |
| 6,705,268 B2 | 3/2004 | Homsi et al. |
| 6,736,238 B2 | 5/2004 | Kerr |
| 6,863,049 B1 | 3/2005 | Hausknecht |
| 6,868,823 B2 | 3/2005 | Sakai et al. |
| 6,899,066 B2 | 5/2005 | Toller et al. |
| 6,910,546 B2 | 6/2005 | Tsutsumi et al. |
| 7,204,219 B2 | 4/2007 | Sakurai |
| 7,228,833 B2 | 6/2007 | Klotz |
| 2002/0107099 A1 | 8/2002 | Ikusue et al. |
| 2003/0079702 A1 | 5/2003 | Philips |
| 2004/0040527 A1 | 3/2004 | Murphy |
| 2004/0201181 A1 | 10/2004 | Williamson et al. |

FOREIGN PATENT DOCUMENTS

| | | |
|---|---|---|
| JP | 56-118522 | 9/1981 |
| JP | 63-235606 | 9/1988 |
| JP | 01-148680 | 6/1989 |
| JP | 02-123204 | 5/1990 |
| JP | 02-176107 | 7/1990 |
| JP | 03-182634 | 8/1991 |
| JP | 03-185216 | 8/1991 |
| JP | 04-136471 | 5/1992 |
| JP | 06-191458 | 7/1994 |
| JP | 09-189259 | 7/1997 |
| JP | 09-263287 | 10/1997 |
| JP | 2000-318669 | 11/2000 |
| JP | 2000-329002 | 11/2000 |
| JP | 2000-355292 | 12/2000 |
| JP | 2001-234824 | 8/2001 |
| JP | 2001-322584 | 11/2001 |
| JP | 2002-002573 | 1/2002 |
| JP | 2002-021661 | 1/2002 |
| JP | 2002-037165 | 2/2002 |
| JP | 2002-046682 | 2/2002 |
| JP | 2002-284074 | 10/2002 |
| JP | 2002-309933 | 10/2002 |
| JP | 2003-072644 | 3/2003 |
| JP | 2004-285869 | 10/2004 |
| JP | 2004-314679 | 11/2004 |
| WO | WO 99/66229 | 12/1999 |

OTHER PUBLICATIONS

Brochure entitled, "Tri-Cam Engines," published by Global American Motors Corp., 4 pp.

"Indian Powerplus Motor" specification, 2 pp.

Perspective view and photographs of a BSA B44 engine, by Sullivan circa. 1968, 6 pp.

Excerpt from Parts Manual 1968 to 1970 for BSA Spares Model B44 Victor Special, Catalogue No. 00-5132 (1967), 7 pp.

Excerpt from Parts Manual 1968 to 1970 for BSA Spares Model B44 Shooting Star, Catalogue No. 00-5139 (1968), 8 pp.

Excerpt from BSA Workshop Man. for Models B44 Victor . . . B25 Starfire, publ. by the Service Dept. of BSA Motorcycles Ltd., Publ. Ref. No. 00-4136 8 67 Workshop Man., 7 pp.

Excerpt from "Ariel The Modern Motor Cycle Parts Manual/Ariel 1948-49 Twins Parts Manual," pp. 1 and 5.

Excerpt from "Ariel Owner's Guide," exerpt, published by Ariel Motors Ltd., 1952-1953, Third Edition, 3 Birmingham 29 pp.

Photograph of 1912 Harley-Davidson Motor.

Exerpt from "Harley-Davidson INc. 1993 and 1994 Dynaglide Model Official Factory Guide," pp. 4-5.

Photograph of 1911 Harley-Davidson Single Cylinder Motor.

Harley-Davidson Service Manual for Harley-Davidson Motorcycles—1940 to 1947 Inclusive, pp. 1-165.

* cited by examiner

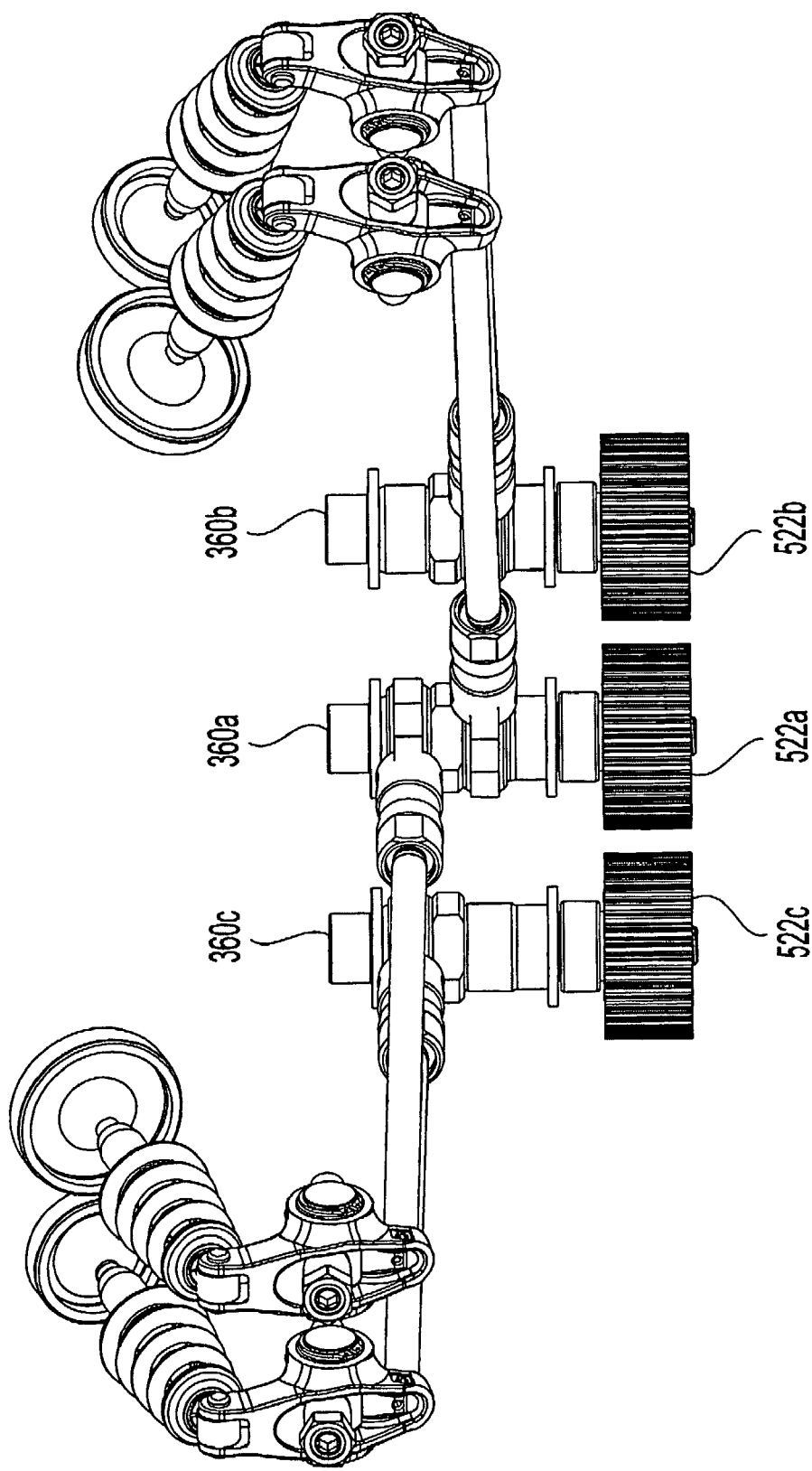

VEHICLE AND PROPULSION SYSTEM INCLUDING AN INTERNAL COMBUSTION ENGINE

CROSS REFERENCE TO RELATED APPLICATIONS

This application is a continuing application of Ser. No. 11/667,999, filed Oct. 5, 2007 now U.S. Pat. No. 7,703,423, entitled "VEHICLE AND PROPULSION SYSTEM INCLUDING AN INTERNAL COMBUSTION ENGINE," which claims benefit of and priority to International application PCT/US2005/041876 (published as WO2006/083350, filed Nov. 18, 2005) entitled "VEHICLE AND PROPULSION SYSTEM INCLUDING AN INTERNAL COMBUSTION ENGINE," and provisional application Ser. No. 60/628,514 (filed Nov. 18, 2004) entitled "MOTORCYCLE ENGINE," the entire contents of all of which are incorporated herein by reference in their entirety.

BACKGROUND

The present invention relates generally to vehicles having internal combustion engines, and more specifically, to an internal combustion engine propelled motorcycle.

A motorcycle is a two-wheeled vehicle powered by an engine. The wheels are in-line, and at higher speed the motorcycle remains upright and stable by virtue of gyroscopic forces; at lower speeds readjustment of the steering by the rider gives stability. The rider sits astride the vehicle on a seat, with hands on a set of handlebars which are used to steer the motorcycle, in conjunction with the rider shifting his weight through his feet, which are supported on a set of "footpegs" or "pegs" which stick out from the frame. The chassis or frame of a motorcycle is typically made from welded struts, with the rear suspension often being an integral component in the design.

The engine of the motorcycle typically sits under a fuel tank, between the rider's legs. Typically, motorcycle engines displace between about three cubic inches (approximately 50 cubic centimeters) and 140 cubic inches (approximately 2300 cubic centimeters) and have one to four cylinders arranged in a "V" configuration, an in-line configuration or a boxer configuration. In most one-cylinder motorcycle engines, the cylinder points up and slightly forward with a spark plug on top. The most common configuration for two-cylinder motorcycle engines is a "V-twin" where the cylinders form a "V" around the crankshaft, which is oriented transversely i.e., perpendicular to the direction of travel). Typically, the angle of the "V" is 90 degrees. Other known configurations for two-cylinder motorcycle engines include a "parallel twin" (i.e., in-line configuration) where the cylinders are parallel, and a "boxer twin" (also called a "flat-twin") where the cylinders are horizontally opposed, and protrude from either side of the frame. Four-cylinder engines are most commonly configured in-line, although "V" and square configurations are also known. Although less common, motorcycle engines having three, six, eight and ten cylinders are known.

Motorcycle engines are typically cooled either with air or water. Air-cooled motorcycle engines rely on ambient air flowing over the engine to disperse heat. The cylinders on air-cooled motorcycle engines are designed with fins to aid in this process. It is believed that air-cooled motorcycle engines are cheaper, simpler and lighter than water-cooled motorcycle engines, which circulate water between a water jacket surrounding the combustion chamber(s) and a radiator that disperses heat transferred from the engine via the circulating water. The operation of motorcycle engines may either be two-stroke or four-stroke. It is believed that two-stroke engines are mechanically simpler and may be lighter than equivalent four-stroke engines. But four-stroke engines are believed to operate more cleanly, be more reliable, and deliver power over a much broader range of engine speeds. Rotation of the engine crankshaft is transferred to a transmission, via a clutch and a primary drive. Most motorcycle transmissions have five or six forward gears; only a few motorcycle transmissions are fitted with a reverse gear. The clutch is typically an arrangement of plates stacked in alternating fashion, one geared on the inside to the engine, and the next geared on the outside to the engine output shaft. Whether wet (rotating in engine oil) or dry, the plates are squeezed together by a spring, causing friction buildup between the plates until they rotate as a single unit, thereby driving the transmission via the primary drive. Releasing the clutch spring allows the engine to freewheel with respect to the engine output shaft. The primary drive couples the engine output shaft to an input shaft of the transmission and typically includes either a toothed belt or a chain. A secondary or final drive from the transmission to the rear wheel of a motorcycle typically includes a chain, although final drives may alternatively include a toothed belt or an enclosed torque shaft in combination with right-angle drive gearing.

Motorcycle manufacturers often also produce all-terrain vehicles or ATVs. These have two or more back wheels, usually two front wheels, an open driver's seat and a motorcycle-type handlebar. The 4-wheeled versions are also called "quads," "four-wheelers," "quad bikes" or "quad cycles." ATVs are often used off-road for recreation and utility. Recreational ATVs are generally small, light, two-wheel-drive vehicles, whereas utility ATVs are generally bigger four-wheel-drive vehicles with the ability to haul small loads on attached racks or small dump beds. Utility ATVs may also tow small trailers. Utility ATVs with six wheels include an extra set of wheels at the back to increase the payload capacity, and can be either four-wheel-drive (back wheels driving only) or six-wheel-drive.

Other types of vehicles that use similar engine technology may include amphibious all terrain vehicles, snowmobiles, personal watercraft and light-sport aircraft. An amphibious all terrain vehicle (AATV) typically has four, six or eight wheels, uses a skid-steer steering system, and the rider sits inside a chassis. Generally designed to float, AATVs can go through swamps as well as traverse dry land. A snowmobile is a land vehicle that is propelled by one or two rubber tracks, with skis for steering. Snowmobiles are designed to be operated on snow and ice, but may also be operated on grass or pavement. A personal watercraft, or PWC, is a recreational watercraft that the rider sits or stands on, rather than inside of, as in a boat. Typically, personal watercraft has an inboard engine driving a pump jet, and is designed for one to four passengers. Light-sport aircraft, which are single or two-seat lightweight, slow-flying airplanes, include "ultralights" that are essentially an engine-propelled hang-glider-style wing below which is suspended a three-wheeled cart for the pilot. An ultralight is controlled by shifting the pilot's body weight with respect to a horizontal bar in roughly the same way as a hang-glider pilot flies.

SUMMARY OF THE PRESENT INVENTION

In one aspect of the present invention, an internal combustion engine includes a crankcase. Two banks of cylinders project from the crankcase in a V-configuration, the two banks of cylinders including a first cylinder bank projecting from the crankcase to a first cylinder head and a second cylinder bank projecting from the crankcase to a second cylinder head. A plurality of pushrods extend between the crankcase and the first and second cylinder heads, the plurality of pushrods including a first intake valve pushrod and a first exhaust valve pushrod, the first intake and exhaust valve pushrods lying in a first pushrod plane. The plurality of pushrods also including a second intake valve pushrod and a second exhaust valve pushrod, the second intake and exhaust valve, pushrods lying in a second pushrod plane, and the second pushrod plane being parallel to the first pushrod plane. A plurality of camshafts are supported by the crankcase, the plurality of camshafts consisting of first, second and third camshafts.

In another aspect of the present invention, an internal combustion engine includes a plurality of cylinders and a plurality of camshafts, wherein the plurality of camshafts is numerically one greater than the plurality of cylinders.

In another aspect of the present invention, an internal combustion engine includes a crankshaft and a plurality of camshafts, wherein a camshafts to crankshaft ratio equals 3:1.

In another aspect of the present invention, an internal combustion engine includes a crankshaft rotating on a crankshaft axis. A crankcase supports the crankshaft for relative rotation on the crankshaft axis. A plurality of cylinders extend from the crankcase, each of the plurality of cylinders including a central longitudinal cylinder axis extending radially with respect to the crankshaft axis, a first set of the cylinder axes together with the crankshaft axis defines a first cylinder bank plane, a second set of the cylinder axes together with the crankshaft axis defines a second cylinder bank plane, and the first and second bank planes extend in a V-configuration defining 1) an acute included sector between the two cylinder bank planes, and 2) an excluded sector. A plurality of camshafts consist of a first camshaft rotating on a first camshaft axis parallel to the crankshaft axis, the first camshaft being disposed in the crankcase within the acute included sector between the two cylinder blank planes. A second camshaft rotates on a second camshaft axis parallel to the crankshaft axis, the second camshaft being disposed in the crankcase within the excluded sector. A third camshaft rotates on a third camshaft axis parallel to the crankshaft axis, the third camshaft being disposed in the crankcase within the excluded sector.

In still another aspect of the present invention, an internal combustion engine includes first and second cylinders in a V-configuration. A plurality of camshafts consist of an intake camshaft rotating on an intake camshaft axis, the intake camshaft including first and second intake cam lobes. A first exhaust camshaft rotates on a first exhaust axis parallel to the intake camshaft axis, the first exhaust camshaft including a first exhaust cam lobe. A second exhaust camshaft rotates on a second exhaust axis parallel to the intake camshaft axis, the second exhaust camshaft including a second exhaust cam lobe. A plurality of valves include a first intake valve letting in an intake charge to the first cylinder, the first intake valve being reciprocated along a first intake valve axis in response to rotation of the first intake cam lobe. A first exhaust valve letting out combustion products from the first cylinder, the first exhaust valve being reciprocated along a first exhaust valve axis in response to rotation of the first exhaust cam lobe, and the first intake and exhaust valve axes being parallel and defining a first valve plane. A second intake valve letting in an intake charge to the second cylinder, the second intake valve being reciprocated along a second intake valve axis in response to rotation of the second intake cam lobe. A second exhaust valve letting out combustion products from the second cylinder, the second exhaust valve being reciprocated along a second exhaust valve axis in response to rotation of the second exhaust cam lobe, the second intake and exhaust valve axes being parallel and defining a second valve plane.

These and other aspects, objects, and features of the present invention will be understood and appreciated by those skilled in the art upon studying the following specification, claims, and appended drawings.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 24C is a top view of the valve train illustrated in FIG. 24A.

DETAILED DESCRIPTION OF THE PREFERRED EMBODIMENT

Figure 1:
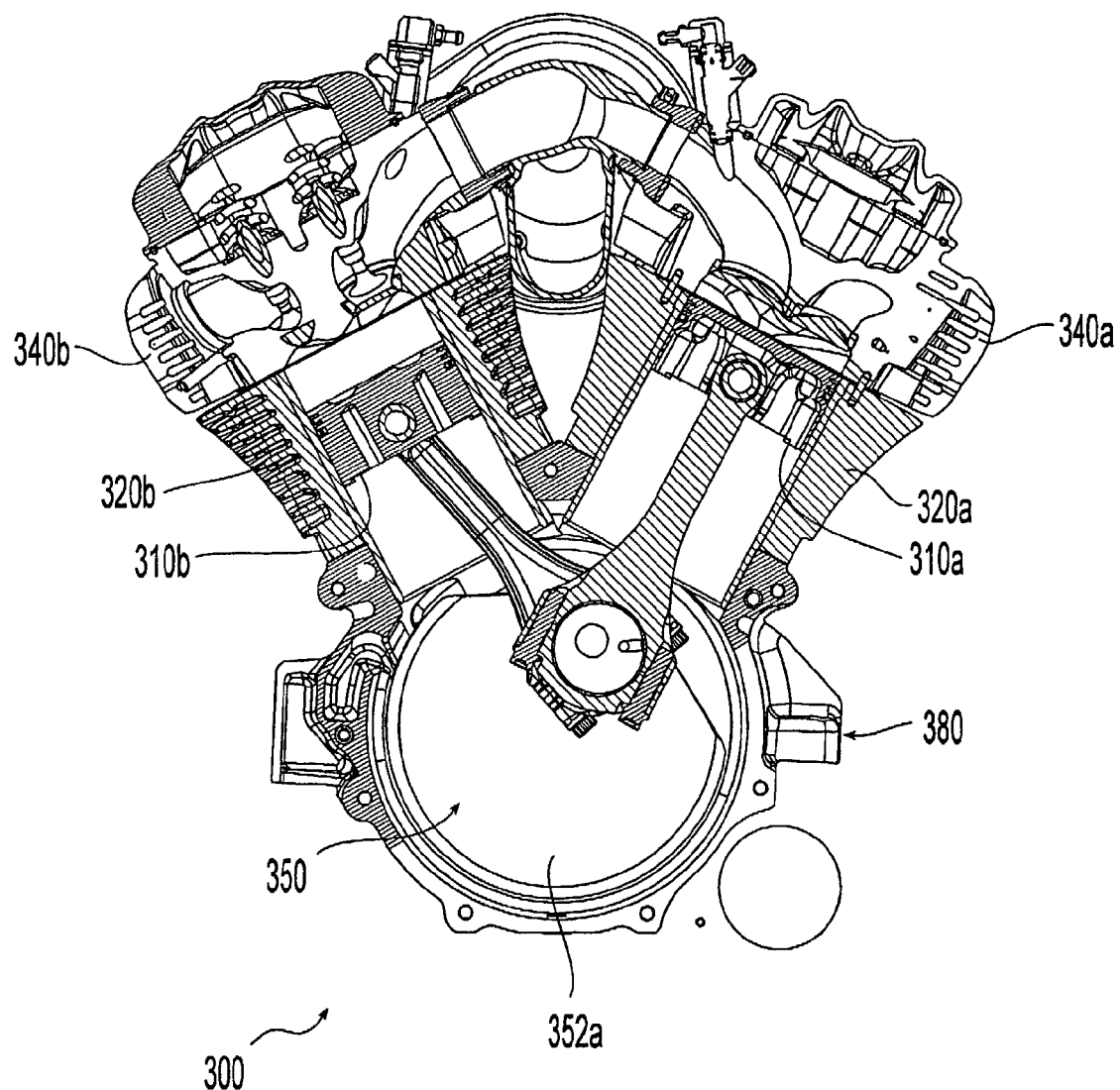
FIG. 1 is a first cross section view of a V-configuration internal combustion engine according to a preferred embodiment.
Figure 2:
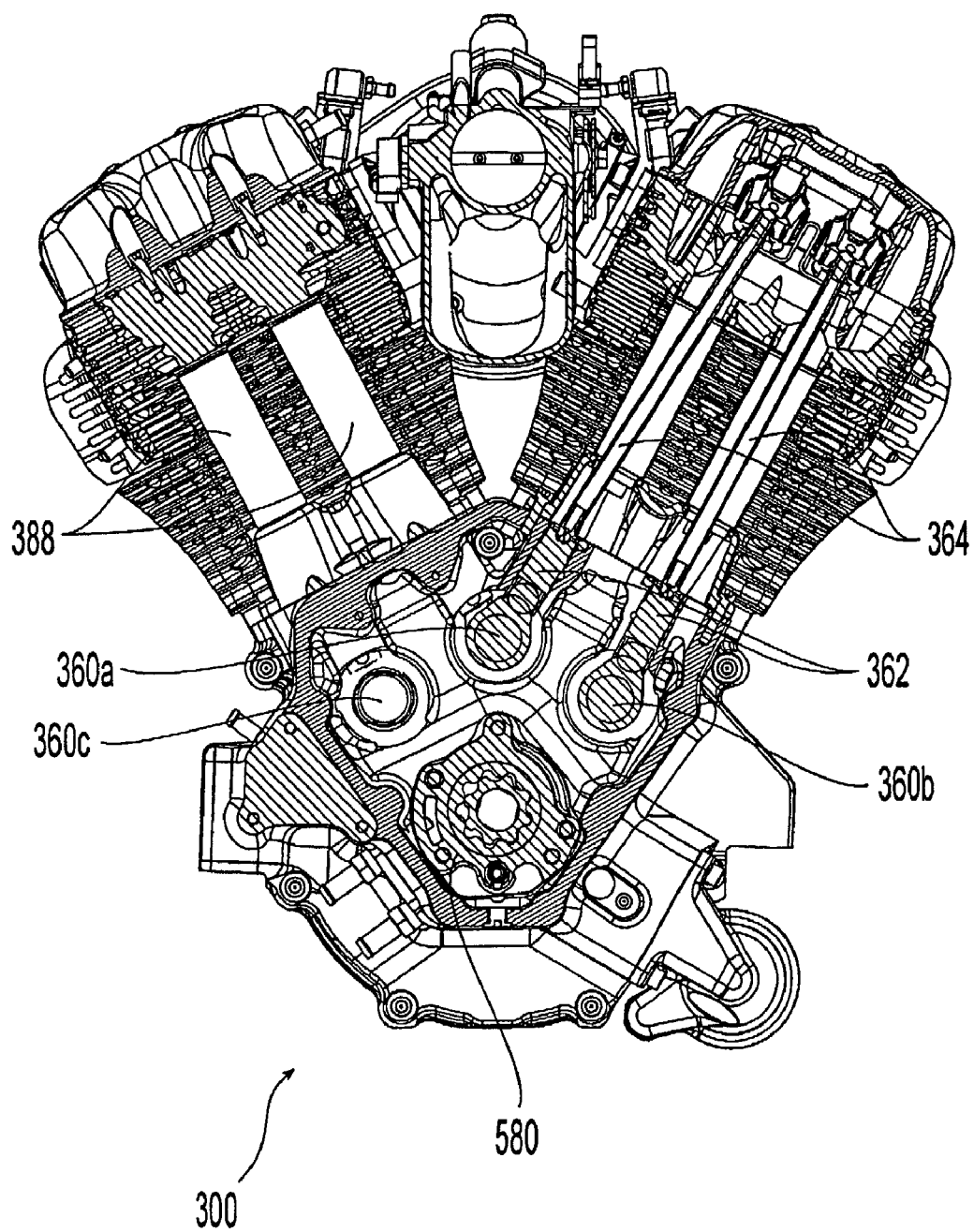
FIG. 2 is a second cross section view of the V-configuration internal combustion engine illustrated in FIG. 1.
Figure 3:
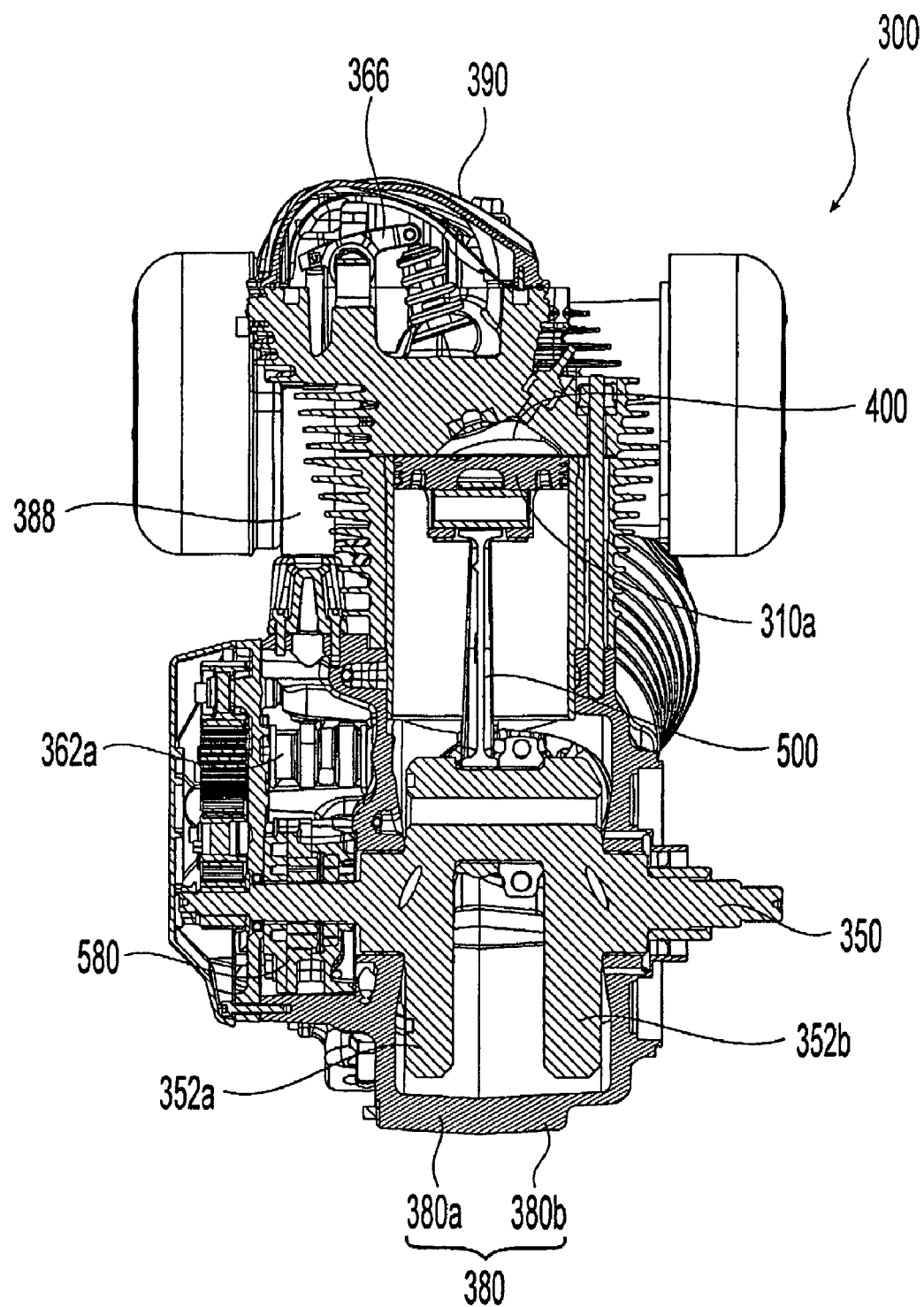
FIG. 3 is a third cross section view of the V-configuration internal combustion engine illustrated in FIG. 1.

Referring initially to FIGS. 1-3, a preferred embodiment of an internal combustion engine 300 uses one or more reciprocating pistons 310 (two are illustrated) and works according to a four-stroke pumping process known as the Otto cycle. According to the preferred embodiment, reciprocating pistons 310a and 310b are disposed in respective cylinders 320a and 320b. Intake valves 330a and 330b are opened to allow air (and fuel) to be pulled into the respective cylinder 320a, 320b as the corresponding piston 310a, 310b moves away from cylinder heads 340a and 340b. This is commonly referred to as the intake stroke. The intake valves 330a, 330b are closed either before or during movement of the pistons 310a, 310b toward the respective cylinder heads 340a, 340b to compress the air (and fuel) in the cylinders 320a, 320b, i.e., the compression stroke. If fuel is not mixed with the air, fuel can be directly injected into the cylinders 320a, 320b and a spark is introduced before, at, or after top-dead-center, i.e., when a piston 310 reaches a position closest to its cylinder head 340. The air/fuel charge burns creating increased pressures within the cylinders 320a, 320b, forcing the pistons 310a, 310b away from their cylinder heads 340a, 340b and creating work, i.e., the power stroke. Exhaust valves 332a and 332b open before, at, or after bottom-dead-center, i.e., when a piston 310 reaches a point furthest away from its cylinder head 340, allowing some of the combustion gases to escape. The pistons 310a, 310b then move towards the cylinder heads 340a, 340b pushing out the majority of the remaining combustion gases, i.e., the exhaust stroke. The exhaust valves 332a, 332b are closed before, at, or after the pistons 310a, 310b reach top-dead-center, and the intake valves 330a, 330b are opened either before or after the exhaust valves 332a, 332b are closed. This pumping process repeats over the course of every two rotations of a crankshaft 350 connected to the pistons 310a, 310b.

Camshafts 360a, 360b and 360c dictate the movement of the intake valves 330a, 330b and the exhaust valves 332a, 332b. The camshafts 360a, 360b, 360c force tappets 362 to force pushrods 364 to force rocker arms 366 to force the intake valves 330a, 330b and the exhaust valves 332a, 332b open against the force of valve springs 368. This linkage of components is commonly referred to as the valve train.

The pumping processes associated with the cylinders 320a, 320b are out of phase with respect to one another such that ignition of a charge occurs, alternatingly between the cylinders 320a, 320b, once every rotation of the crankshaft 350.

Features of the present invention will now be described with regard to preferred embodiments of: a shell of the internal combustion engine 300, a power system of the internal combustion engine 300, a valve train of the internal combustion engine 300, a valve train drive system of the internal combustion engine 300, an induction system of the internal combustion engine 300, and a lubrication system of the internal combustion engine 300.

Shell of the Internal Combustion Engine

The term "shell," as it is used herein, cumulatively refers to the combination of relatively static features of the internal combustion engine 300 (e.g., crankcase, cam chest, heads, etc.) that support relatively dynamic features of the internal combustion engine 300 (e.g., crankshaft, camshafts, valves, rocker arms, etc.).

V-Configuration Angle

During the pumping process of the internal combustion engine 300, when the piston 310a is furthest away from the cylinder head 340a, there is often a clearance problem of the piston 310a with the piston 310b and the bore of the cylinder 320b, and vice versa. This necessitates machining away portions of the pistons and the cylinders in a 45-degree angle V-configuration engine. Increasing the angle of the V-configuration allows for the pistons to reciprocate freely without clearance problems relative to the pistons or bores of the other cylinders. A 90-degree angle V-configuration engine is believed to minimize vibrations relative to a 45-degree angle V-configuration engine; however, for fitment within the frame 100, the preferable angle of a V-configuration engine is from 45 degrees to 60 degrees. Thus, taking into account both fitment and vibration, the angle of a V-configuration engine is preferably near to but less than 60 degrees.

Figure 4:
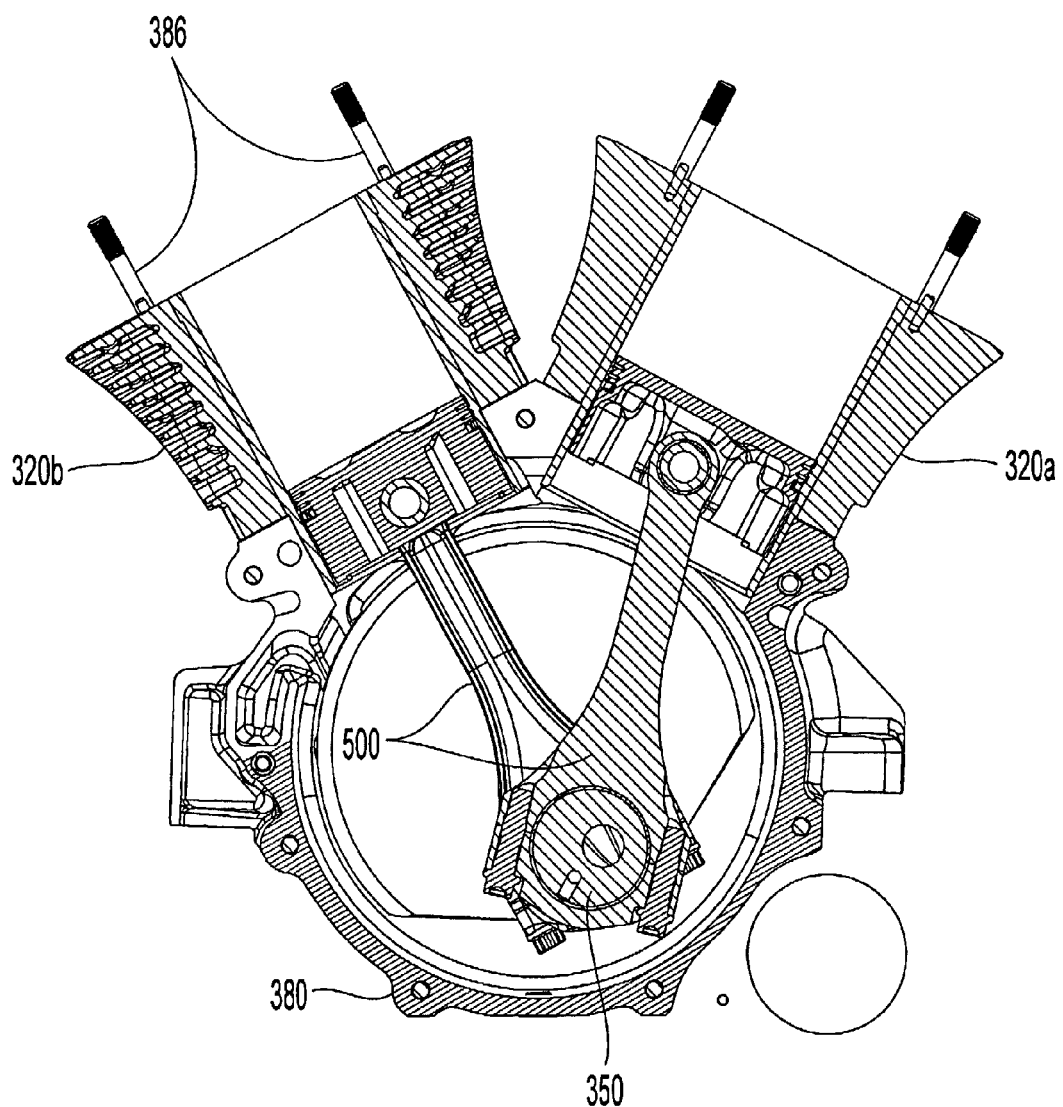
FIG. 4 illustrates a 56.25-degree angle of a V-configuration internal combustion engine according to a preferred embodiment.

Preferred embodiments of the present embodiment are directed to V-configuration engines having an included angle between two or more cylinders that ranges between about 50 degrees and about 60 degrees. Preferably, the included angle ranges between about 56 degrees and about 59 degrees, with a more preferred angle ranging between about 56 degrees and about 57 degrees. Most preferably, the included angle between two cylinders is about 56.25 degrees (See FIG. 4).

The 56.25 degree V-configuration internal combustion engine 300 according to the preferred embodiment achieves a number of advantages over known 45 degree and 90 degree V-configuration engines, including: 1) allowing for piston clearance on long stroke and big bore engine configurations while also allowing for the use of current engine control electronics and software; 2) allowing for less vibration than that of a 45 degree V-configuration engine; 3) allowing for easier chassis height fitment than that of a 45 degree V-configuration engine and easier chassis length fitment than that of a 90 degree V-configuration engine; and 4) allowing for easier fitment of an air intake system than that of a 45 degree V-configuration engine. According to a preferred embodiment, the internal combustion engine 300 displaces between about 117 cubic inches (approximately 1900 cubic centimeters) and about 121 cubic inches (approximately 2000 cubic centimeters). The preferred stroke of the pistons 310a, 310b is between about 4.375 inches (approximately 111 millimeters) and about 4.25 inches (approximately 108 millimeters), and the preferred bore of the cylinders 320a, 320b is between about 4.125 inches (approximately 105 millimeters) and about 4.25 inches (approximately 108 millimeters). Thus, the internal combustion engine 300 is preferably "square" (i.e., the bore-to-stroke ratio is equal to one) or slightly "undersquare" (i.e., the bore is smaller than the stroke). However, the bore of the cylinders 320a, 320b may also be enlarged, thereby making the internal combustion engine 300 "oversquare" (i.e., the bore is larger than the stroke). Preferably, the ranges of both the bore and the stroke are between 4 inches (approximately 101 millimeters) and 5 inches (approximately 127 millimeters), and the range of the displacement is between about 100 cubic inches (approximately 1640 cubic centimeters) and about 196 cubic inches (approximately 3210 cubic centimeters).

Another advantage of the 56.25 degree V-configuration internal combustion engine 300 according to the preferred embodiment is the ability to integrate a known engine control software package. In particular, the 56.25 degree V-configuration angle is a multiple of 11.25 degrees, which is the unit angular measurement when using a "32-minus-2" tooth angular position sensing system. During a single revolution, i.e., 360 degrees, of the crankshaft 350, the angular spacing from the rising edge of one tooth to the rising edge of the next tooth on the known 32-minus-2 timing wheel is 360/32=11.25 degrees, which is precisely one-fifth of the preferred 56.25 degree V-configuration of the internal combustion engine 300. The preferred included angle provides a compact package with complete piston skirts and cylinders with long strokes and big bores. Advantageously, a V-configuration engine according to the preferred embodiments is not significantly taller or wider than conventional engines, and easily accommodates engine control software to make the engine control system easier to design. A crankcase 380 includes a cam-side portion 380a and a drive-side portion 380b that, preferably, are held together by seven, equal length bolts 382. The crankcase 380 defines the included angle of about 56.25 degrees between the cylinders 320a, 320b according to the preferred embodiment of the internal combustion engine 300. In particular, the crankcase 380 includes a pair of decks 333a, 333b, which are machined surfaces against which ends of the cylinders 320a, 320b are mounted. The decks 333a, 333b lie in respective planes that are oriented at 123.75 degrees with respect to one another, thereby establishing that the center axes of the cylinders 320a, 320b extend at an angle of 56.25 with respect to one another. The cylinders 320a, 320b can be sandwiched between the crankcase 380 and, respectively, the cylinder heads 340a, 340b.

Cylinder Studs

Figure 5:
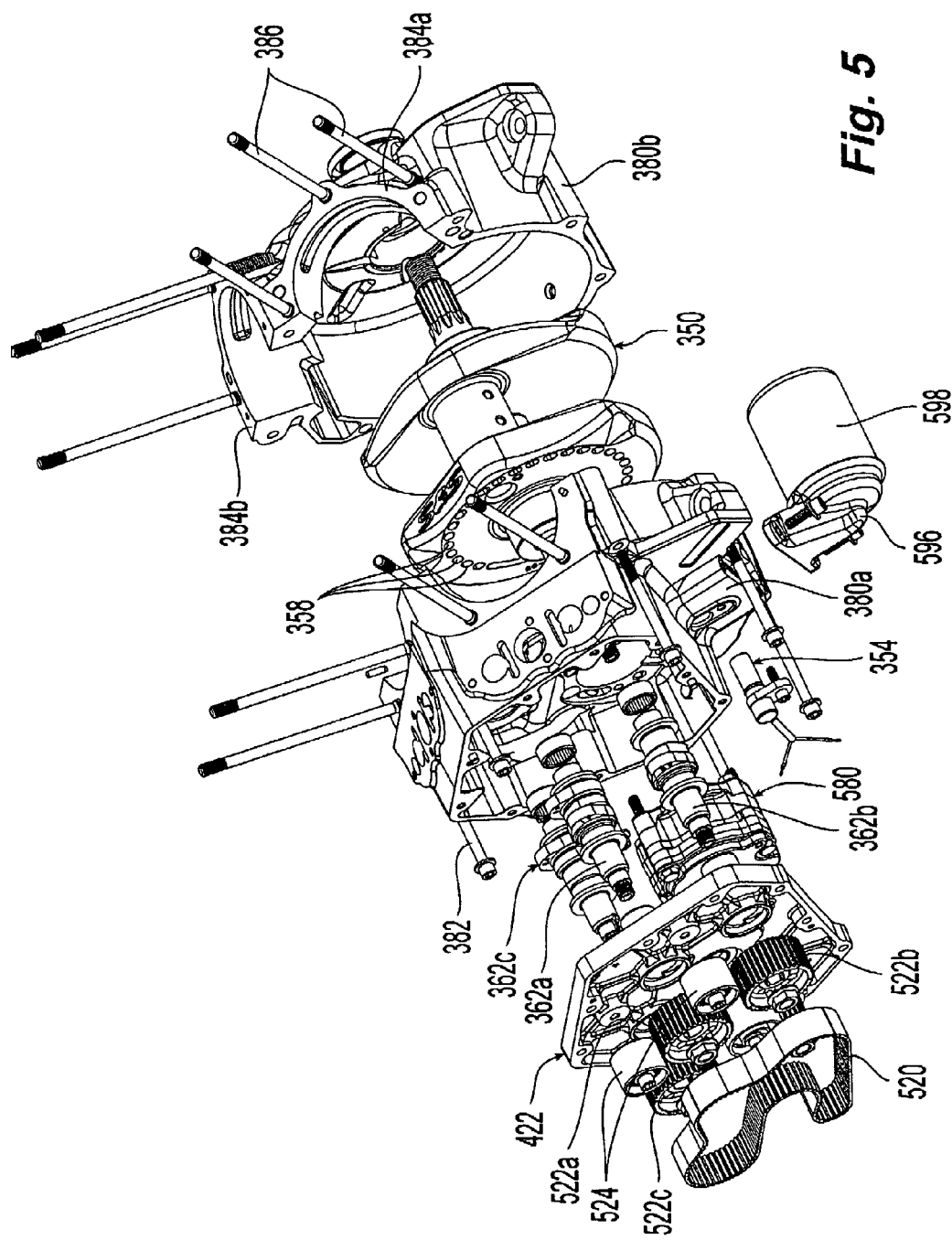
FIG. 5 is an exploded view of a long block for a V-configuration internal combustion engine according to a preferred embodiment.

Respective sets of studs or bolts secure the cylinders 320a, 320b, the cylinder heads 340a, 340b, and the crankcase 380. Referring to FIG. 5, a preferred embodiment includes a first set of five studs 386 that extend through respective holes 322 in cylinder 320a, and a second set of five studs 386 extend through respective holes in cylinder 320b. The holes 322 extend parallel to a center axis of the corresponding cylinders 320a, 320b. Preferably, the holes 322 are disposed around the center axis in a circular pattern that is concentric with the center axis. The holes 322 can be disposed equiangularly about the center axis (i.e., every 72 degrees around the center axis), or the holes 322 can be disposed symmetrically but not equiangularly, or the holes 322 can be disposed asymmetrically about the center axis (i.e., none of the angular spacing intervals between adjacent holes are equal). According to a preferred embodiment of the internal combustion engine 300, the holes 322 in each of the cylinders 320a, 320b are disposed symmetrically but not equiangularly, with the angular interval between adjacent ones of a set of studs ranging between 65 degrees and 80 degrees.

Preferably, each of the studs 386 includes a rod that has threaded sections on either end of an intermediate section 386a. The diameters and/or the thread pitch of the threaded sections may be similar or dissimilar. A first threaded section 386b, which is turned into the crankcase 380, and a second threaded section 386c, on which a nut is turned against the cylinder head 340, preferably have different diameters and different thread pitches. According to a preferred embodiment of the studs 386, the first threaded section 386b has a larger diameter and a coarser thread pitch than the second threaded section 386c, and the intermediate section 386a has a smaller diameter than the second threaded section 386c. The cylinders 320a, 320b may additionally include passageways for conveying oil between the cylinder heads 340a, 340b and the crankcase 380. Preferably, the cylinders 320a, 320b do not include oil passageways, and oil is instead conveyed between the cylinder heads 340a, 340b and the crankcase 380 via dedicated oil lines or via separate pushrod tubes 388, which also provide enclosures for the pushrods 364 that actuate the intake valves 330a, 330b or the exhaust valves 332a, 332b.

Cylinder Fins

Figure 6:
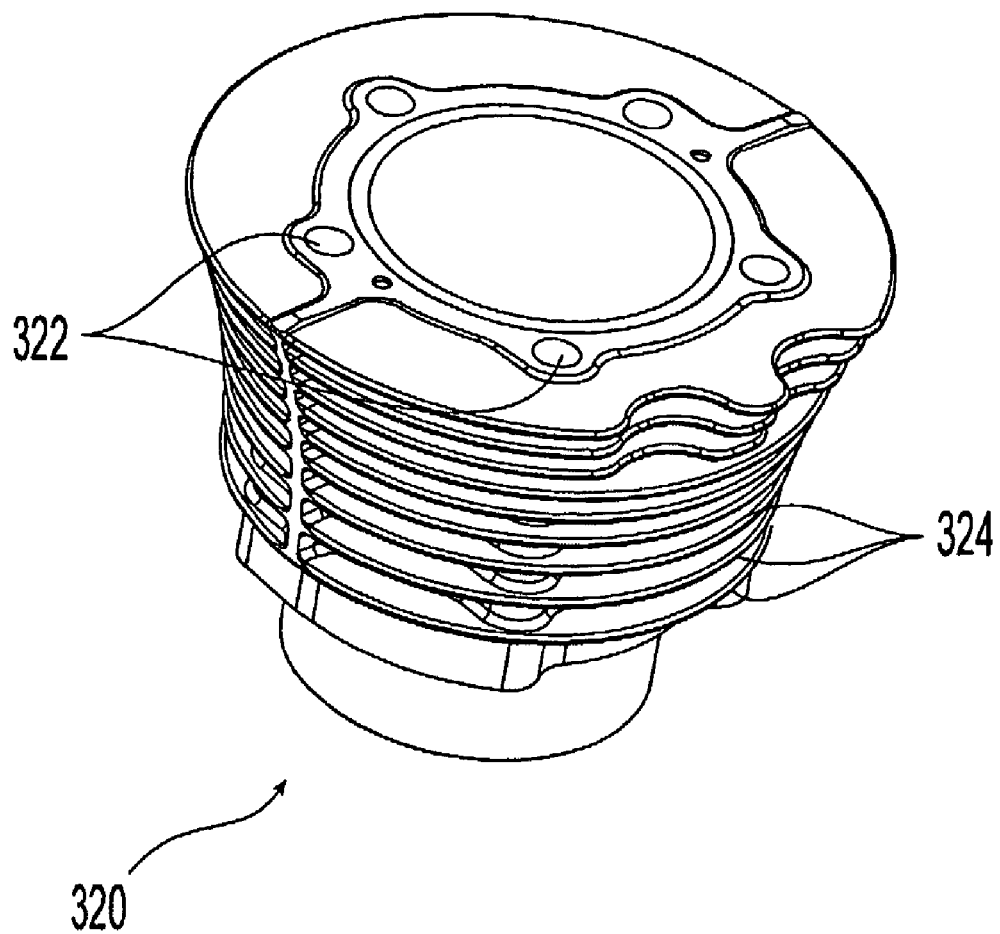
FIG. 6 is an isometric view of a cylinder for a V-configuration internal combustion engine according to a preferred embodiment.

The cylinders 320a, 320b include fins 324 to facilitate air cooling. According to a preferred embodiment, there is a progressive change in the center-to-center axial spacing between the fins 324. Referring additionally to FIG. 6, the spacing between adjacent fins is preferably smaller at a top of a cylinder 320 (i.e., at a location near the respective a cylinder head 340), than at a bottom of the cylinder 320, i.e., proximate the crankcase 380. The increased density of the fins 324 at the top places more of the fins 324 at the top, i.e., in the location of the largest heat source, thereby improving the heat displacement capabilities of the fins 324. Further, this arrangement also creates a unique appearance that is more aesthetically pleasing and distinctive than conventional designs.

According to a preferred embodiment of the cylinders 320a, 320b, the shape of each of the fins 324 is an annulus that has a generally uniform outward projection with respect to the center axis of a cylinder 320, preferably to minimize hoop stress. However, portions of one or more of the fins 324 can be clipped so as to provide appropriate clearance for other components, e.g., so as not to contiguously engage the pushrod tubes 388 that extend parallel to the cylinders 320a, 320b. Preferably, the radial projection of the fin 324 at the top of a cylinder 320 is greater than that of a fin 324 at the bottom of the cylinder 320. Preferably, the radial projection of the fins 324 that are disposed between the top and bottom of a cylinder 320 progressively increases closer to the top of a cylinder 320. The increased surface area of the fins 324 at the top is again closest to the location of the largest heat source, thereby improving the heat displacement capabilities of the fins 324.

Cylinder Head Fins

Like the cylinders 320a, 320b, the cylinder heads 340a, 340b also include fins 344 to facilitate air cooling. Preferred embodiments of the fins 344 on the cylinder heads 340a, 340b can have particular shapes, sizes and distributions that correspond to locations of lesser or greater heat, e.g., around the exhaust port and/or other locations. The fins 344 can be additionally projected around an exhaust port 346 of a cylinder head 340 so as to enhance heat displacement proximate to the exhaust port 346 and thereby improve cooling.

Combustion Chamber Shape and Port Orientation

A combustion chamber has several key design considerations, including: 1) contain the combustion event; 2) promote efficient combustion; and 3) promote efficient gas exchange. A preferred embodiment combines a unique valve train layout with a unique wedge-shaped combustion chamber and port orientation.

In many overhead valve pushrod engines, the valves are arranged in a parallel configuration to each other, and are inclined with respect to the center axis of a cylinder. The resulting shape of the combustion chamber is typically referred to as a "wedge" shaped combustion chamber. Flow into and out of these conventional wedge-shaped combustion chambers is along respective spaced planes that are generally parallel to the longitudinal direction of the rocker arms. This arrangement provides for simplicity of construction and ease of manufacture; however, the spaced parallel flow planes of the two valves have several disadvantages, including: 1) the incoming charge is shrouded by the back wall of the wedge thereby creating an obstruction that limits the flow, thereby restricting power; 2) the incoming charge has a strong tumble motion and very little swirl, which is believed to be a limitation for good, clean combustion; and 3) because the flow planes of the two valves are not aligned, scavenging of combustion products in the chamber is less efficient.

Figure 13:
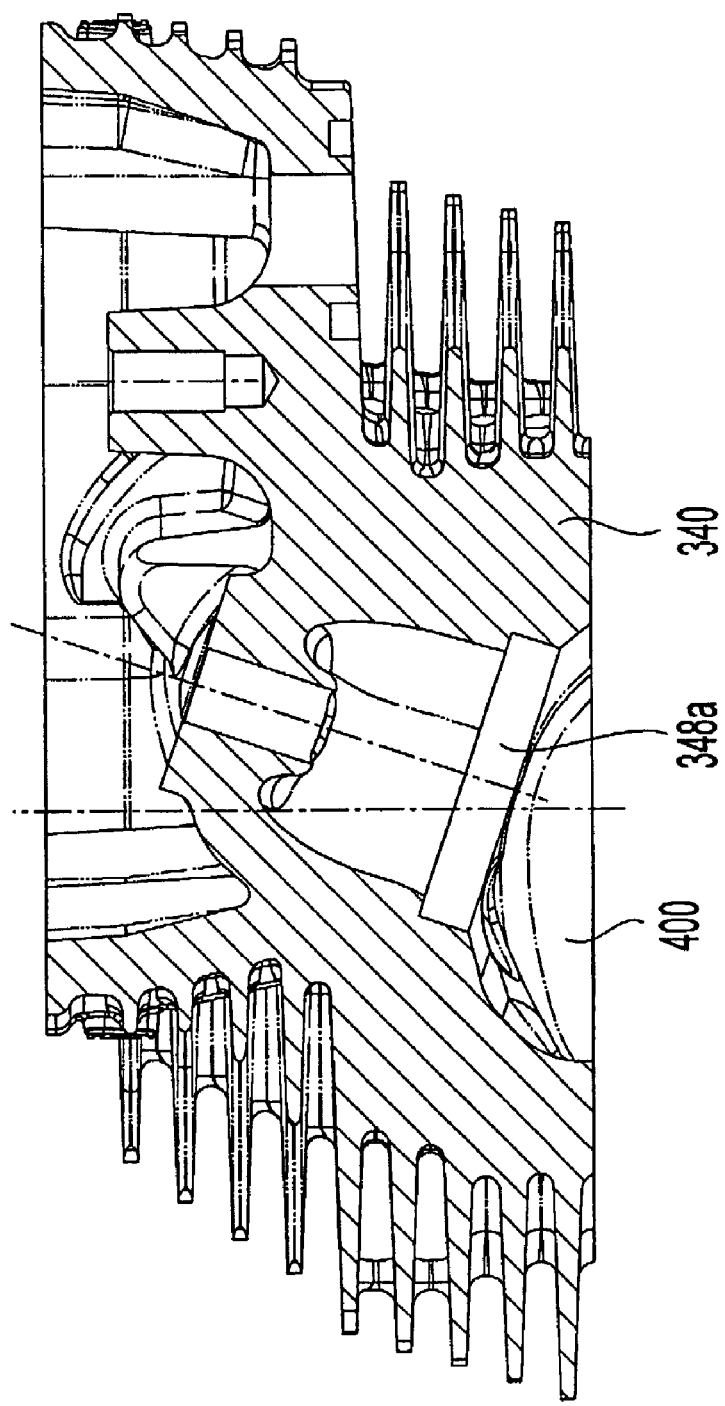
FIG. 13 is a cross section view taken along line C-C in FIG. 9.
Figure 14:
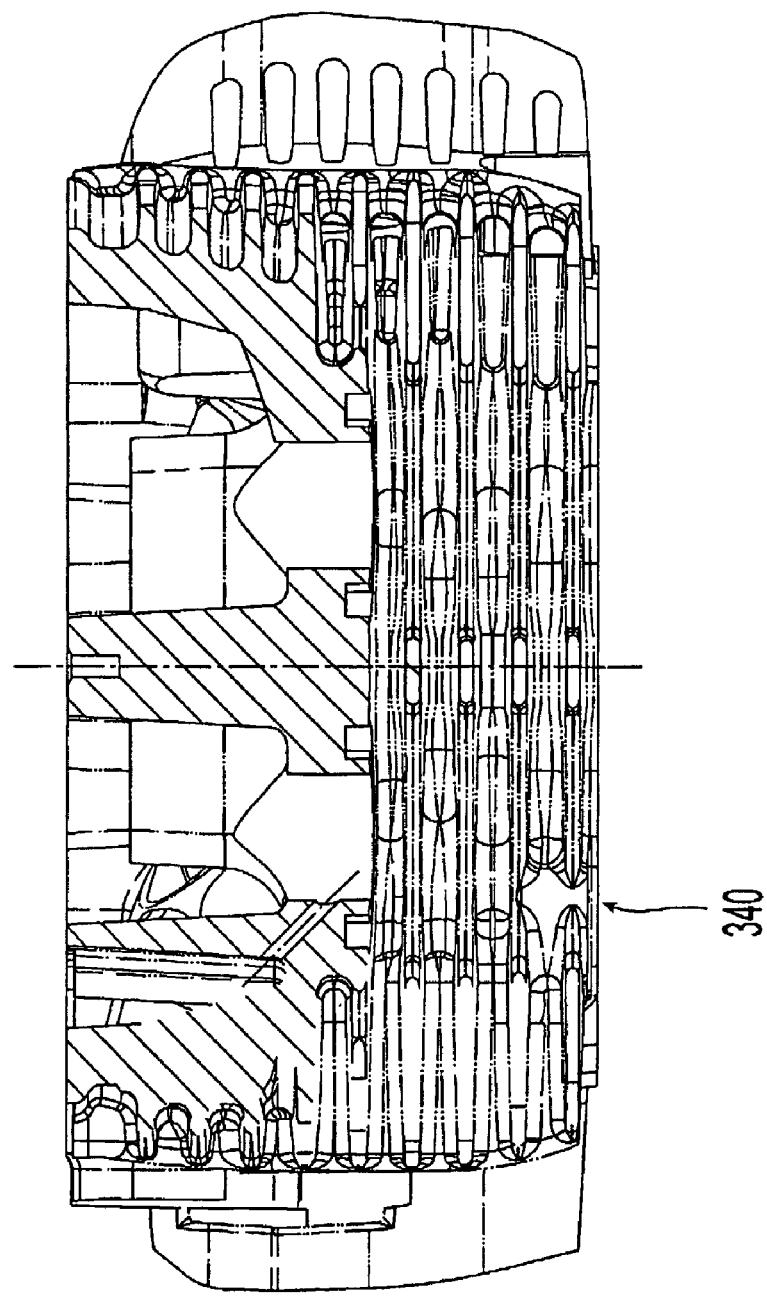
FIG. 14 is a cross section view taken along line H-H in FIG. 9.
Figure 15:
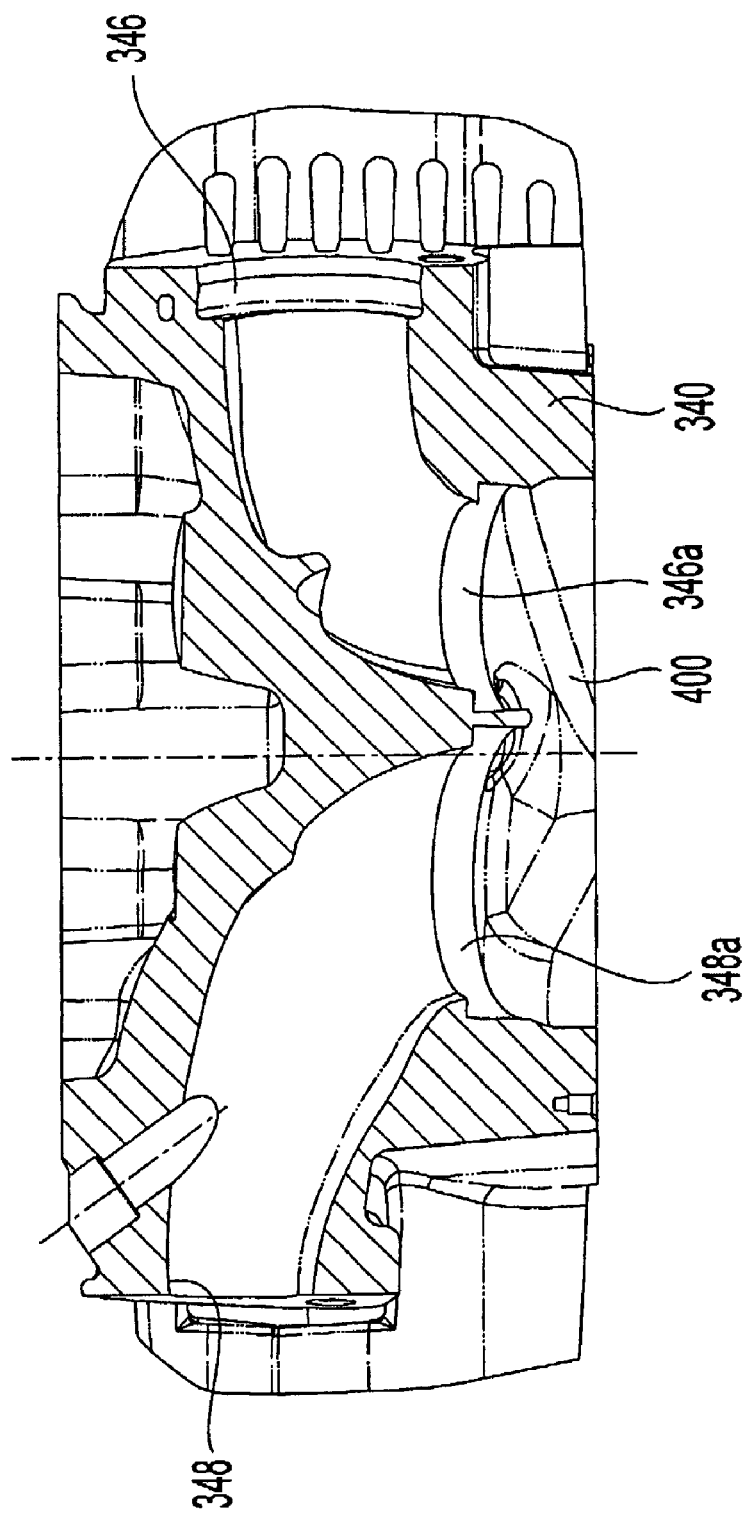
FIG. 15 is a cross section view taken along line J-J in FIG. 9.

Referring additionally to FIGS. 7-15, flow into and out of a combustion chamber 400 according to a preferred embodiment is generally transverse to the longitudinal direction of the rocker arms 366. In particular, FIG. 13 shows a flow plane including the exhaust port 346 and an exhaust valve seat 346a that is nearly perpendicular to the rocker arms 366, and another flow plane including an intake port 348 and an intake valve seat 348a that is also nearly perpendicular to the rocker arms 366. According to a preferred embodiment, these exhaust and intake flow planes may be coplanar or nearly coplanar such that there is a spiral flow pattern into the combustion chamber 400, thereby providing improved mixture preparation for better combustion and more power.

The combustion chamber 400 according to a preferred embodiment achieves a mixture motion that promotes clean, efficient burn and high flow for good power, and also accommodates the manufacturing simplicity of parallel intake and exhaust valves 330, 332. This is accomplished by: 1) changing the direction of the incoming and outgoing fluid, as compared to conventional wedge shaped combustion chambers, to promote a swirl as well as a tumble in the incoming charge; 2) creating a more straight through scavenging flow to better evacuate the combustion products; and 3) directing incoming flow away from obstructions, e.g., the wall of the combustion chamber.

The intake and exhaust ports 346, 348 are arranged in such a manner that fluid flow is directed through the combustion chamber 400. Instead of the incoming charge being directed at the back wall 402 of the combustion chamber 400, it is directed across the combustion chamber 400 thereby providing a less restricted path, particularly during scavenging. The directed flow in combination with the angle of the parallel valves 330, 332 relative to the center axis of the cylinder 320 creates a combined swirling and tumbling motion, that is very effective at mixing the fuel and air of the incoming charge, and also evenly mixing any residual gases into a more totally homogeneous charge. It is believed that this homogeneity promotes better combustion by reducing the detrimental effects of various stratifications of mixture and residual gasses caused when insufficient mixing occurs.

FIGS. 9-15 illustrate details of a preferred embodiment of a cylinder head 340, including five holes 342 that receive the second threaded section 386c of the studs 386, fins 344, the exhaust port 346, the exhaust valve seat 346a, the intake port 348, the intake valve seat 348a, and the combustion chamber 400.

Press Fitted Two-Piece Main Bearings

Figure 16:
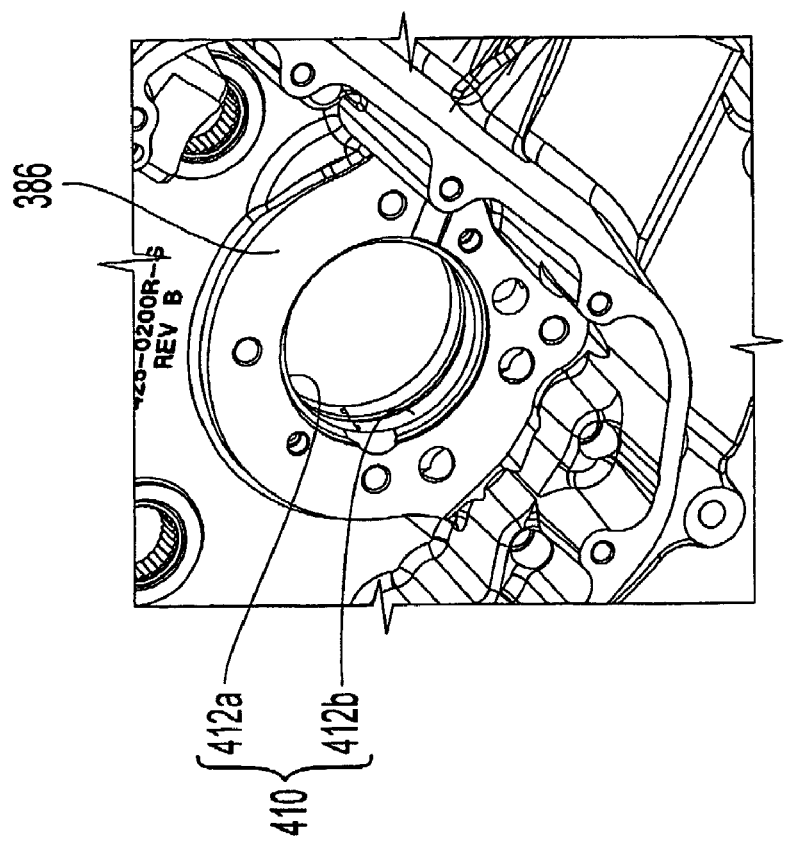
FIG. 16 is an isometric view of a split main bearing for a V-configuration internal combustion engine according to a preferred embodiment.

A conventional internal combustion engine 300 that has a vertically split crankcase 380 typically uses roller bearings to support a crankshaft 350 for relative rotation. FIG. 16 shows a multi-piece bearing assembly 410 according to a preferred embodiment, including a bearing split horizontally into two pieces 412a and 412b, and a corresponding main bearing cap. Preferably, a multi-piece bearing assembly 410 is press-fitted into either or both of the cam-side and drive-side portions 380a, 380b so as to rotatably support the crankshaft 350 with respect to of the crankcase 380.

Bolt on Cam Chest for Different Cam Layouts

According to a preferred embodiment, the cam-side portion 380a of the crankshaft 350 is coupled to a replaceable cam chest intermediate plate 422 that provides different layouts of the valve train, including the camshafts 360a, 360b, 360c, to be alternatively fitted to the same basic layout of the crankshaft 350, crankcase 380 and cylinders 320a, 320b. This allows the internal combustion engine 300 to be adapted to different customer needs. The cams, cam drive and heads may vary and result in aesthetically very different looking engines even though the core of the internal combustion engine 300 remains similar.

Engine-to-Frame Mount

A preferred embodiment of a front engine-to-frame mounting pattern includes holes 430a and 430b that, in comparison to known arrangements, are widened and moved forward to allow for improved support and strength.

Orientation of the internal combustion engine 300 can be installed upright with respect to the frame 100, or the internal combustion engine 300 can be rotated backward about the axis of rotation of the crankshaft 350. According to a preferred embodiment, the orientation of the internal combustion engine 300, when installed in the frame 100, is rotated two degrees backward about the axis of rotation of the crankshaft 350, and holes 430a, 430b are enlarged to accommodate mounting bolts that increase from 3/8 inch to 7/16 inch diameter.

Figure 17A:
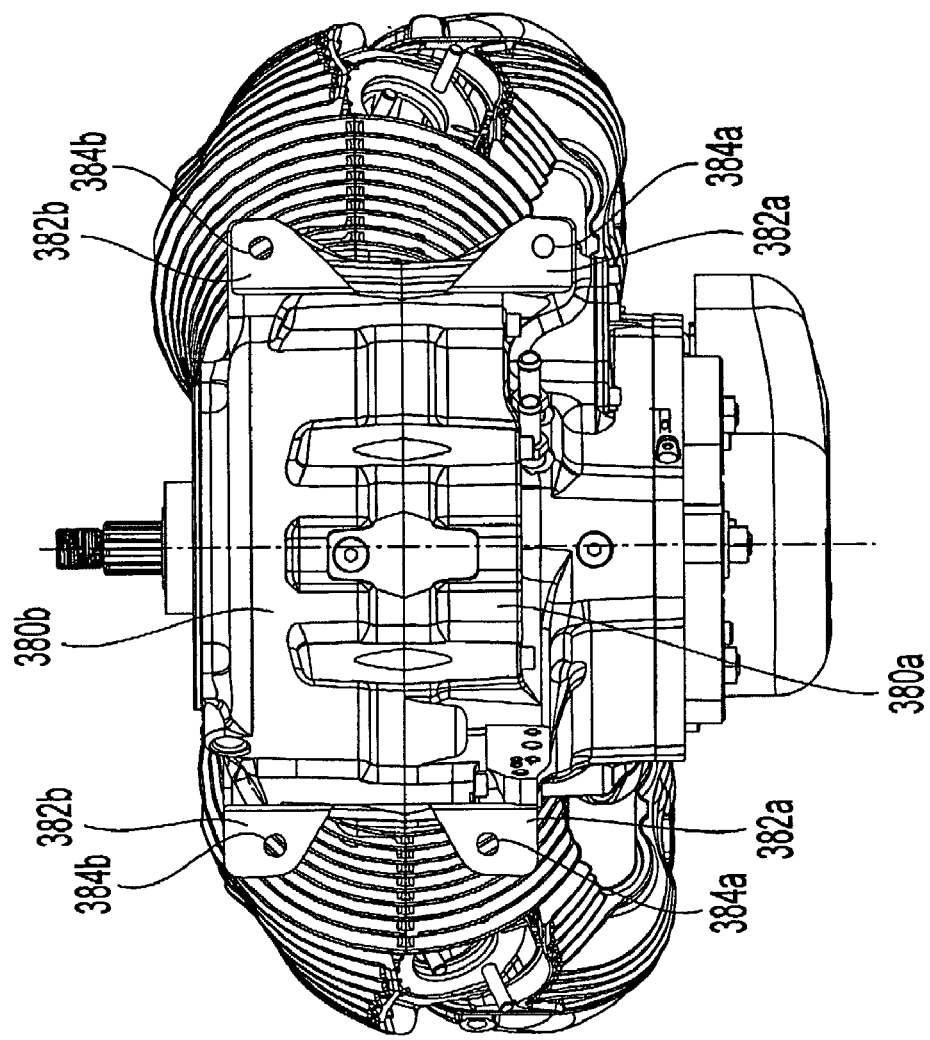
FIG. 17A is a bottom view illustrating a mounting arrangement of a V-configuration internal combustion engine according to a preferred embodiment.
Figure 17B:
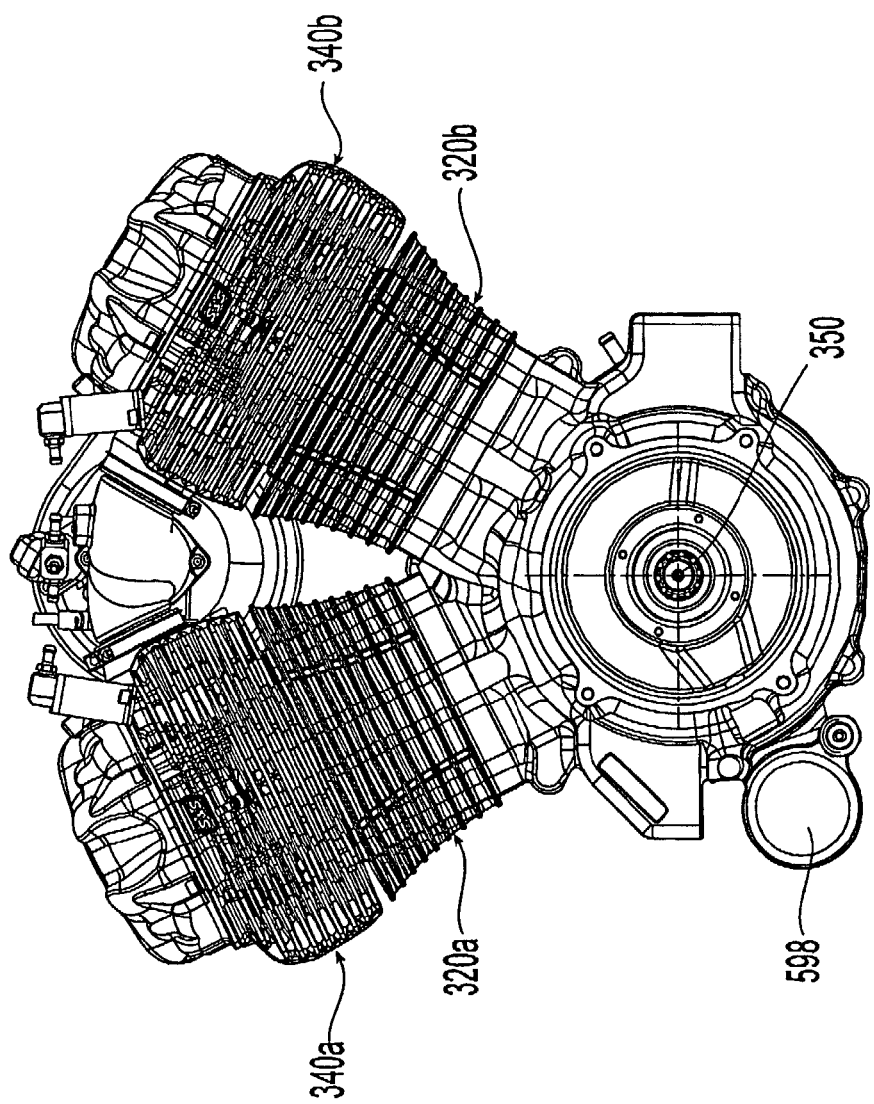
FIG. 17B is a drive-side view illustrating relative dimensions of a V-configuration internal combustion engine according to a preferred embodiment.

FIGS. 17a and 17b show the arrangement of a preferred engine-to-frame mounting pattern.

Engine-to-Transmission Mount.

Figure 18:
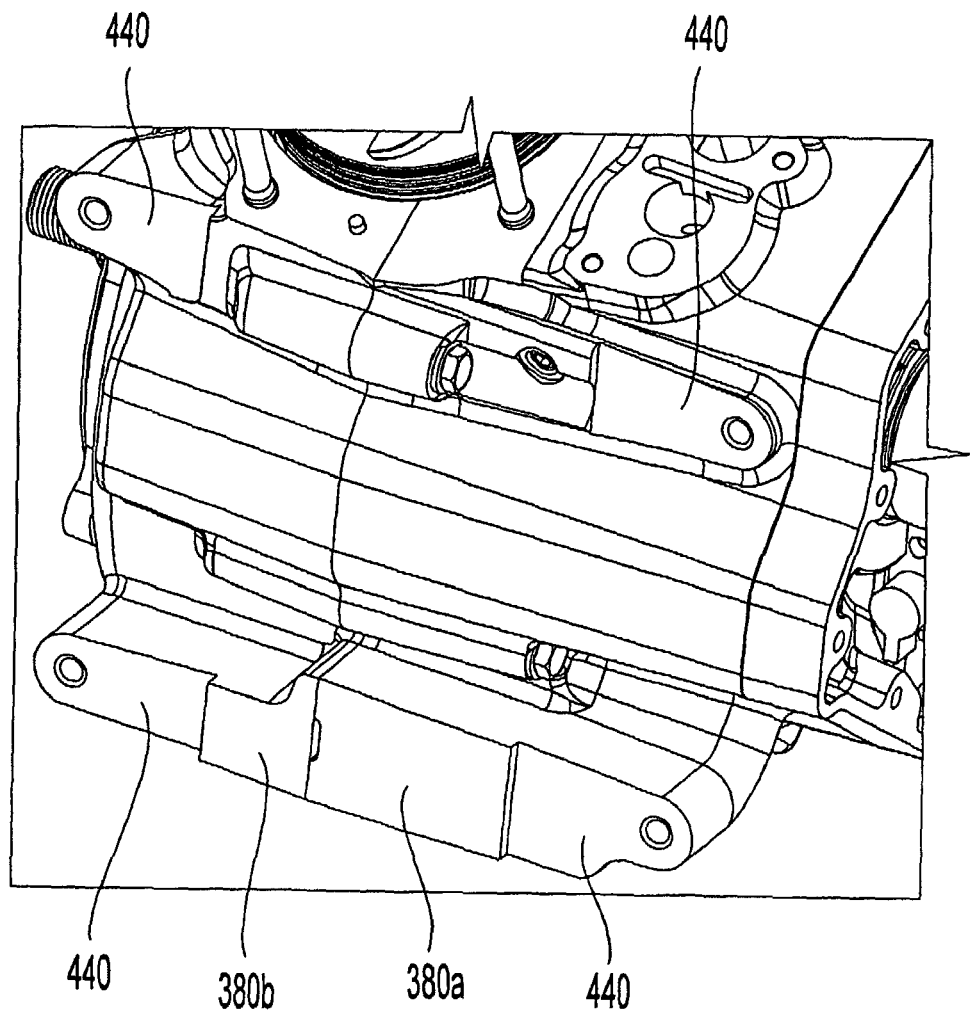
FIG. 18 is an isometric view of an engine-to-transmission interface for a V-configuration internal combustion engine according to a preferred embodiment.

Traditionally, when a transmission is relatively close to an engine, known bolt patterns do not allow for the engine-to-transmission bolts to be easily installed or removed, if access is even provided at all. Referring to FIG. 18, a first preferred embodiment of an engine-to-transmission mounting pattern includes a mounting interface 440. Preferably, a transmission side 442 of the engine-to-transmission mounting interface 440 is contiguously engaged with at least three areas of an engine side 444 of the engine-to-transmission mounting interface 440. According to the mounting interface 440, a pattern of bolts that secures the transmission 220 to the internal combustion engine 300 provides improved bolt clearance with respect to the transmission 220 and/or its covers. An engine-to-frame mounting surface may be provided on the crankcase 380 so that the internal combustion engine 300 is supported near the engine transmission interface. Preferably, this mounting surface is on a bottom surface of the engine, and is adjacent to a vertical mounting interface 440. Thus, the mounting surface provides support in a central portion of the engine/transmission assembly.

Figure 19:
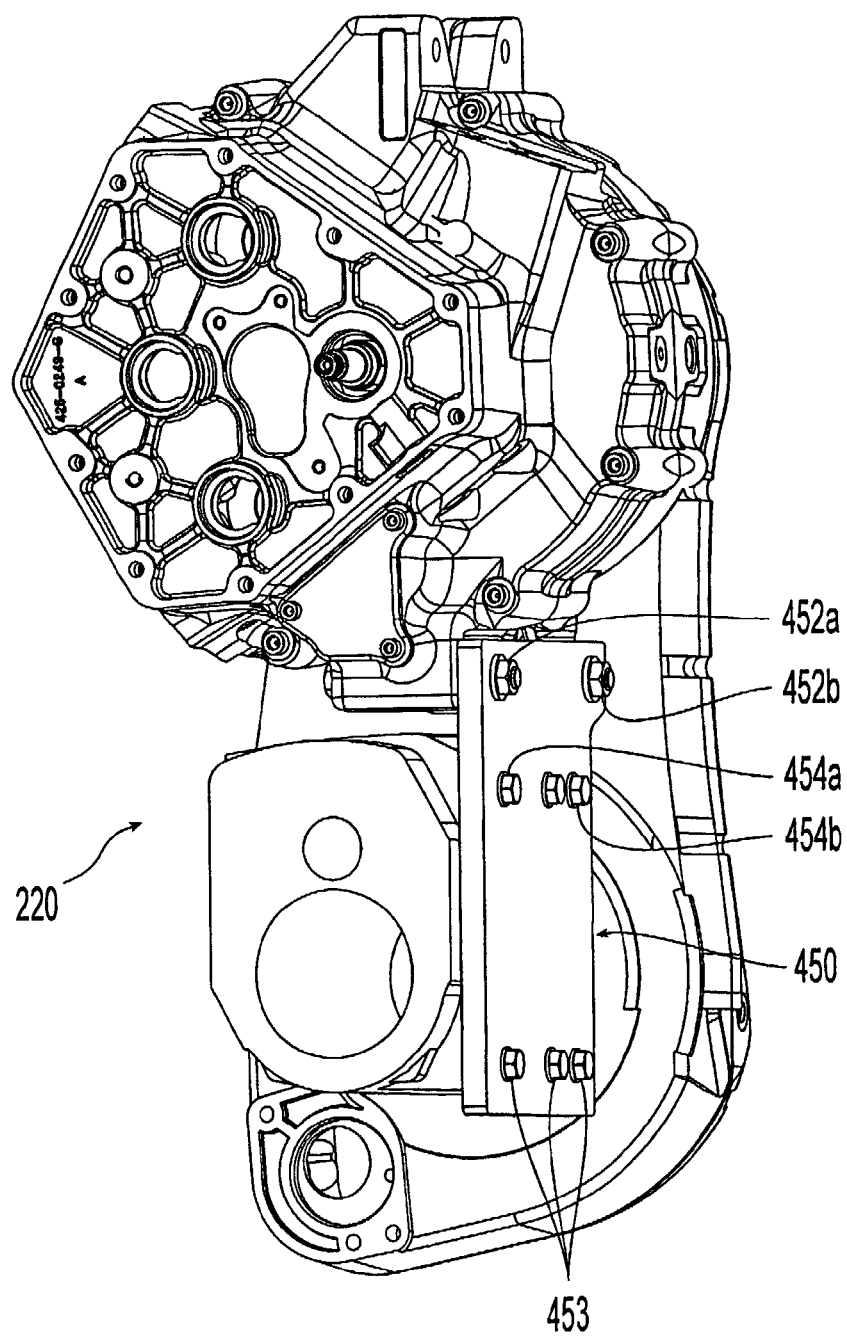
FIG. 19 is an isometric view illustrating a portion of an engine-to-transmission mounting plate for a V-configuration internal combustion engine according to a preferred embodiment.

A second preferred embodiment of an engine-to-transmission mounting pattern is shown in FIG. 19. A cam-side tab 382a extends from the rear of the cam-side portion 380a of the crankcase 380, and a drive-side tab 382b extends from the rear of the drive-side portion 380a of the crankcase 380. Holes 384a and 384b vertically penetrate the tabs 382a, 382b, respectively.

An engine-to-transmission mounting plate 450, which is preferably a portion of the vehicle chassis, includes a first set of holes 452a, 452b and a second set of holes 453 and 454. Preferably, the first set of holes includes holes 452a and 452b that correspond, respectively, to holes 384a and 384b. Fasteners, e.g., bolts and nuts, studs and nuts, bolts, etc., extend through corresponding holes. If bolts are used as the fasteners, one of the holes that receives the bolt includes internal threads to matingly engage the bolts. Of course, other types of known fasteners may be used so long as they provide a means of both securely connecting the engine-to-transmission mounting plate 450 with respect to the crankcase 380, and can readily be unfastened so as to separate the engine-to-transmission mounting plate 450 from the crankcase 380. Similarly, fasteners, e.g., bolts and nuts, studs and nuts, bolts, etc., releasably secure the engine-to-transmission mounting plate 450 with respect to the transmission 220. According to a preferred embodiment, there are two each of the fasteners and of the holes included in the first set of holes 452a, 452b, and there are four each of the fasteners and of the holes included in the second set of holes 453, 454. Of course, the number and arrangement of the holes in each of the first and second sets 452, 453, 454 may be varied so long as the engine-to-transmission mounting plate 450 can be securely and releasably coupled to the crankcase 380 and the transmission 220.

The engine-to-transmission mounting plate 450 according to the preferred embodiment provides a number of advantages that include making it possible to adjust the center to center distance between the internal combustion engine 300 and the transmission 220 for any given transmission case. Thus, the spacing between the internal combustion engine 300 and the transmission 220, as well as the length of the primary drive 230, may be selected as desired. In order to minimize weight and packaging size, the shortest possible combination may be selected, whereas a longer, more spread out package may be selected to enhance aesthetic appeal.

Bolt Patterns and Cover Profiles

According to preferred embodiments, bolt patterns and/or cover profiles of the cylinder stud 386, rocker cover(s) 390, cam chest intermediate plate 422, and camshaft drive chest cover 422 can be selected to achieve their structural requirements and also provide aesthetic characteristics. Different appearance covers can be provided for the rocker cover(s) 390 or cam chest cover 422. Additionally, the bolt pattern maybe varied, such as a four-bolt pattern, a five-bolt pattern, etc. Preferably, the bolt pattern on the cam-side portion 380a of the crankcase 380 allows a number of bolts within a range of four bolts to eleven bolts. The bolt pattern on the cam chest intermediate plate 422 uses seven bolts, and the bolt pattern on the camshaft drive cover 424 uses four bolts.

According to a preferred embodiment, a center crankcase bolt can be disposed inside the cam chest in the center of the V angle of the cylinders 320a, 320b. Placing the center case bolt inside the cam chest allows for the cam chest intermediate plate 422 to be extended to the top of the V on the crankcase 380. FIG. 53 shows a preferred embodiment wherein a single casting can be machined to various lengths to obtain more than one different size transmissions 220. This is believed to simplify manufacturing and reduce raw material inventory.

Power System

The phrase "power system," as it is used herein, cumulatively refers to the combination of relatively dynamic features (e.g., crankshaft, connecting rods, and pistons) of the internal combustion engine 300 that convert heat energy to rotation. In most internal combustion engines, connecting rod(s) 500 are used to connect and transfer energy from piston(s) to a crankshaft 350. A "cap" or bottom portion 502 of each connecting rod 500 may be split to permit the connecting rods 500 to be clamped around the crankshaft 350. Clamping is typically performed using one or more rod bolts 504 with corresponding rod bolt nuts 506. Typically, automotive connecting rod bolt nuts 506 are often installed from the bottom/cap side of the connecting rod 500. A variation of this is to install a bolt from the bottom/cap side and have a threaded hole in the connecting rod 500. Either method requires access to the bottom/cap side of the connecting rod 500, limits the stroke of the engine, and complicates assembly and repair of the engine.

Inverted Connecting Rod/Bolts

According to a preferred embodiment, a connecting rod 500 includes reversed rod studs/bolts. Because the internal combustion engine 300 has cylinders 320 that separate from the crankcase 380, relatively easy access to the topside of the crankshaft 350 is available. If the rod bolt nuts 506 are provided on the top/connecting rod side versus the bottom/cap side, the rod bolt nuts 506 can be accessed through the spigot hole in the crankcase 380. This allows the connecting rod 500 to be removed while the crankshaft 350 is still in the crankcase 380. A variation on this is to have a bolt screw into a threaded cap 502. Either method increases clearance inside the crankcase 380 and therefore allows longer strokes.

Splayed Rod Bolts

Figure 21:
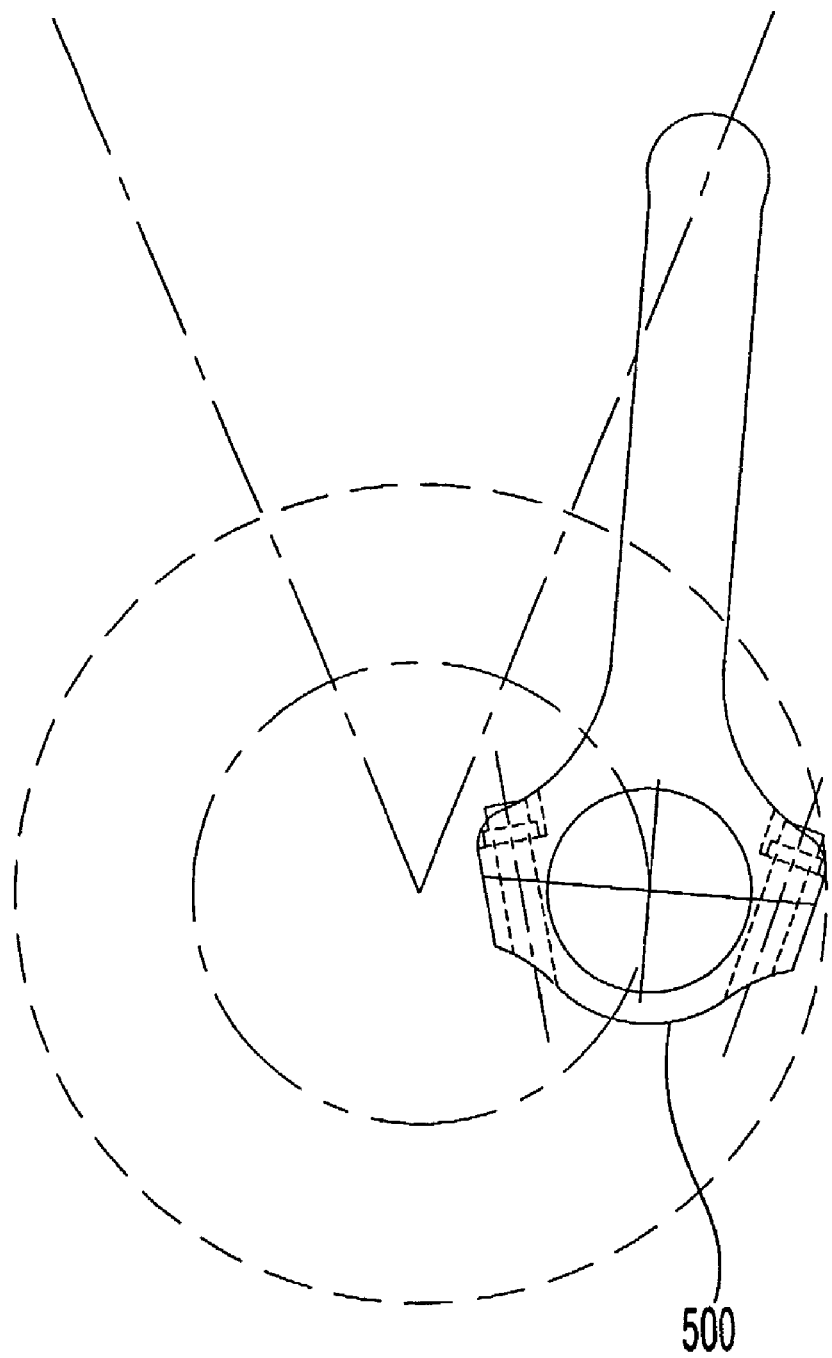
FIG. 21 is a schematic illustration of a connecting rod for a V-configuration internal combustion engine according to a preferred embodiment.

According to a preferred embodiment, the connecting rod 500 may include splayed rod bolts 504. As shown in FIG. 21, rod bolts 504 are at least partially rotated by an angle [theta] relative to a longitudinal axis 508 of the connecting rod 500, thereby converging toward one another in the cap 502. As an example, holes for the rod bolts 504 may be rotated in a range of about 1 degree<[theta]<about 45 degrees. More preferably, the bolt holes are rotated in the range of about 12.5 degrees< [theta]<about 17.5 degrees, and most preferably are rotated such that [theta]=about 15 degrees. This arrangement can be referred to as a connecting rod with a "splayed" bolt pattern or a "splayed connecting rod." Splaying the rod bolts 504 increases clearance inside the crankcase 380 and allows longer strokes than traditional connecting rod layouts.

Bolt on Flywheel Mass Internal to the Crankcase

Figure 20:
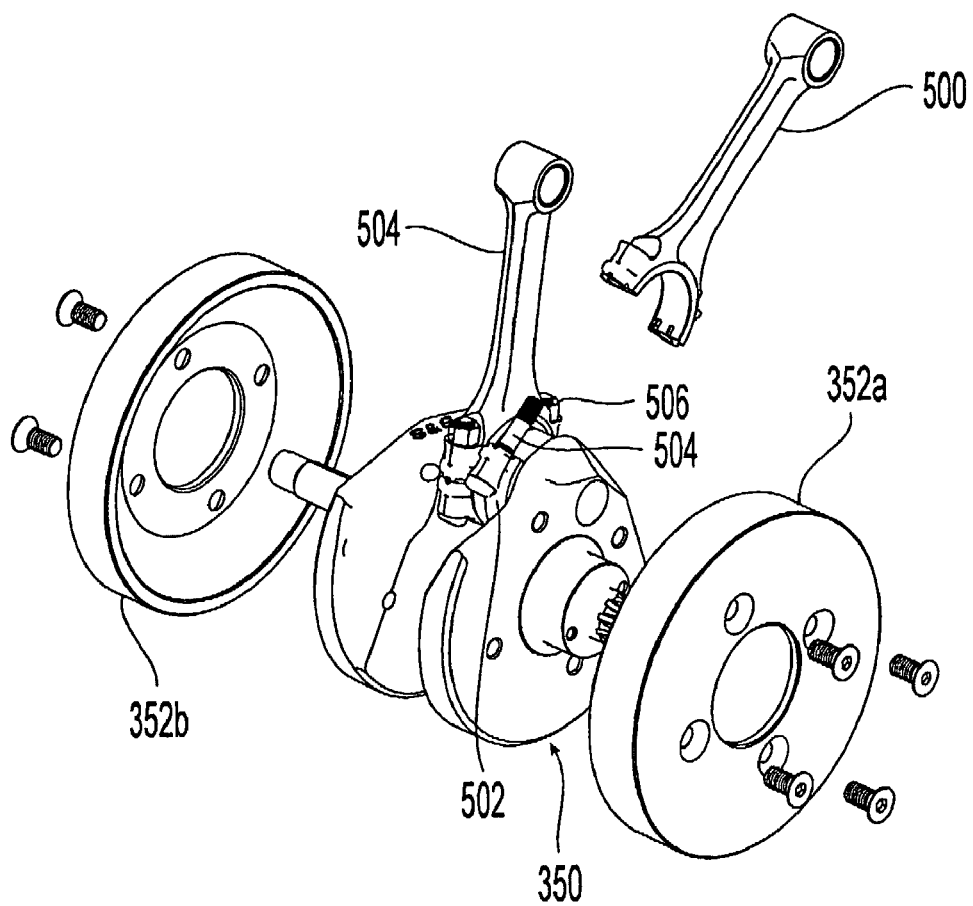
FIG. 20 is an exploded view of a crankshaft with a bolt on mass for a V-configuration internal combustion engine according to a preferred embodiment.
Figure 22:
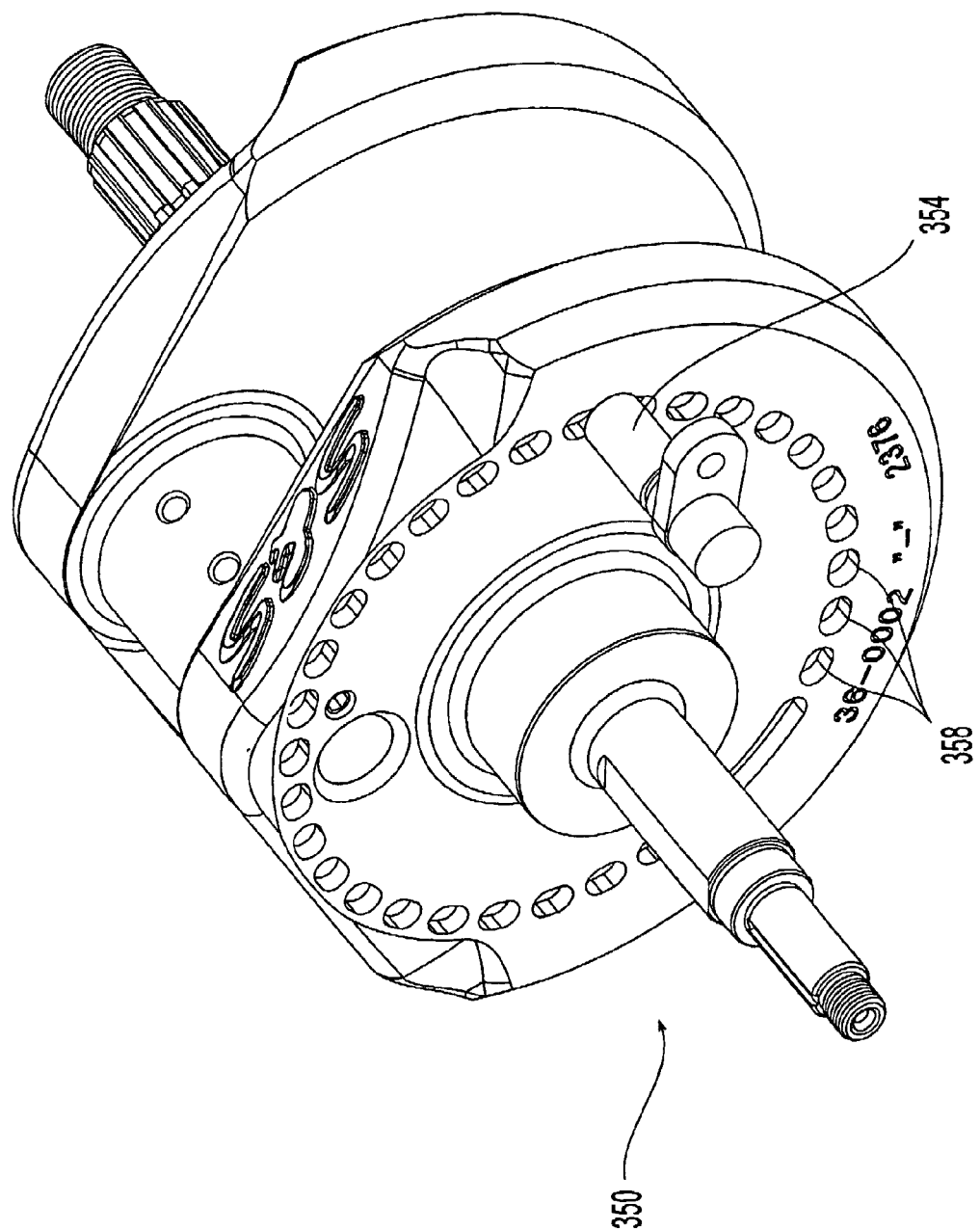
FIG. 22 is an isometric view illustrating a first embodiment of a crankshaft position sensor for a V-configuration internal combustion engine according to a preferred embodiment.

A known V-twin motorcycle engine uses counter-balance shafts to dampen engine vibrations. The counter-balance shafts, which are driven by the internal combustion engine 300, add complexity and cost to the engine package. Instead, according to a preferred embodiment, the crankshaft 350 includes a balancing structure 352 for the internal combustion engine 300. In particular, the preferred embodiment of the balancing structure 352 includes at least one mass 354 that is internally disposed in the crankcase 380 and that reduces vibration of the crankshaft 350. Thus, the balancing structure 352 reduces vibration by increasing crankshaft mass without adding complex mechanisms, e.g., eliminates a counter-balance shaft and its drive off the crankshaft 350. By adding mass, the magnitude of vibrations can be reduced. Preferably, the additional mass is added as close as possible to the axis of rotation of the crankshaft 350, so as to minimize any increase in rotational inertia. The rotational inertia that is added can reduce torsional vibration that can cause additional stresses on other driveline components, such as the transmission 220, clutch 240, and/or primary and secondary drive chains/belts. Also, the rotational inertia that is added may also improve the launch feel of the engine; and the internal combustion engine 300 is further less likely to stall due to the increased rotational inertia and does not require as much throttle input when the clutch 240 is released. Referring to FIG. 20, the crankshaft 350 includes a preferred embodiment of a balancing structure for the internal combustion engine 300. In particular, the preferred embodiment of the balancing structure 352 includes at least one flywheel mass that is attached to the crankshaft 350 and internally disposed in the crankcase 380, and that reduces vibration of the crankshaft 350. The flywheel mass may include one or more removable weights 352a and 352b, which can be bolted together with the crankshaft 350 to form an assembly. The removable weights 352a, 352b may also be configurable for different inertial requirements. In particular, different amounts of vibration and inertia for a given application may be tuned as desired. By using different weights 352a, 352b, such tuning ability is provided. As shown in FIG. 22, another preferred embodiment of the balancing structure 352 can be manufactured as a one-piece crankshaft with no detachable masses or rods. The preferred embodiment can also include a flywheel bolt pattern and design, as shown in FIG. 20, that is configured and adapted to bolt on different weights 352a, 352b. In a V-twin engine, there are vibrations that are introduced from different engine components, all of which are linked directly or indirectly to the crankshaft, and there are also the vibrations that occur due to the combustion in the engine. With an increased inertia of the crankshaft, the above vibrations are dampened. However, the ideal dampening and resulting vibration that is felt varies in the opinion of the individual using the engine. By attaching different weights 352a, 352b to the crankshaft 350, many levels of dampening can occur. This allows the customer to select the amount of vibration that they feel is ideal without making several different crankshafts. The increased inertia may also improve the launch feeling when used in the motorcycle 20.

The weights 352a, 352b are preferably manufactured from a suitable metal, metal alloy, or composite. The crankshaft 350 and the weights 352a, 352b may be cast, forged, or machined from stock. A one-piece design is believed to be best for the crankshaft 350; however, the attachable weights 352a, 352b allow for one crankshaft 350 to be used in several dampening configurations. Preferably, the entire crankshaft assembly has a mass that is as much as 30% or more greater than a conventional crankshaft.

Machined Ignition Timing Marks and Crank Position Sensor

Figure 23:
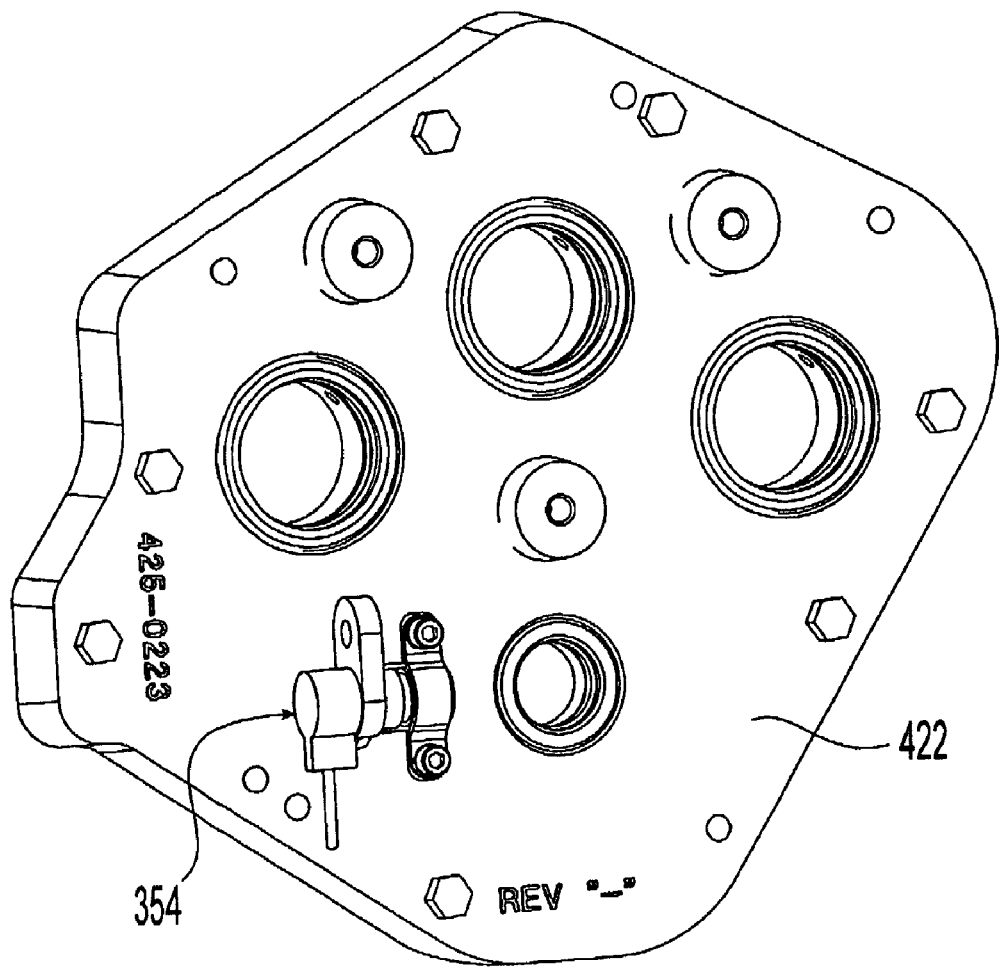
FIG. 23 is an isometric view illustrating a first embodiment of a crankshaft position sensor for a V-configuration internal combustion engine according to a preferred embodiment.

According to a first preferred embodiment, a crank position sensor 354 is mounted on the cam chest intermediate plate 422 and cooperates with a trigger wheel 356 that is separately mounted on a crankshaft/belt tensioner, as shown in FIG. 23. Alternatively, a second preferred embodiment, as shown in FIG. 22, includes the crank position sensor 354 mounted inside the cam-side portion 380a of the crankcase 380 and looking at trigger marks 358 machined on the side of the crankshaft 350.

Valve Train

The phrase "valve train," as it is used herein, cumulatively refers to the combination of relatively dynamic features (e.g., camshafts, tappets, pushrods, rocker arm, poppet valves, and return springs) of the internal combustion engine 300 that control the flow of combustion components and combustion products with respect to a combustion chamber.

Tri-Cam Layout Including Two Exhaust Cams and One Intake Cam

According to preferred embodiments, the motorcycle 20 includes a multi-cam system for the internal combustion engine 300 that provides improved valve train geometry in a simple configuration. Preferably, at least three camshafts are used. Most preferably, two exhaust camshafts and one intake camshaft are used such that the pushrods 364 for the exhaust valves 332 and the pushrods 364 for the intake valves 330 are approximately parallel to the center axes of the cylinders 320a, 320b.

A three camshaft valve train according to preferred embodiments is for use in an internal combustion engine with reciprocating pistons and pushrods; in particular a V-twin pushrod engine. Most specifically, a motorcycle V-twin pushrod engine. The three camshafts include two outboard camshafts and one inboard camshaft with respect to the V-configured engine. This allows for the angle of the pushrods that are operated by the outboard camshafts to be generally parallel to the central axes of the cylinders 320a, 320b, and allows for the angle of the pushrods that are operated by the inboard camshaft to be nearly parallel to the central axes of the cylinders 320a, 320b.

Conventional V-twin motorcycle pushrod engines having one or two camshafts drive the pushrods at angles that require large forces to open the inboard and outboard valves. Some of the energy in opening the valves is lost in the vector components perpendicular to the center axes of the cylinders 320a, 320b; for example, it is desirable for the reciprocating forces of the pushrods 364 to be axially oriented parallel to the center axes of the cylinders 320a, 320b. According to preferred embodiments of the internal combustion engine 300, this energy loss can at least be reduced for the pushrods 364 that are inboard of the V-configuration angle, and can be minimized for pushrods 364 that are outboard of the V-configuration angle. Another disadvantage of conventional single camshaft V-twin motorcycle pushrod engines is their width, which requires a wider stance by the motorcycle rider. Preferred embodiments of the internal combustion engine 300 provide a narrower engine case, which increases motorcycle rider comfort, by disposing the pairs of intake and exhaust valves for each cylinder 320a, 320b in a plane perpendicular to the axis of the crankshaft 350. Another disadvantage of quad-camshaft V-twin motorcycle pushrod engines is the complexity of the valve train and the high amounts of friction in the valve train. Preferred embodiments of the internal combustion engine 300 have fewer parts and there is less friction as compared to conventional quad-camshaft engines.

Figure 24A:
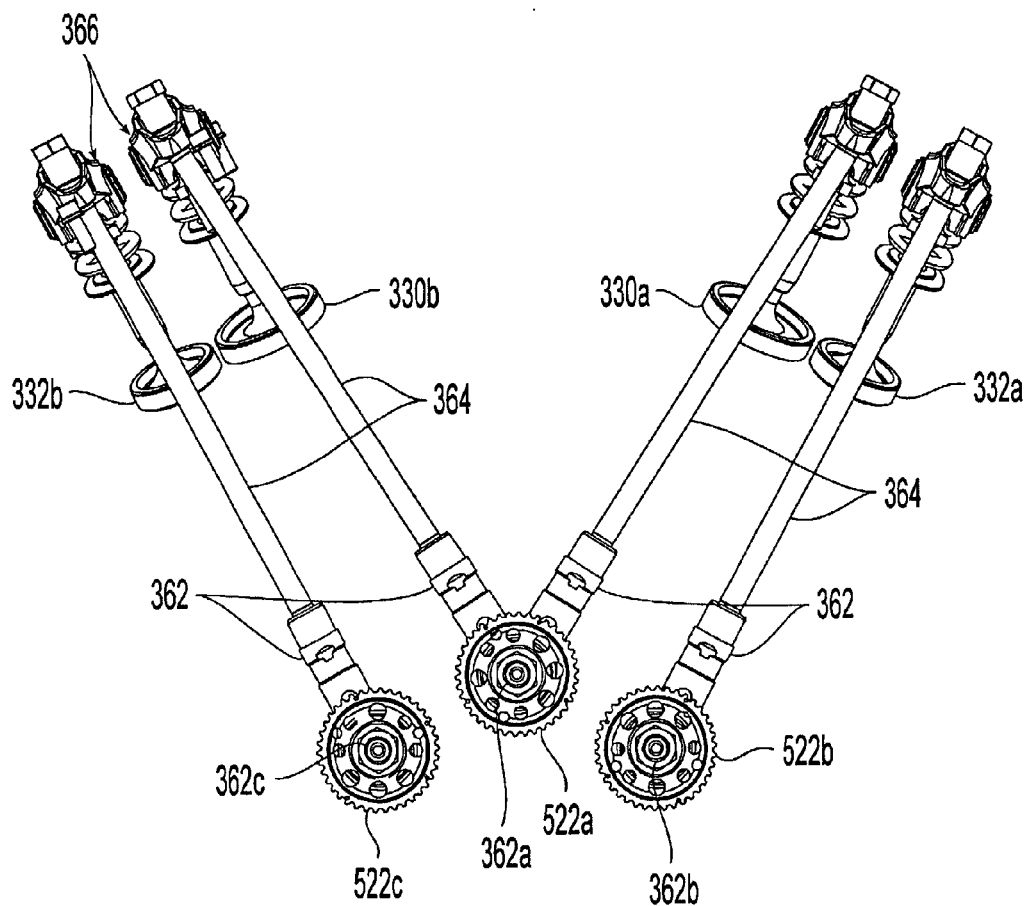
FIG. 24A is a side view of a valve train for a V-configuration internal combustion engine according to a preferred embodiment.
Figure 24B:
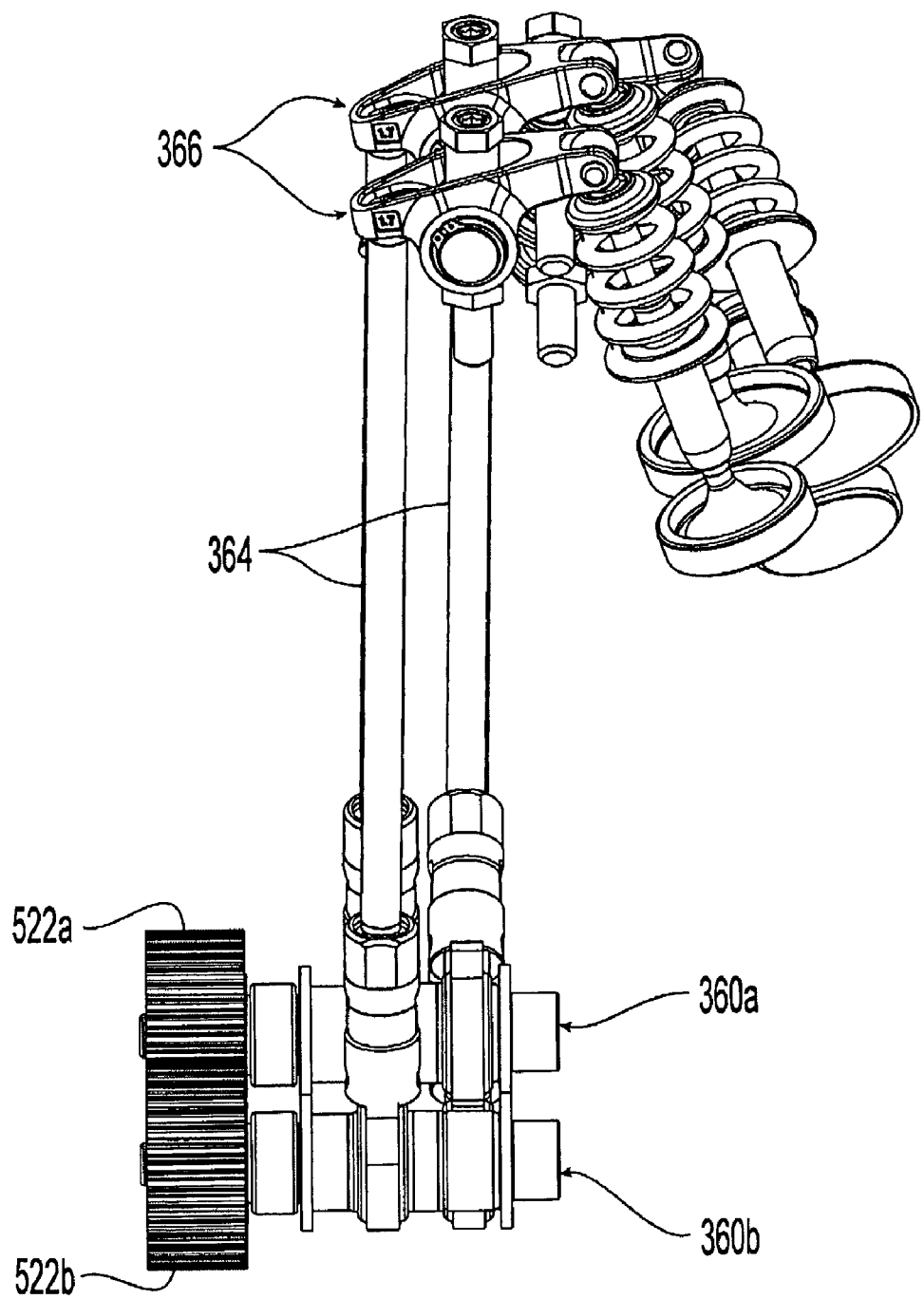
FIG. 24B is a front view of the valve train illustrated in FIG. 24A.

According to preferred embodiments of a tri-camshaft valve train for use in a pushrod V-twin internal combustion engine 300 of a motorcycle 20, two outboard camshafts and one inboard camshaft are disposed in a V-configured engine, a shown in FIGS. 24a-24c. The three camshafts 360a, 360b, 360c force the tappets 362 to force the pushrods 364 to force the rocker arms 366 to force the valves 330, 332 open against the force of the valve return springs 368. Using two outboard camshafts 360a, 360b allows for the associated pushrods 364 to be run at an angle that minimizes energy loss in opening the corresponding valves 332. Using one inboard camshaft for both cylinders 320a, 320b reduces the energy loss in opening the inboard valves 330 by improving the angle of the inboard pushrods 364 as compared to conventional single or twin camshaft engine designs. Energy loss is minimized or reduced by running the pushrods 364 at angles that minimize or reduce the force vector components perpendicular to the center axes of the cylinders 320a, 320b. It is believed that preferred embodiments of the internal combustion engine 300 provide increased net power output, improved durability, and better valve train dynamics.

According to a most preferred embodiment, a pushrod V-twin motorcycle engine having offset cylinders, provides parallel orientation of all of the pushrods with respect to their corresponding cylinder, thereby minimizing or eliminating force vector components of the pushrods that are perpendicular to the central axis of the corresponding cylinder.

Figure 7:
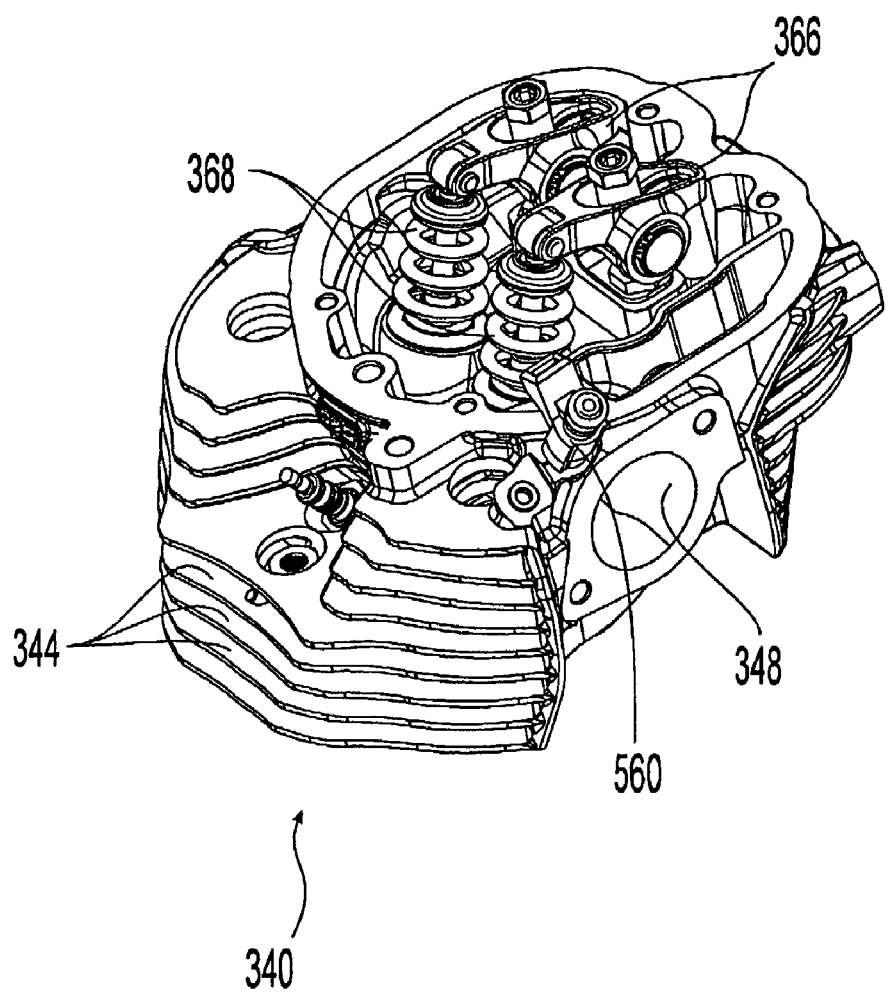
FIG. 7 is an isometric view of a cylinder head assembly for a V-configuration internal combustion engine according to a preferred embodiment.
Figure 8:
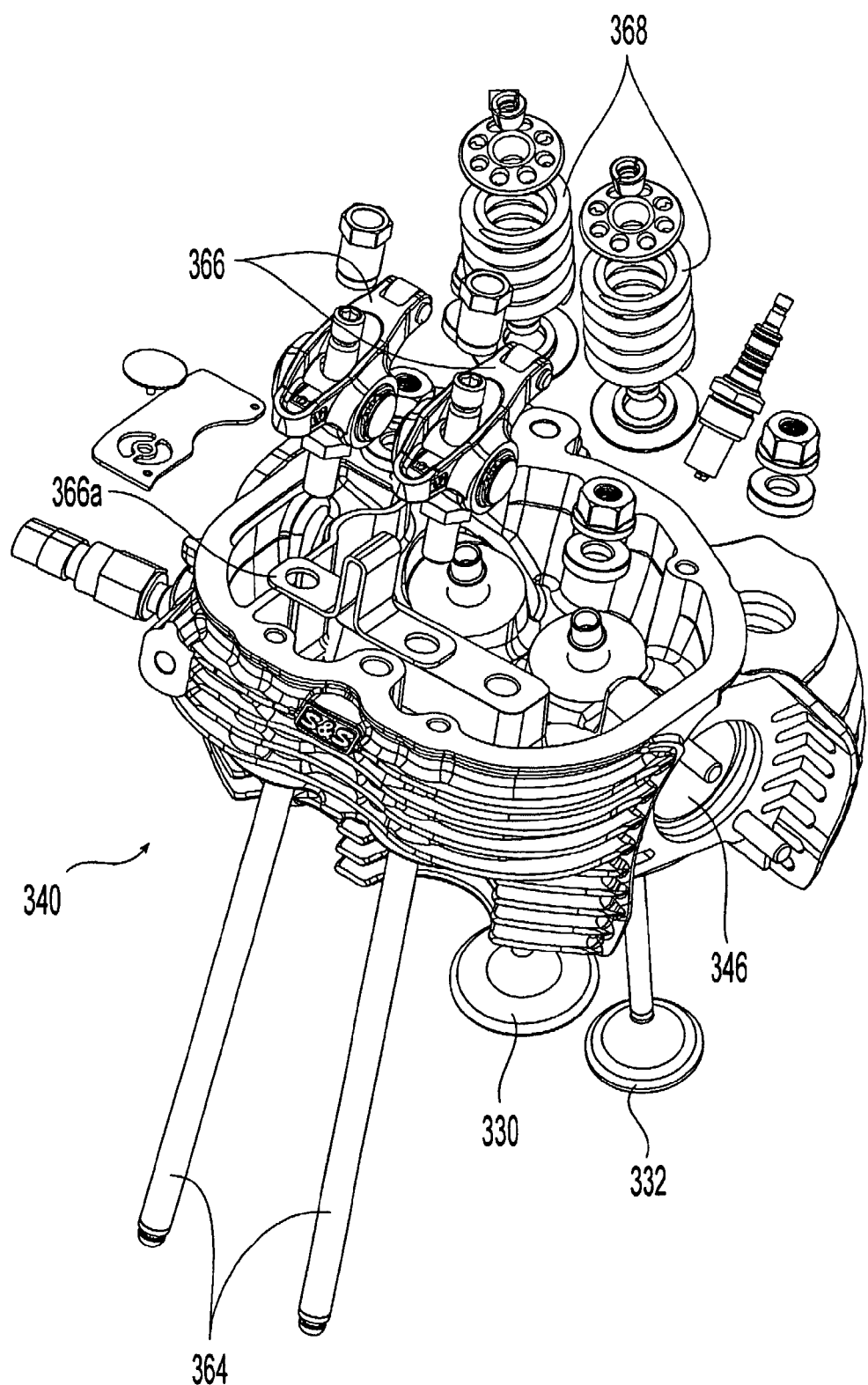
FIG. 8 is an exploded view of the cylinder head assembly illustrated in FIG. 7.
Figure 9:
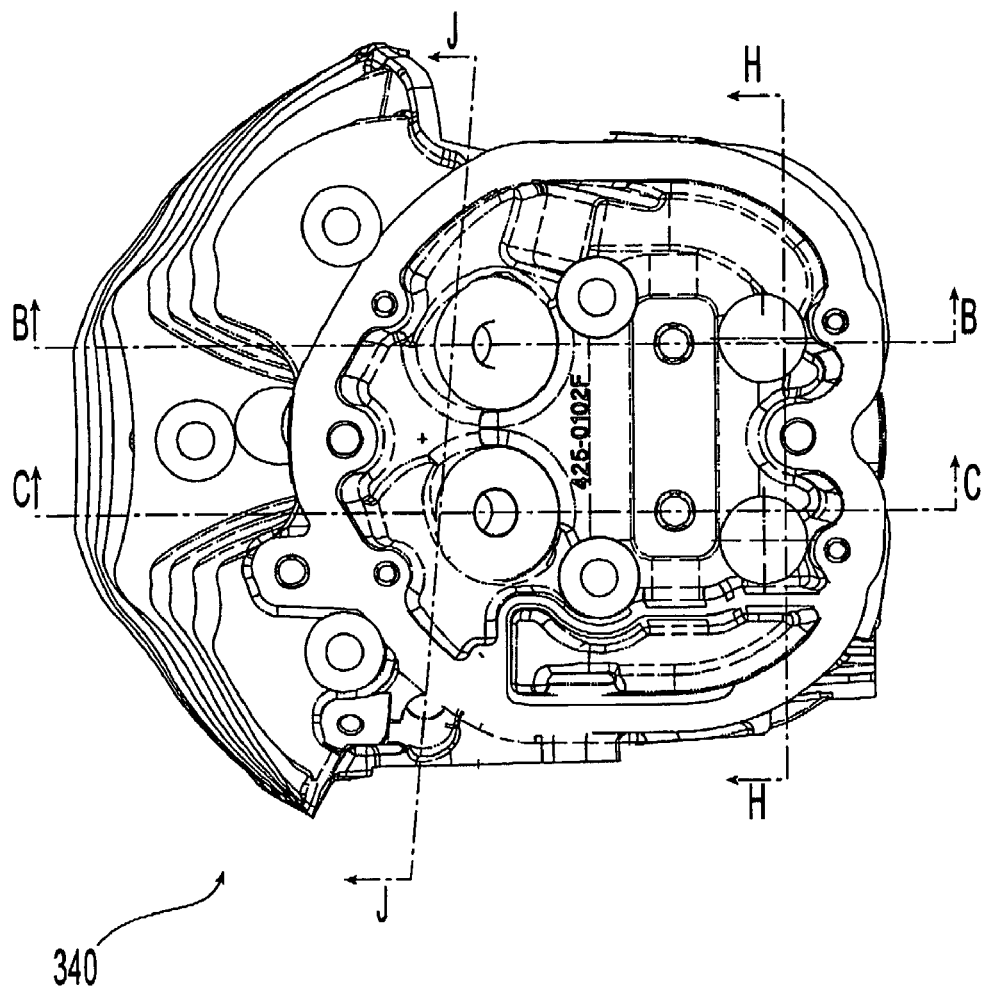
FIG. 9 is a top view of a cylinder head for a V-configuration internal combustion engine according to a preferred embodiment.
Figure 10:
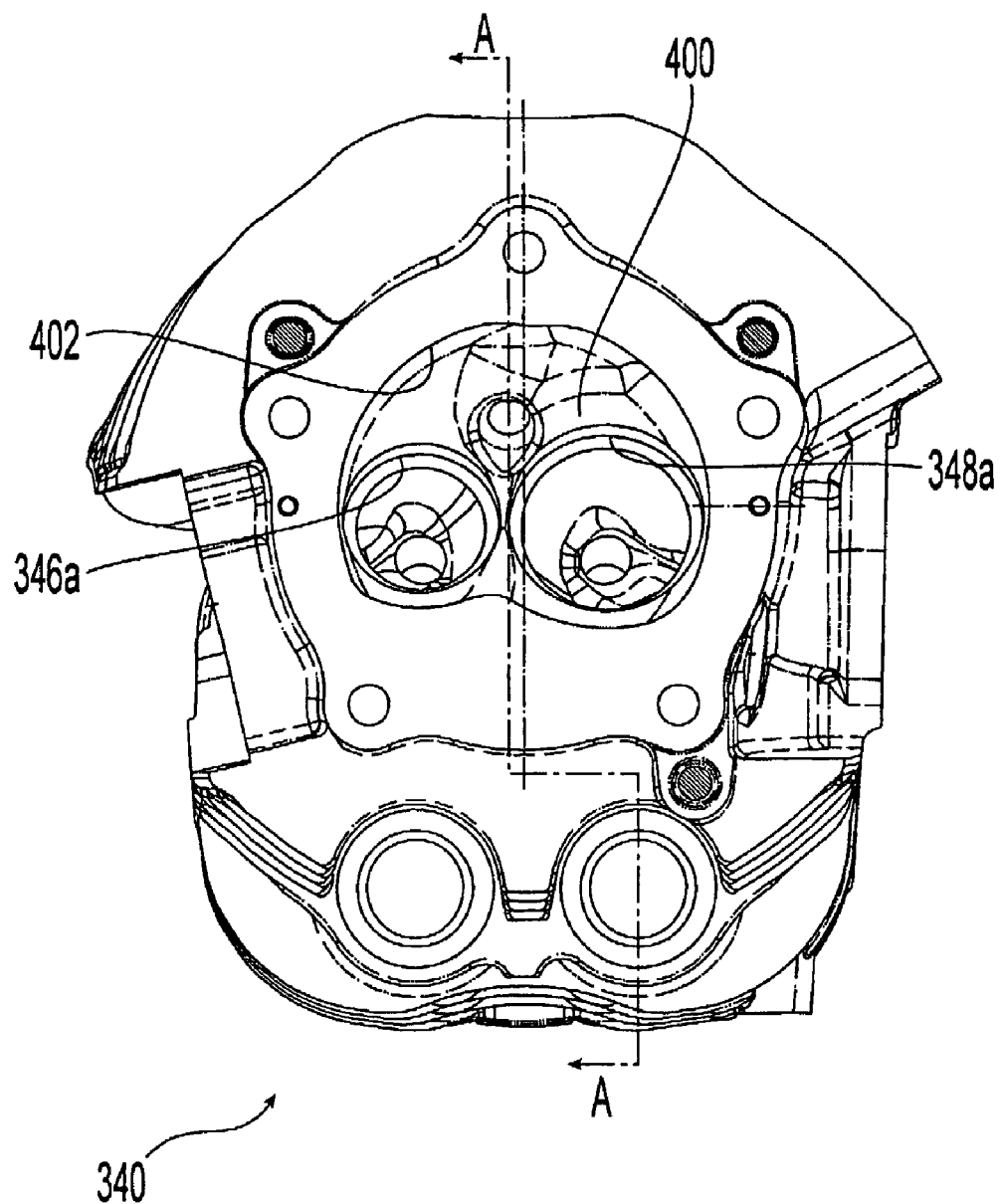
FIG. 10 is a bottom view of the cylinder head illustrated in FIG. 9.
Figure 11:
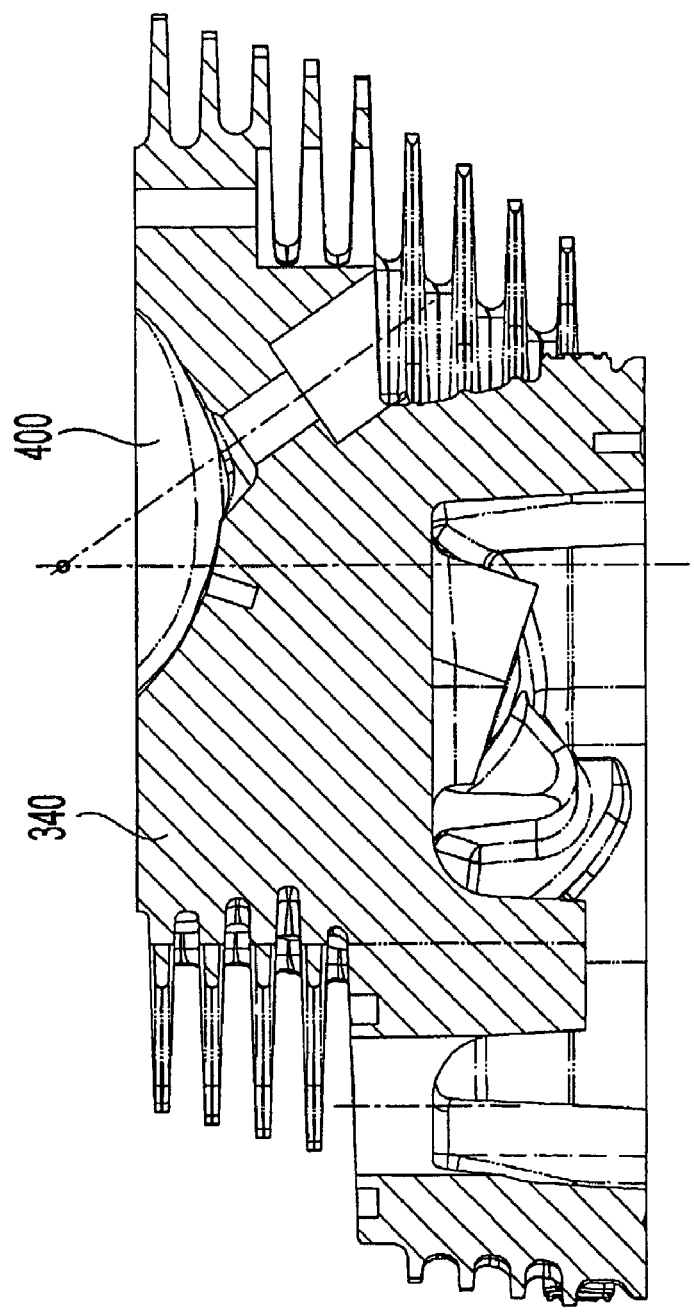
FIG. 11 is a cross section view taken along line A-A in FIG. 10.
Figure 12:
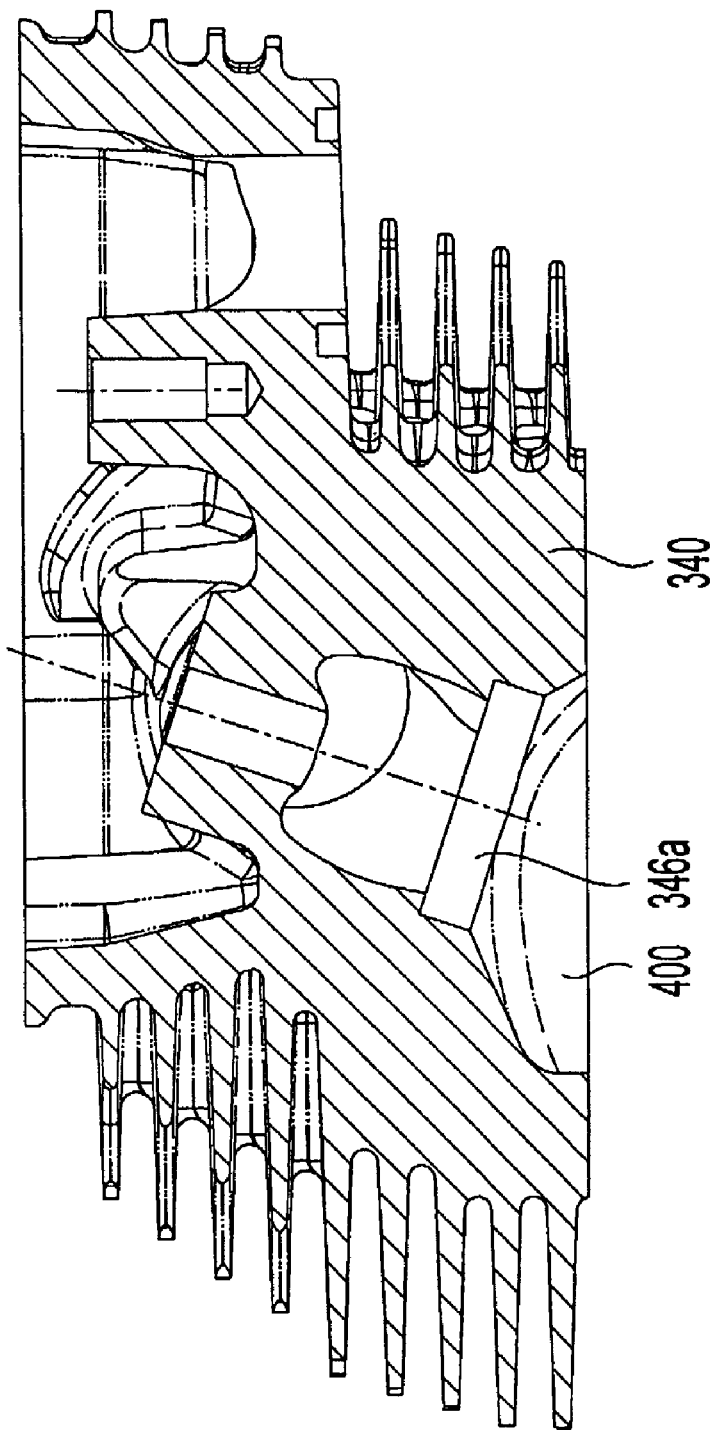
FIG. 12 is a cross section view taken along line B-B in FIG. 9.

According to a preferred embodiment, a tappet cover 362a is secured to the cam-side portion 380a of the crankcase 380 and holds down dowel pins 362b that keep the tappets 362 from rotating. A rocker arm alignment device 366a according to a preferred embodiment maintains the alignment of the rocker arm 366 and prevents rotation of the rocker arms 366 about their studs 366b due to the influence of the pushrods 364. Placing the rocker arm alignment device 366a between adjacent rocker arms 366 holds each rocker arm 366 in place. FIGS. 7 and 8 show a preferred embodiment of the rocker arm alignment device 366a, which is held in place by the rocker studs 366b.

Camshaft Drive

The phrase "camshaft drive," as it is used herein, cumulatively refers to the combination of relatively dynamic features (e.g., belts, belt-pulleys or cogwheels, and idlers) of the internal combustion engine 300 that convey rotation from the power system to the valve train.

Conventional V-twin motorcycle engines use gears or chains to operate the camshafts. These gears or chains create significant undesirable noise, which can be decreased with a belt driven system, and also transfer from the camshafts to the crankshaft a significant amount of harmonics, which can be dampened with the belt driven system. Additionally, lubrication is needed in gear or chain driven systems and creates a wet environment to work in for servicing the system, whereas a belt driven system eliminates the need for lubrication allowing for service to be performed in a dry environment.

Belt Drive Configuration

The system of three camshafts 360a, 360b, 360c according to preferred embodiments can be driven with gears, belts, chains or any combination thereof. There are also various idler pulley and tensioning device positions for belt and chain drive systems.

According to preferred embodiments, a belt drive configuration for an internal combustion engine, especially a motorcycle engine such as a pushrod V-twin engine having three or more camshafts, is low cost, easily manufacturable and produces a minimal amount of noise.

Figure 25:
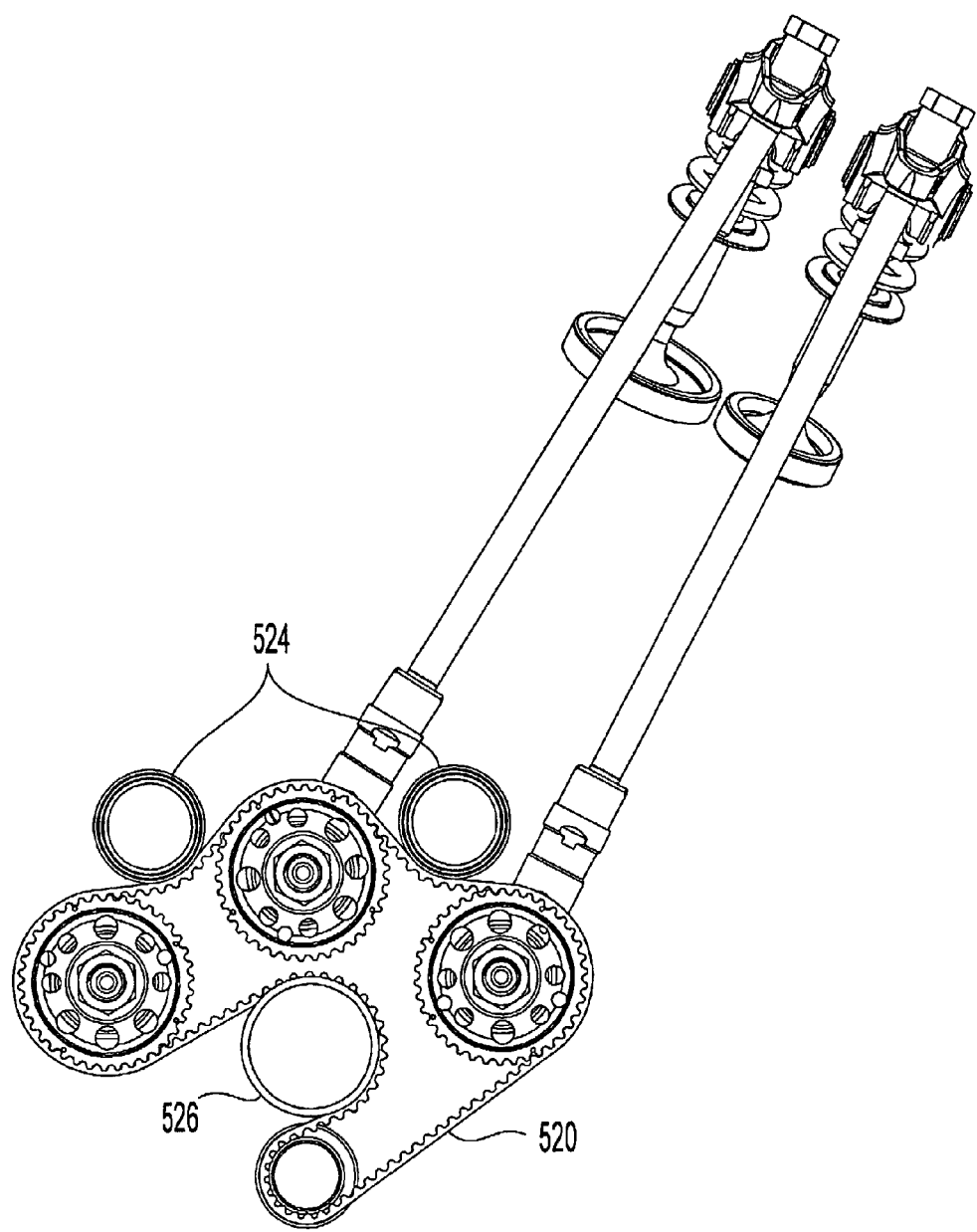
FIG. 25 is a schematic illustration of a camshaft drive system for a V-configuration internal combustion engine according to a preferred embodiment.

Referring to FIG. 25, a timing belt 520 according to a preferred embodiment is provided with at least one idler pulley 524 (preferably at least two idler pulleys are provided) or a rub block and at least one tensioning device 526. A belt drive system according to preferred embodiments has a number of advantages as compared to a gear drive system, including reduced noise and, because the center position locations can be more loosely held, the belt drive system also is easier to manufacture.

Turning the camshafts 360a, 360b, 360c requires torque that is supplied by the crankshaft 350, via the camshaft timing belt 520 and cogwheels 522a, 522b, 522c.

Additionally, one or more idler pulleys 524 and a tensioning device 526 are used with the camshaft timing belt 520. The tensioning device 526 may function automatically or provide a fixed tension setting on the camshaft timing belt 520.

Figure 26:
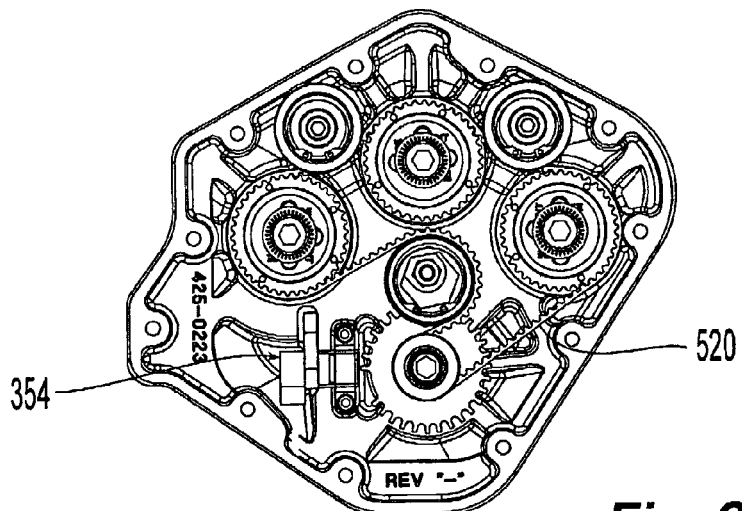
FIG. 26 is a side view of the camshaft drive system illustrated in FIG. 25.
Figure 27A:
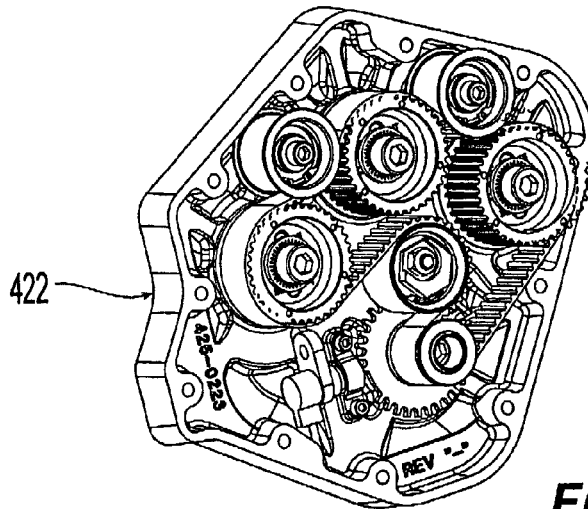
FIG. 27A is a cogwheel-side perspective view of a cam chest intermediate plate for a V-configuration internal combustion engine according to a preferred embodiment.
Figure 27B:
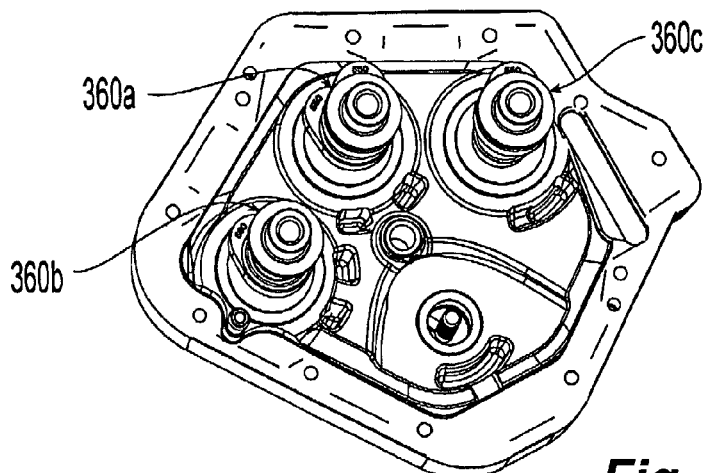
FIG. 27B is a camshaft-side perspective view of the cam chest intermediate plate illustrated in FIG. 27A.

The camshaft timing belt 520 is looped through the pulley system as shown in FIG. 26 allowing for the crankshaft 350 to turn the camshafts 360a, 360b, 360c. The dimensional layout of the camshafts 360a, 360b, 360c to each other and the crankshaft 350 may also allow for fine meshed gears to alternatively be incorporated. Referring to a preferred embodiment illustrated in FIGS. 27a and 27b, the belt drive system and camshafts 360a, 360b, 360c are rotatably supported on the cam chest intermediate plate 422 so to provide easy removal of the whole assembly as a unit, thereby providing improved crankcase access over conventional designs.

According to a preferred embodiment, the belt drive system consists of a timing belt 520, three camshaft cogwheels 522a, 522b, 522c, two idler pulleys 524, a pinion cogwheel 522d fixed to the crankshaft 350 and a tensioning device 526, all of which are supported on the cam chest intermediate plate 422. The timing belt 520 is preferably constructed as a toothed belt and made from rubber, nylon, Kevlar®, carbon or a composite compound. The cogwheels 522a, 522b, 522c, 522d and the cam chest intermediate plate 422 are preferably constructed of a suitable metal or metal alloy, although the cogwheels 522a, 522b, 522c, 522d may also be made of a nylon or composite material. The tensioning device 526 is preferably automatic to allow for size variations in the belt drive system components and engine temperature. Preferably, the tensioning device 526 is made of metal, metal alloy, nylon, composite, or any combination thereof. The cam chest intermediate plate 422 is preferably attached to the cam-side portion 380a of the crankcase 380 directly with fasteners or by sandwiching the cam chest intermediate plate 422 between the cam-side portion 380a and the camshaft drive cover 424. Advantages of belt drive systems according to the preferred embodiments include: 1) quieter operation of the valve train; 2) the cam chest intermediate plate 422 allows for removal of the camshafts as a unit thereby providing improved access to the crankcase 380; and 3) a more lenient tolerance of components than that of a gear drive system.

Induction System

The phrase "induction system," as it is used herein, cumulatively refers to the combination of static and dynamic features (e.g., intake manifold, throttle body, and fuel injectors) that prepare and supply charges of combustion components to the internal combustion engine 300.

A known V-twin motorcycle engine uses a short, direct intake manifold with an air box positioned upstream from the intake manifold. This results in significant undesirable noise transmission that is reduced by a baffling system according to preferred embodiments. A known V-twin motorcycle engine fitted with fuel injection has a throttle body that is a separate piece from the intake manifold. According to preferred embodiments, a throttle body is integrated in a single piece with the intake manifold.

Air Intake System

Figure 28:
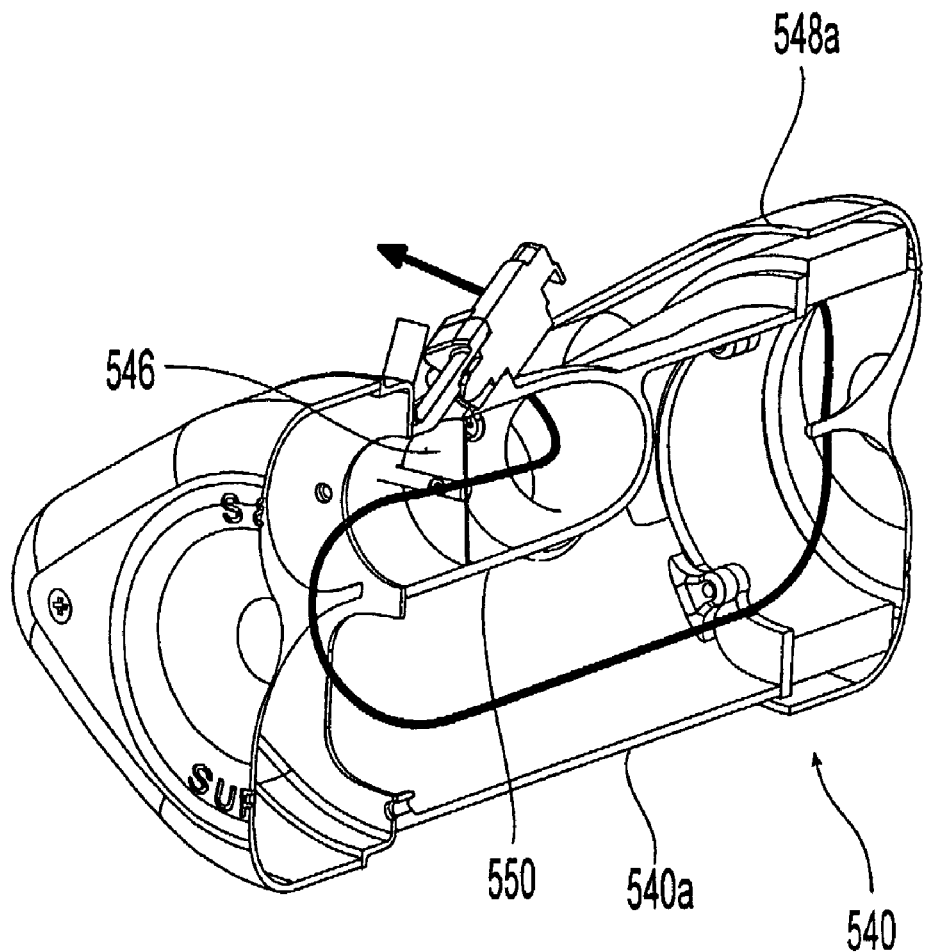
FIG. 28 is a cross section view of an induction system for a V-configuration internal combustion engine according to a preferred embodiment.

A preferred embodiment of an air intake system 540 includes two or more air passages 542a and 542b that draw air from multiple sides of the internal combustion engine 300. In particular, a preferred embodiment provides an intake system 540 of a V-twin internal combustion engine 300 that is easily packaged and limits the amount of intake noise that is transmitted from the air intake system 540. The air intake system 540 can also provide air passages 542a, 542b that share a common wall(s) with a throttle body 544. Such an air intake system 540 may also combine an intake manifold 540a, the air passages 542a, 542b and the throttle body 544 into a single piece. Additionally, preferred embodiments of an air intake system 540 can draw air from either or both sides of the internal combustion engine 300. Preferably, the air passages 542a, 542b define a relatively long and torturous path through which noise must travel before it can leave the intake manifold 540a. Preferred embodiments of air intake systems 540 that include dual side intakes can also have a butterfly valve 546 that provides a direct path to the throttle body 544 for maximum performance. A preferred embodiment of the butterfly valve 546 can be controlled electronically or by intake vacuum. FIG. 28 shows an air intake system 540 according to a preferred embodiment with air entering on the left side and passing around the throttle body 544. An air intake system 540 according to another preferred embodiment includes dual side intakes.

Preferred embodiments of an air intake system 540, particularly for a V-twin motorcycle engine, include an intake manifold 540a that allows air to be drawn from one or more locations and directed to the cylinder heads 340a, 340b. This allows for lower pressure drops across an air inlet 548a, 548b, while minimizing noise transmitted in the air intake system 540. The intake manifold 540a according to the preferred embodiments is easily packaged and limits the amount of noise created by the air intake system 540.

A preferred embodiment of an air intake system 540 provides air for combustion in the internal combustion engine 300. Typically, there is significant noise caused by the flow or air though the air intake system 540, in general, and the intake manifold 540a, in particular. According to preferred embodiments, baffles 550 within the intake manifold 540a lower noise due to airflow in the air intake system 540. In particular, beginning at mating surfaces with air inlets 548a and 548b, the intake manifold 540a includes the throttle body 544 and one or more baffles 550, which run to mating surfaces with the cylinder heads 340a, 340b. The baffles 550 can optionally be sealed from ambient air. If the baffles 550 are sealed from ambient air, air enters the intake manifold 540a from a single location. If the baffles 550 are not sealed from ambient air, then a second air inlet 548a, 548b, an additional throttle body 544, or both can provide a decrease in the pressure drop from ambient air to the mating surfaces with the cylinder heads 340. In the latter case, air enters the intake manifold 540a from two or more locations. The additional throttle body 544 can be controlled electronically or by intake vacuum. The intake manifold 540a can be specifically designed to be disposed in the V-angle between the cylinder heads 340a, 340b without hindering access to any other parts of the internal combustion engine 300 that would otherwise normally be exposed. Preferably, the air passages 542a, 542b that are incorporated into the intake manifold 540a can share a common wall(s) with the throttle body 544 and/or each other. The intake manifold 540a is preferably constructed from a suitable metal, metal alloy or composite material, and it may be cast, forged or machined from stock.

According to preferred embodiments of the air intake system 540, particularly for a V-twin motorcycle engine, the intake manifold 540a attaches to the cylinder heads 340a, 340b using flanges that are either part of the manifold or individual pieces.

Direct Mounting of a Fuel Injector to the Cylinder Head

Preferred embodiments can also mount a fuel injector 560 on or within each of the cylinder heads 340a, 340b, such as a motorcycle cylinder head. In particular, each of the cylinder heads 340a, 340b is provided with a corresponding fuel injector 560 mounted directly thereon or therein. It is believed that mounting the fuel injectors 560 on or in the cylinder heads 340a, 340b provides more precise aiming of the fuel injectors 560 and simplifies the overall machining requirements for engine fabrication. In conventional engines, the fuel injectors (if provided) are typically mounted on the intake manifold. Moving the fuel injector mounting structure from the intake manifold 540a, which may not otherwise need to be machined, to the cylinder heads, which already require machining, can eliminates the need for an additional machining operation, i.e., on the intake manifold 540a, thereby reducing the complexity and fabrication cost of the intake manifold 540a and the internal combustion engine 300. Many known cylinder heads already require complex machining, and as such, adding a fuel injector mounting structure does not significantly increase the fabrication costs of the cylinder heads. Moreover, according to a preferred embodiment, a mounting structure 562, which can be a hole, threaded hole, flat pad, etc., for the fuel injectors 560 can be located at standard cylinder head machining centers, which further reduces the minimal added cost of fabricating on a cylinder heads 340 the mounting structure for a fuel injector 560.

The mounting structure 562 is preferably located adjacent to the intake port 348 of the cylinder head 340, and the fuel injector 560 is secured with the mounting structure 562. According to the preferred embodiments, the fuel injector 560 discharges fuel into the air stream that flows toward the intake valve 330 and into the cylinder 320.

Engine Control Unit Mounting

Figure 29:
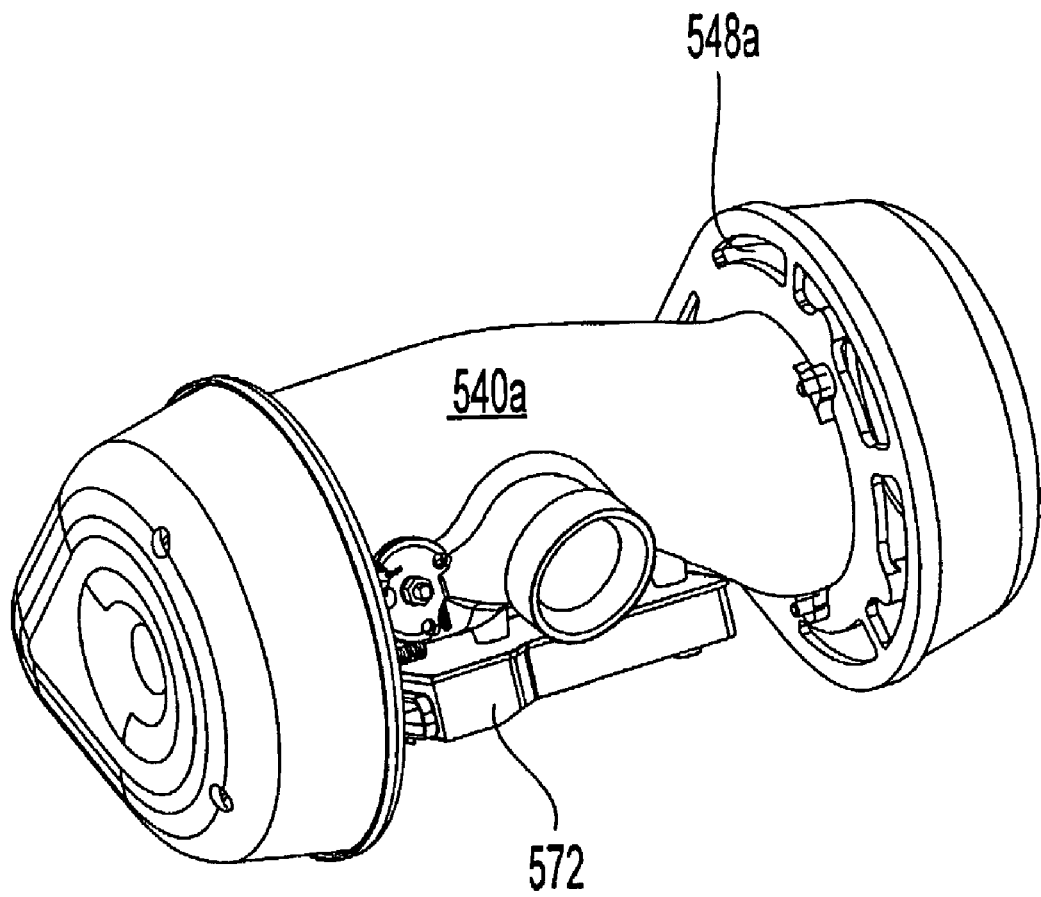
FIG. 29 is an isometric view of an engine control unit mounted to an intake manifold for a V-configuration internal combustion engine according to a preferred embodiment.
Figure 30:
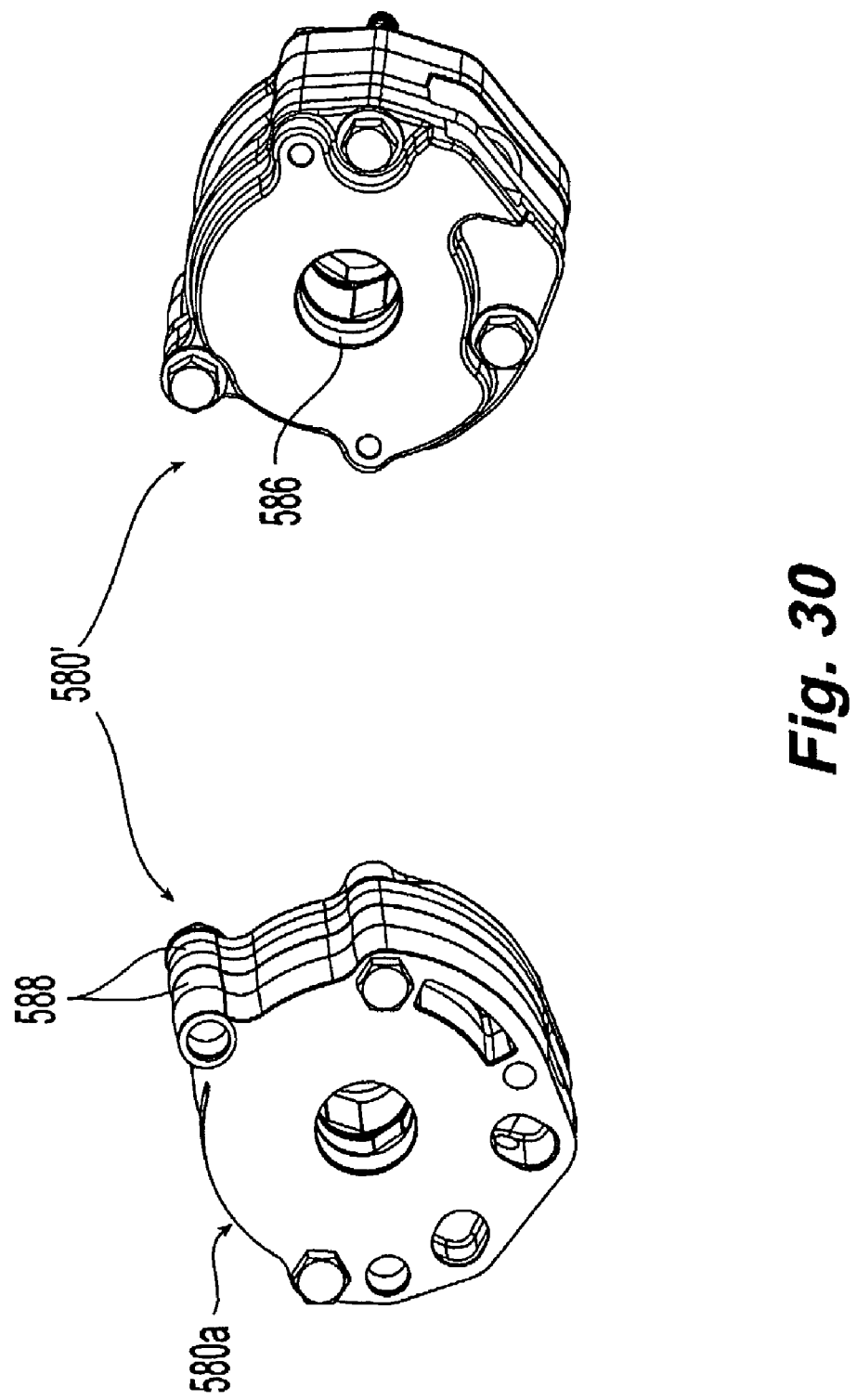
FIG. 30 includes (front and rear) isometric views of a housing of an oil pump for a V-configuration internal combustion engine according to a preferred embodiment.
Figure 31:
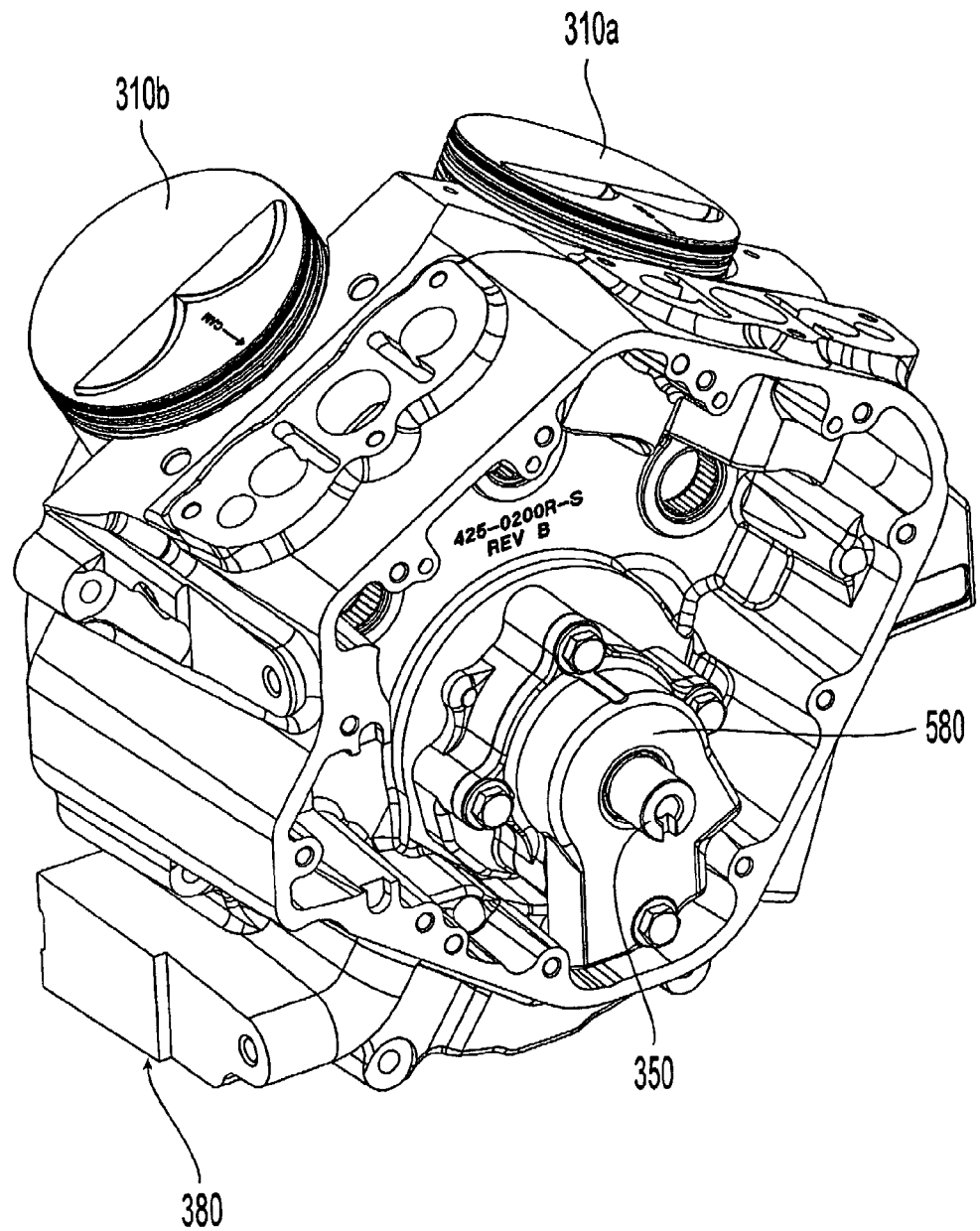
FIG. 31 is an isometric view of a lubrication system oil pump for a V-configuration internal combustion engine according to a preferred embodiment.

Referring to FIG. 29, preferred embodiments include providing an engine control unit mount 570 on an intake manifold 540a, such as the intake manifold 540a of the internal combustion engine 300 for a motorcycle 20. Mounting an engine control unit 572 to the intake manifold 540a reduces wiring on the motorcycle 20 because many of the sensors, e.g., air temperature, throttle opening, etc., that supply information to the engine control unit 572 are located in the vicinity of the intake manifold 540a. Additionally, mounting the engine control unit 572 to the intake manifold 540a makes the engine control unit 572 an integral part of the internal combustion engine package, thereby making engine installation more turnkey. The engine control unit 572 can be mounted to the bottom of the intake manifold 540*a*, but the particular location and orientation of the engine control unit 572 with respect to the intake manifold 540*a* can vary, e.g., in accordance with packaging requirements for the internal combustion engine 300. It is also envisioned that the engine control unit 572 could be mounted inside the intake manifold 540*a* such that the structure of the intake manifold 540*a* could shield the engine control unit 572 from ambient conditions exiting outside the intake manifold 540*a*.

Air Inlet Covers

According to a preferred embodiment, the air inlets 548*a* and 548*b*, which can be disposed on either or both sides of the internal combustion engine 300, include a substantially teardrop shape.

Alternatively, the air inlet 548*a* can be disposed on one side of the internal combustion engine 300, and an air box having a substantially similar appearance as the air inlet 548*a* can be disposed on the other side of the internal combustion engine 300.

Lubrication System

The phrase "lubrication system," as it is used herein, cumulatively refers to the combination of features (e.g., oil pump, oil filter, and oil flow passages) that facilitate reduction of friction at interfaces between relatively dynamic and static features of the internal combustion engine 300.

Oil Pump Design and Method of Delivering Oil

According to a preferred embodiment, an oil pump 580 pressurizes a lubricant, e.g., oil, synthetic oil, etc. for dispersement at the interfaces between the relatively dynamic and static features of the internal combustion engine 300, and particularly a V-twin internal combustion engine of a motorcycle 20.

A known motorcycle engine includes holes drilled in the cylinder heads and crankcase to provide a path for lubricant to return to the sump. It is believed that drilled holes increase the cost and complexity of manufacturing the cylinder heads and crankcase. As such, a need exists for an improved oil passage.

According to a preferred embodiment, a lubrication system includes the oil pump 580 installed over the crankshaft 350; oil passages 582 disposed within a housing 580*a* of the oil pump 580; a scavenge port 584 disposed on the bottom of the pump housing 580*a*; and gear rotors 586 and separator plates 588 of the oil pump 580.

According to a preferred embodiment, the oil pump 580 distributes via supply passages 590*a*, 590*b* and 590*c* pressurized lubricant as required throughout the internal combustion engine 300, and collects via return passages lubricant to be recirculated by the oil pump 580. Preferably, the supply 590*a*, 590*b*, 590*c* and return passages deliver lubricant between the cylinder heads 320 and a sump in the crankcase 380.

Figure 32A:
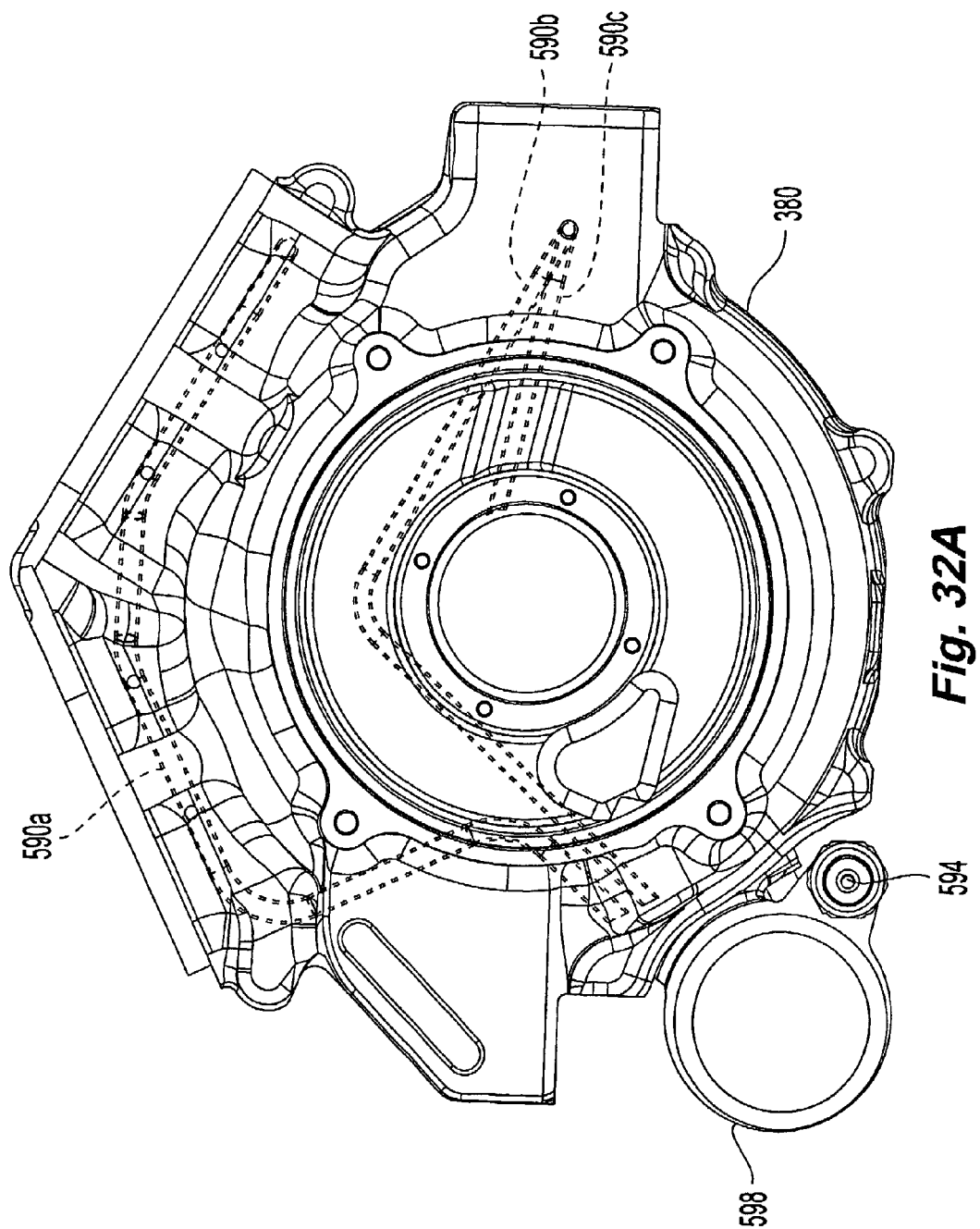
FIG. 32A is a hidden line plan view of lubricant supply passages that are cast into a crankcase for a V-configuration internal combustion engine according to a preferred embodiment.
Figure 32B:
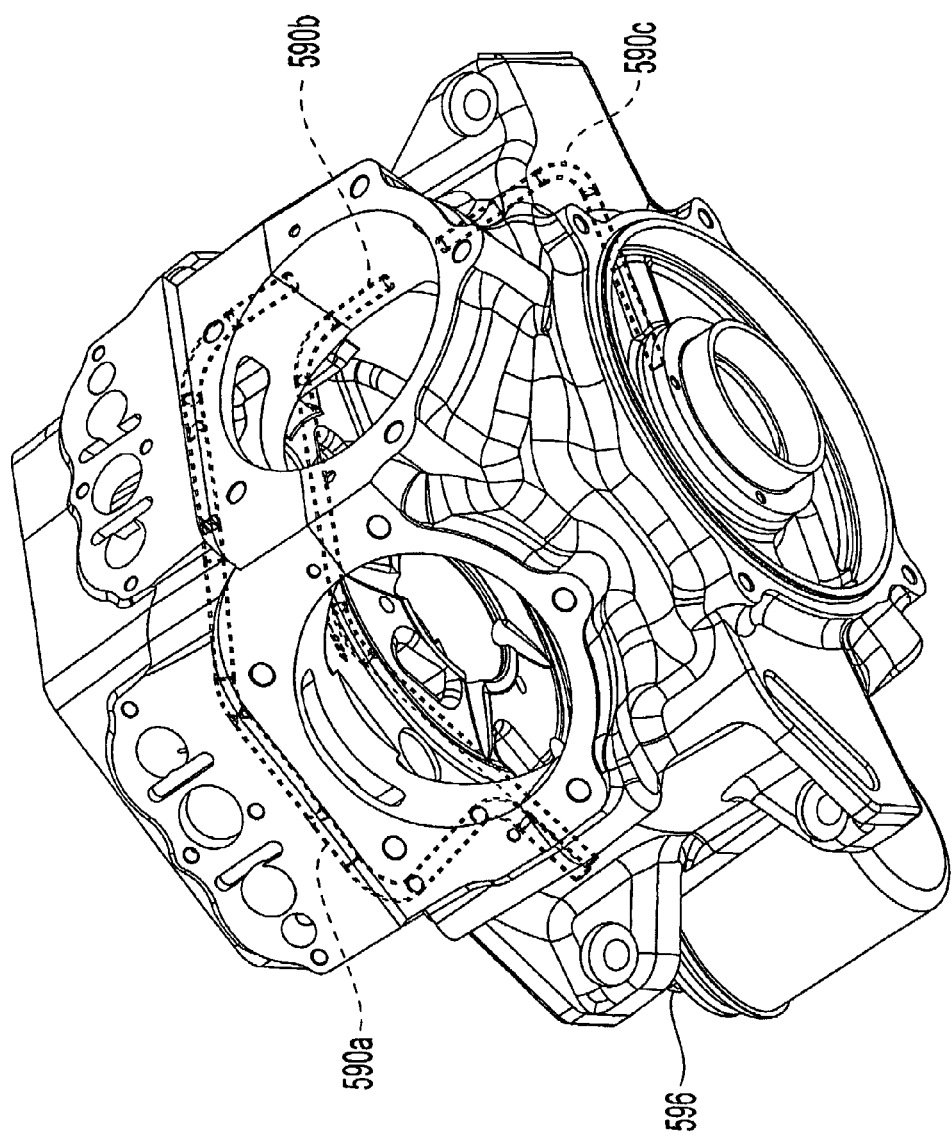
FIG. 32B is a hidden line perspective view of the lubricant supply passages shown in FIG. 32A.

According to a preferred embodiment, the supply passages 590*a*, 590*b*, 590*c* are cast into the crankcase 380. If is believed that casting the supply passages 590*a*, 590*b*, 590*c* in the crankcase 380 reduces drilling operations and reduces or eliminates the need for external plugs that are necessary in a known lubrication system that uses drilled passages. FIGS. 32*a* and 32*b* show the supply passages 590*a*, 590*b*, 590*c*, which are preferably steel, cast into the cam-side portion 380*a* of the crankcase 380.

Alternatively, in lieu of in-casting all three of the supply passages 590*a*, 590*b*, 590*c*, the supply passage 590*c* can be drilled and the other two supply passages 590*a*, 590*b* remain in-cast. Insofar as the supply passage 590*c* extends linearly for only a short distance, drilling the supply passage 590*c* can be more cost effective.

Also, the other two supply passages 590*a*, 590*b* can be simplified by reducing the number of bends along their length.

Oil Pump Attached to the Crankcase

According to an alternate preferred embodiment of the oil pump 580' for the internal combustion engine 300, the oil pump 580' is supported with respect to the crankcase 380 by an oil pump mount 386 that provides a small tolerance stack-up in a location where there is minimal deflection of the crankshaft 350. For example, the oil pump 580' is preferably mounted on or attached to the crankcase 380 such that the oil pump 580' is disposed relatively close to the main bearing assembly 410. The oil pump mount 386 is believed to reduce position tolerance problems caused by a known mounting structure that supports an oil pump assembly on a camshaft support plate. The oil pump 580' can be supported via the oil pump mount 386 on the crankcase 380.

Mount for an Oil Pressure Sensing Unit and an Oil Filter

Figure 33:
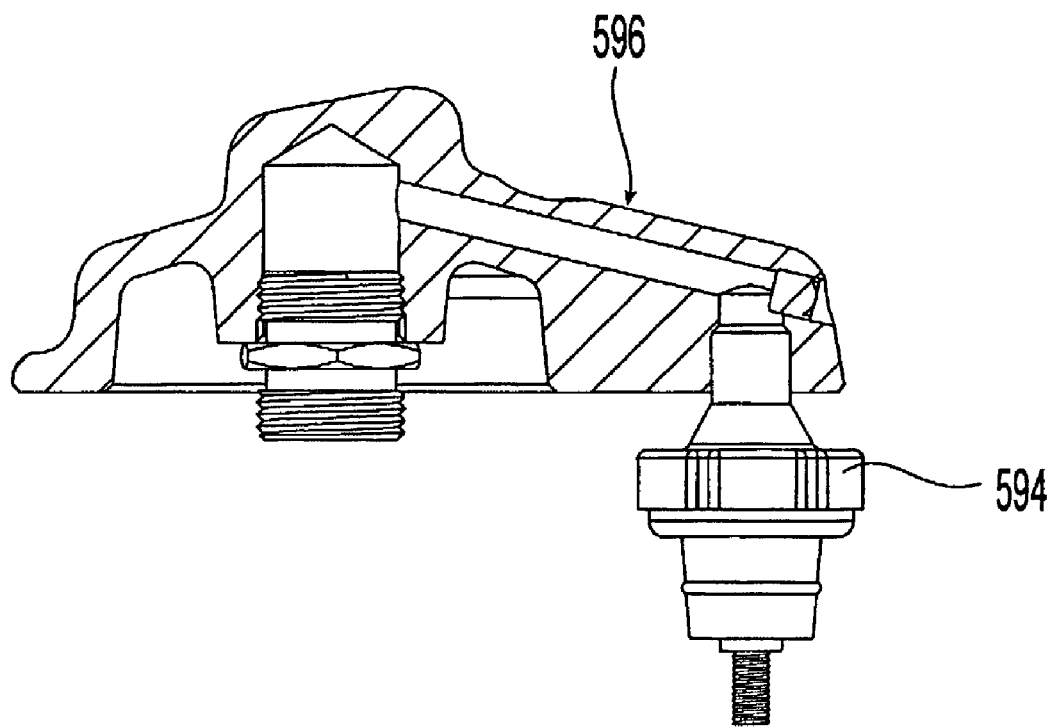
FIG. 33 is a partial cross section view of an oil filter mount and oil pressure sending unit for a V-configuration internal combustion engine according to a preferred embodiment.

FIG. 33 shows a preferred embodiment of an oil pressure-sensing unit 594 (also called "oil pressure sensor) this positioned on or near a filter mount 596 for an oil filter 598. Preferably, the filter mount 596 arranges the oil pressure sensor 594 in a substantially parallel orientation with respect to the oil filter 598, thereby simplifying the required machining. Similar to the mounting structure 562, additionally machining the filter mount 596 to accommodate the oil pressure sensor 594 is preferable to machining another part that otherwise would not require machining except to accommodate the oil pressure sensor 594. According to a preferred embodiment, the oil filter 598 is disposed in front of the internal combustion engine 300 and below the front engine mount so as to substantially hide the oil filter 598 from view, and thereby provide a more aesthetically pleasing appearance of the internal combustion engine 300. Further, this location reduces or eliminates oil drippings onto either the front engine mount and/or electrical components in the vicinity of the front engine mount. As compared to an oil filter mounting location on a known engine, the location for mounting the oil filter 598, which is rotated down and back, provides improved access to the bolts for the front engine mount.

Pushrod Tubes Providing Oil Return Passages

Figure 34:
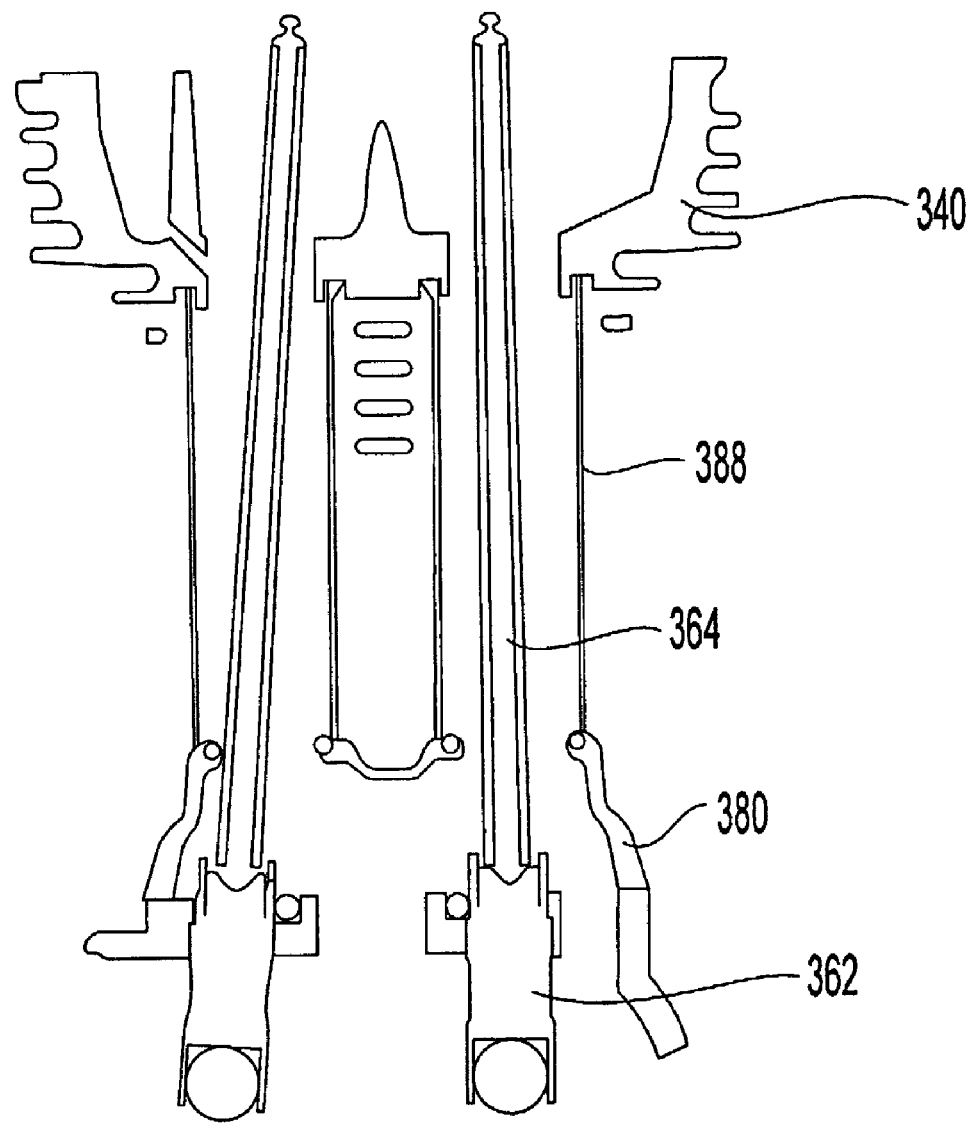
FIG. 34 is a schematic illustration of pushrod tubes for a V-configuration internal combustion engine according to a preferred embodiment.

According to a preferred embodiment, the return passages can include the pushrod tubes 388. The pushrod tubes 388 can be used in conjunction with or as alternatives to drilling holes in the crankcase 380, as was previously described with respect to the supply passages 590*a*, 590*b*, 590*c*. If the pushrod tubes 388 are used without the drilled holes, the cost and complexity of manufacturing the cylinder heads 340 and/or the crankcase 380 can be reduced. One or more pushrod tubes 388, which may be oversized in comparison to traditional pushrod tubes, provide additional area around the pushrods 364 for the passage of oil or air. FIG. 34 shows the internal combustion engine 300 including pushrod tubes 388 for returning oil to the sump in the crankcase 380. According to a preferred embodiment, O-rings seal the pushrod tubes 388 with respect to the crankcase 380 and cylinder head 340.

Reed Valve Flapper Position, Size and Function

Figure 35:
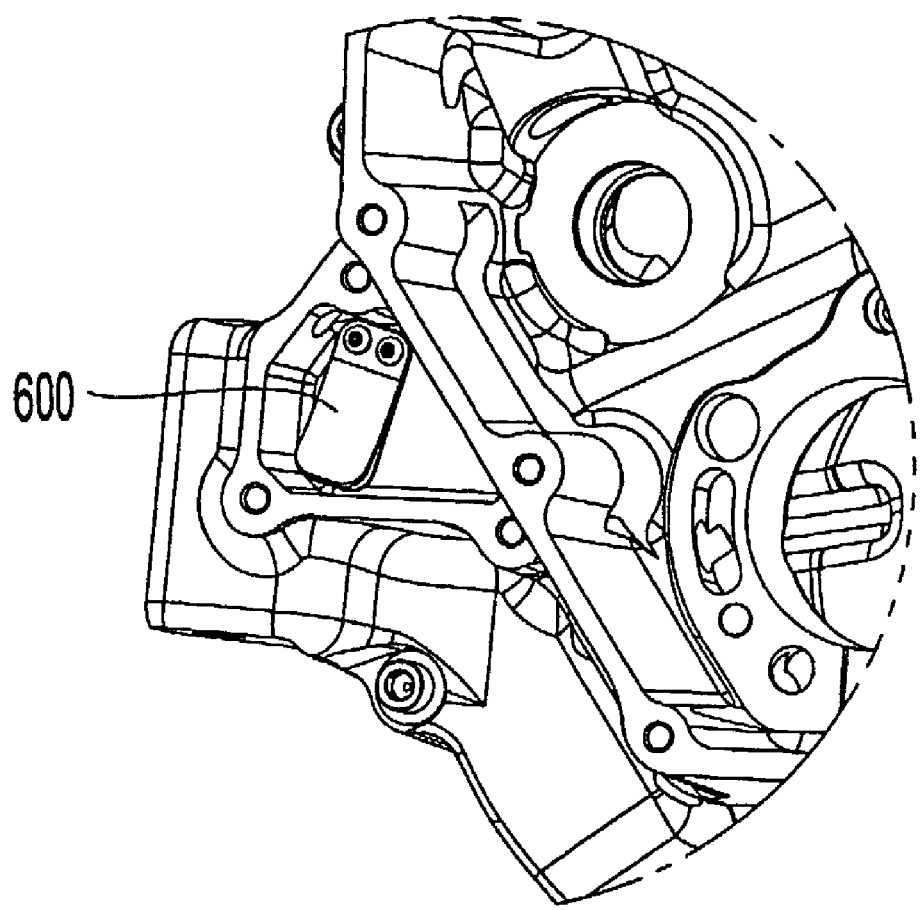
FIG. 35 is an isometric view of a reed valve for a V-configuration internal combustion engine according to a preferred embodiment.

FIG. 35 shows a preferred embodiment for the location and mounting of a crankcase reed valve configuration 600 for removing oil from a flywheel cavity 602 using airflow and pressure created by virtue of the reed valve assembly 600 separating a cam chest 420 from the flywheel cavity 602. The oil is then scavenged out of a cam chest 420 by the oil pump 580. According to a first preferred embodiment, the reed valve assembly 600 includes four reed valves mounted on a reed cage. The reed cage is then pressed into the crankcase 380 inside the cam chest 420. A single screw can be installed to stop the reed cage from rotating with respect to the crankcase 380. According to a second preferred embodiment, the pressed-in reed cage, and two of the four reed valves, are eliminated. And according to a third preferred embodiment, the two reed valves are condensed into one, wider reed valve and two holding screws are provided to stop the single reed valve from rotating.

Preferably, the shape of the cam chest 420 changes for the different configurations of the reed valve assembly. For example, a separate compartment can be provided with the reed valve(s) mounted inside, or the pocket height can be varied with respect to the cam chest 420 so as to provide a smaller, symmetric cam chest 420.

Vehicles Including an Internal Combustion Engine

Vehicles 1 according to preferred embodiments include a chassis 3 and a propulsion system 5 driving the vehicle 1. Preferably, the chassis 3 provides a platform that is suitable for an intended environment (e.g., land, air, water, etc.) and may support an operator, and the propulsion system 5 includes an internal combustion engine 10, a transmission 12 (e.g., providing one or more engine speed changing ratios), and an output device 14. Examples of vehicle types using propulsion systems according to the preferred embodiments may include motorcycles, all terrain vehicles, utility vehicles, riding lawn mowers, passenger cars, cargo tracks, snowmobiles, half-tracks, tracked vehicles, amphibious vehicles, personal watercraft, boats, and light-sport aircraft such as an ultralight.

Figure 36A:
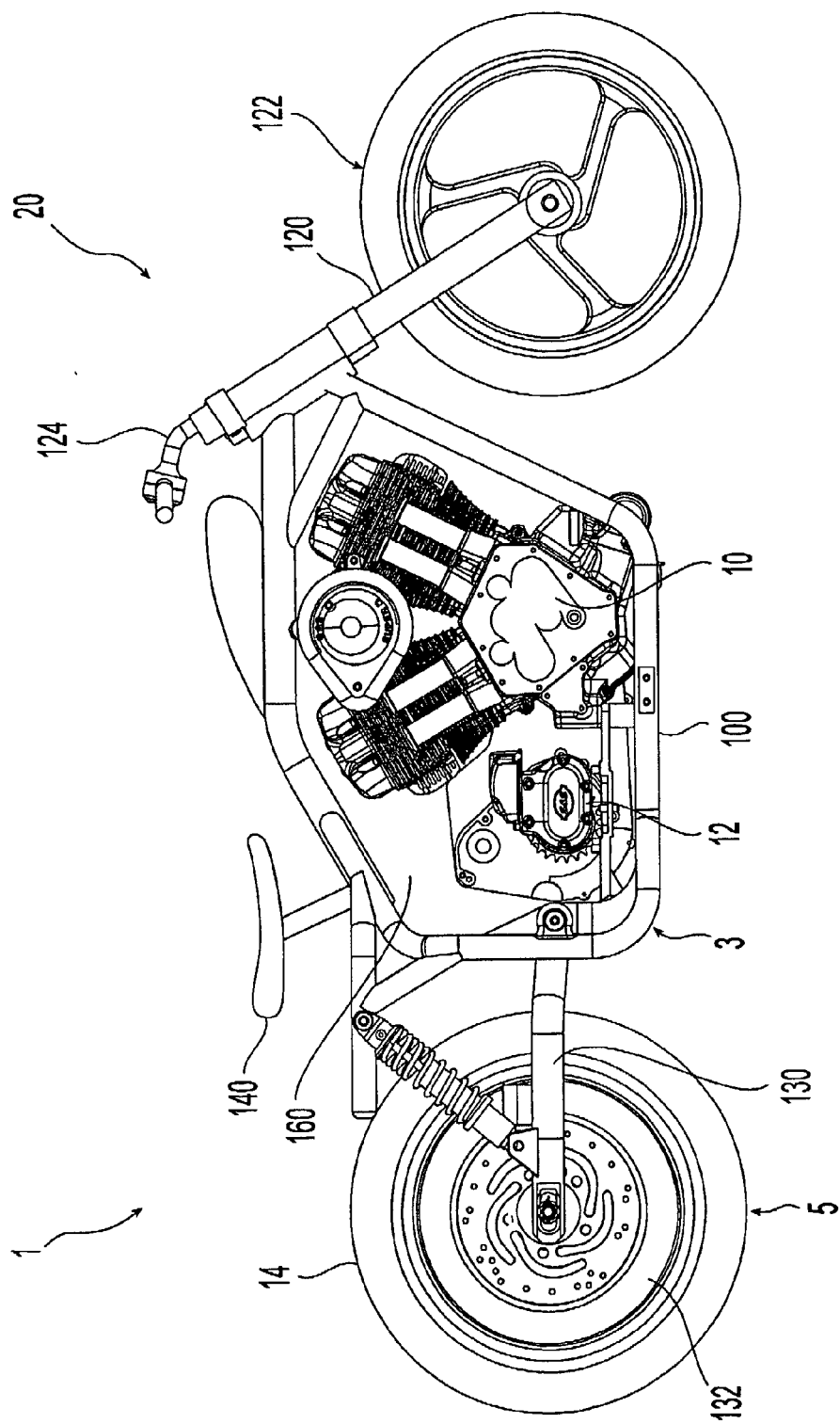
FIGS. 36A and 36B are opposite side views of a motorcycle including a V-configuration internal combustion engine according to a preferred embodiment.
Figure 36B:
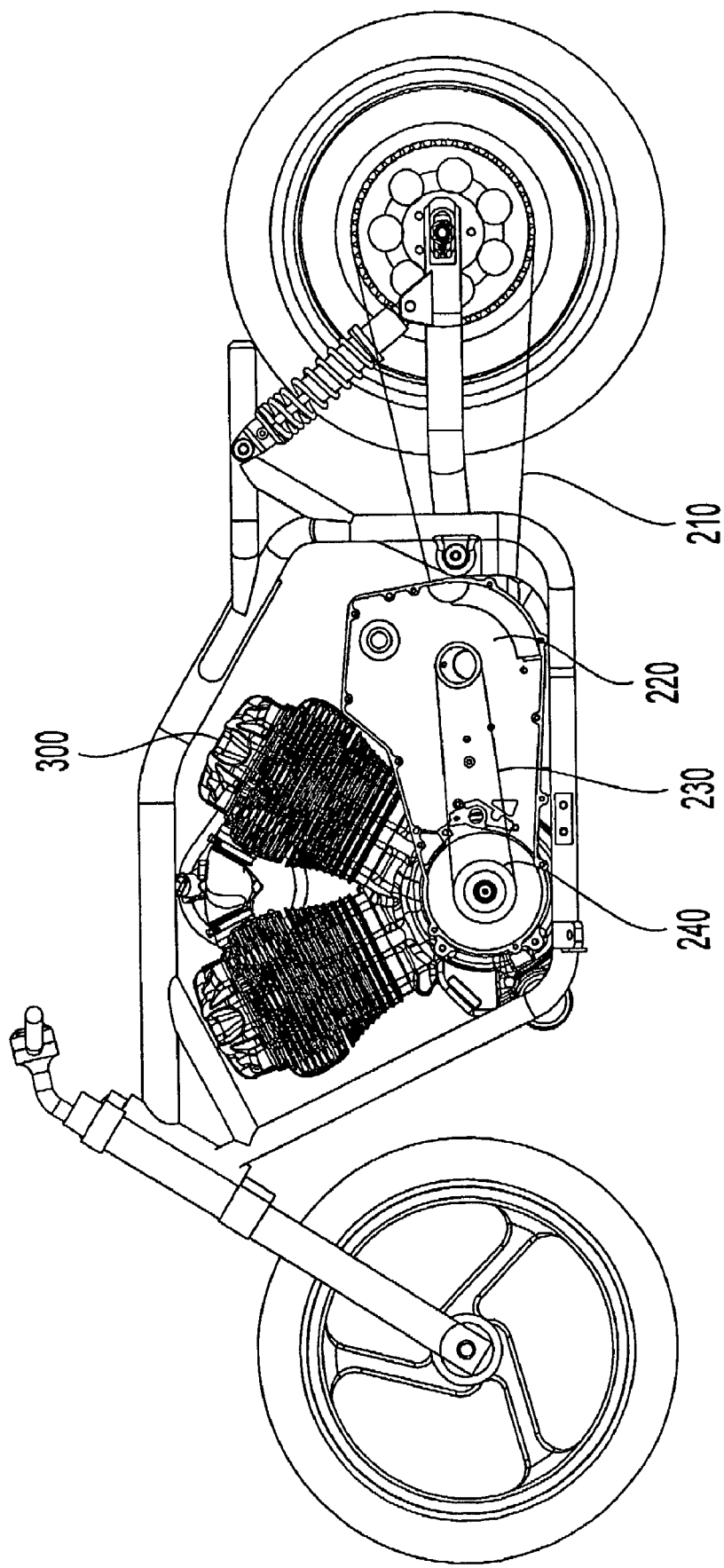

Classification as a particular type of vehicle 1 may be made on the basis of characteristics such as the nature of how the chassis 3 receives the operator (e.g., operator rides-on, operator is enclosed within, etc.), the control interface between the vehicle 1 and the operator (e.g., handle bars versus steering wheel, accelerator pedal versus twist grip, etc.), and the interaction of the output device 14 with the intended operating environment (e.g., one or more ground-engaging driven wheel(s), traction belt, propeller, etc.). Referring to FIGS. 36*a* and 36*b*, various features and advantages of the present invention will now be explained with respect to the motorcycle 20, but are also applicable to the other types of the vehicle 1.

The motorcycle 20 preferably includes a frame 100, a fork 120 supporting a front wheel 122, a swing arm 130 supporting a rear wheel 132, a seat 140, a fuel tank 150, an oil tank 160 and a power train.

The fork 120 is pivotally supported with respect to the frame 100 and connected with a set of handlebars 124 for steering the motorcycle 1. The rear wheel 132 is driven by the power train. The seat 140 provides support for the operator, and tanks 150, 160 supply fuel and oil to the power train.

The power train conveys rotation to the rear wheel 132 via a secondary 210 driven by the output of a transmission 220. The secondary 210 may include a chain drive secondary, a shaft drive secondary or a belt drive secondary. Preferably, the secondary 210 includes a chain coupling a driving sprocket 214 fixed to an output from the transmission 220 and a driven sprocket 216 fixed to the rear wheel 132.

The internal combustion engine 300 conveys rotation to the transmission 220 via a primary 230 and a clutch 240. The primary 230 may include a belt drive primary or a chain drive primary.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An internal combustion engine comprising: a crankcase; two banks of cylinders projecting from the crankcase in a V-configuration, the two banks of cylinders including: a first cylinder bank projecting from the crankcase to a first cylinder head; and a second cylinder bank projecting from the crankcase to a second cylinder head; a plurality of pushrods extending between the crankcase and the first and second cylinder heads, the plurality of pushrods including: a first intake valve pushrod and a first exhaust valve pushrod, the first intake and exhaust valve pushrods lying in a first pushrod plane; and a second intake valve pushrod and a second exhaust valve pushrod, the second intake and exhaust valve, pushrods lying in a second pushrod plane, and the second pushrod plane being parallel to the first pushrod plane; and a plurality of camshafts supported by the crankcase, the plurality of camshafts consisting of first, second and third camshafts.

2. The internal combustion engine according to claim 1, wherein the first and second cylinder heads comprise a plurality of valves, and the plurality of pushrods cause the plurality of valves to reciprocate in response to rotation of the first, second and third camshafts; the first camshaft rotating on a first camshaft axis, the second camshaft rotating on a second camshaft axis, and the third camshaft rotation on a third camshaft axis.

3. The internal combustion engine according to claim 2, wherein the plurality of valves include a plurality of intake valves and a plurality of exhaust valves, the plurality of pushrods reciprocate the plurality of intake valves in response to rotation of the first camshaft, and the plurality of pushrods reciprocate the plurality of exhaust valves in response to rotation of the second and third camshafts.

4. The internal combustion engine according to claim 3, wherein the plurality of intake valves comprises first and second intake valves, the first intake valve reciprocates with respect to the first cylinder head, and the second intake valve reciprocates with respect to the second cylinder head.

5. The internal combustion engine according to claim 3, wherein the plurality of exhaust valves comprises first and second exhaust valves, the first exhaust valve reciprocates with respect to the first cylinder head in response to the rotation of the second camshaft, and the second exhaust valve reciprocates with respect to the second cylinder head in response to the rotation of the third camshaft.

6. The internal combustion engine according to claim 2, further comprising: a plurality of rocker arms reciprocating the plurality of valves in response to reciprocation of the plurality of push rods.

7. The internal combustion engine according to claim 1, wherein an angle between the two banks of cylinders ranges from 50 degrees to 60 degrees.

8. The internal combustion engine according to claim 7, wherein the angle between the two banks of cylinders ranges from about 53 degrees to about 57 degrees.

9. The internal combustion engine according to claim 8, wherein the angle between the two banks of cylinders ranges from about 56 degrees to about 57 degrees.

10. The internal combustion engine according to claim 9, wherein the angle is 56.25 degrees.

11. The internal combustion engine according to claim 1, including a crankshaft in the crankcase and operably connected to pistons in the two banks of cylinders, and wherein the crankcase includes first and second portions, the first portion including a first crankshaft bearing in which a drive-side end of the crankshaft is adapted to rotate, and the second portion including: a second crankshaft bearing in which a cam-side end of the crankshaft is adapted to rotate; and a plurality of camshaft apertures consisting of: a first camshaft aperture through which the first camshaft is adapted to pass; a second camshaft aperture through which the second camshaft is adapted to pass; and a third camshaft aperture through which the third camshaft is adapted to pass.

12. The internal combustion engine according to claim 1, including a crankshaft rotating on a crankshaft axis in the crankcase, the crankshaft including a plurality of main bearing journals, a rod bearing journal, and a plurality of throws coupling the plurality of main bearing journals to the rod bearing journal; a plurality of pistons reciprocating in coordination with the crankshaft rotating; and a plurality of connecting rods pivotally coupling the plurality of pistons to the crankshaft, each of the plurality of connecting rods extending along a longitudinal axis between a piston end and a crankshaft end, and each of the plurality of connecting rods including: a body including a wrist pin aperture proximate to the piston end, the wrist pin aperture receiving a wrist pin pivotally coupling the body to a corresponding one of the plurality of pistons; a cap being secured to the body, the cap and the body mutually defining a crankshaft aperture proximate to the crankshaft end, the crankshaft aperture receiving the rod bearing journal; and a fastener securing the cap with respect to the body, the fastener extending along a fastener axis oriented obliquely with respect to the longitudinal axis.

13. The internal combustion engine according to claim 1, including a crankshaft, pistons in the two banks of cylinders, and connecting rods connecting the pistons to the crankshaft, the connecting rods including a body extending along a longitudinal axis between a piston end and a crankshaft end, the body including a wrist pin aperture through which a wrist pin is adapted to pass, the wrist pin aperture being proximate the piston end; a cap being secured to the body, the cap and the body mutually defining a crankshaft aperture in which a connecting rod bearing journal is adapted to pivot, the connecting rod bearing journal being proximate the crankshaft end; and a fastener securing the cap with respect to the body, the fastener extending along a fastener axis oriented obliquely with respect to the longitudinal axis.

14. The internal combustion engine according to claim 1, including a camshaft drive system, the camshaft drive system comprising: a crankshaft drive wheel rotating on a crankshaft axis; an intake camshaft driven wheel rotating on an intake camshaft axis; a first exhaust camshaft driven wheel rotating on a first exhaust axis parallel to the intake camshaft axis; a second exhaust camshaft driven wheel rotating on a second exhaust axis parallel to the intake camshaft axis; and a drive belt interconnecting the drive wheel and the driven wheels for mutual rotation.

15. A vehicle comprising: a chassis; and an internal combustion engine as defined in claim 1 and supported by the chassis, the internal combustion engine including: a crankcase and a device transforming power from the internal combustion engine to motivating power to accelerate the chassis.

16. An internal combustion engine comprising: a first number of cylinders arranged in a V-configuration; and a second number of camshafts coupled to the cylinders to control gas flow to and from the cylinders, wherein the second number of camshafts is numerically one greater than the first number of cylinders.

17. The internal combustion engine according to claim 16, wherein a ratio of cylinders to camshafts is 2:3.

18. The internal combustion engine according to claim 16, wherein the first number of cylinders consists of two cylinders, and the second number of camshafts consists of three camshafts.

19. The internal combustion engine according to claim 18, wherein the three camshafts consist of an intake camshaft, a first exhaust camshaft, and a second exhaust camshaft.

20. The internal combustion engine according to claim 16, further comprising a crankcase supporting the second number of camshafts for relative rotation.

21. The internal combustion engine according to claim 20, wherein the first number of cylinders consist of first and second cylinders projecting from the crankcase in a V-configuration and defining an acute angle between the first and second cylinders.

22. The internal combustion engine according to claim 21, wherein the acute angle between the first and second cylinders ranges from 50 degrees to 60 degrees.

23. The internal combustion engine according to claim 22, wherein the acute angle between the first and second cylinders ranges from about 53 degrees to about 57 degrees.

24. An internal combustion engine comprising: a crankshaft rotating on a crankshaft axis; a crankcase supporting the crankshaft for relative rotation on the crankshaft axis; a plurality of cylinders extending from the crankcase, each of the plurality of cylinders including a central longitudinal cylinder axis extending radially with respect to the crankshaft axis, a first set of the cylinder axes together with the crankshaft axis defines a first cylinder bank plane, a second set of the cylinder axes together with the crankshaft axis defines a second cylinder bank plane, and the first and second bank planes extend in a V-configuration defining 1) an acute included sector between the two cylinder bank planes, and 2) an excluded sector; a plurality of camshafts consisting of: a first camshaft rotating on a first camshaft axis parallel to the crankshaft axis, the first camshaft being disposed in the crankcase within the acute included sector between the two cylinder blank planes; a second camshaft rotating on a second camshaft axis parallel to the crankshaft axis, the second camshaft being disposed in the crankcase within the excluded sector; and a third camshaft rotating on a third camshaft axis parallel to the crankshaft axis, the third camshaft being disposed in the crankcase within the excluded sector.

25. The internal combustion engine according to claim 24, wherein the second and third camshaft axes are disposed on opposite sides of the acute included sector.

26. The internal combustion engine according to claim 24, wherein the plurality of cylinders comprise first and second cylinders, the first cylinder extending along a first cylinder axis between a first case end and a first head end, and the second cylinder extending along a second cylinder axis between a second case end and a second head end.

27. An internal combustion engine comprising: first and second cylinders in a V-configuration; a plurality of camshafts consisting of: an intake camshaft rotating on an intake camshaft axis, the intake camshaft including first and second intake cam lobes; a first exhaust camshaft rotating on a first exhaust axis parallel to the intake camshaft axis, the first exhaust camshaft including a first exhaust cam lobe; and a second exhaust camshaft rotating on a second exhaust axis parallel to the intake camshaft axis, the second exhaust camshaft including a second exhaust cam lobe; and a plurality of valves including: a first intake valve letting in an intake charge to the first cylinder, the first intake valve being reciprocated along a first intake valve axis in response to rotation of the first intake cam lobe; a first exhaust valve letting out combustion products from the first cylinder, the first exhaust valve being reciprocated along a first exhaust valve axis in response to rotation of the first exhaust cam lobe, and the first intake and exhaust valve axes being parallel and defining a first valve plane; a second intake valve letting in an intake charge to the second cylinder, the second intake valve being reciprocated along a second intake valve axis in response to rotation of the second intake cam lobe; and a second exhaust valve letting out combustion products from the second cylinder, the second exhaust valve being reciprocated along a second exhaust valve axis in response to rotation of the second exhaust cam lobe, the second intake and exhaust valve axes being parallel and defining a second valve plane.

28. The internal combustion engine according to claim 27, wherein the second valve plane is parallel to the first valve plane.

29. The internal combustion engine according to claim 28, wherein offset spacing along the axes of the camshafts between the first and second valve planes is equal to offset spacing along the axes of the camshafts between the first and second cylinders.

30. The internal combustion engine according to claim 29, further comprising: a plurality of followers consisting of: a first intake follower riding on the first intake cam lobe; a second intake follower riding on the second intake cam lobe; a first exhaust follower riding on the first exhaust cam lobe; and a second exhaust follower riding on the second exhaust cam lobe; a plurality of rocker arms consisting of: a first intake rocker arm actuating the first intake valve, the first intake rocker arm pivoting about a first intake rocker arm axis; a second intake rocker arm actuating the second intake valve, the second intake rocker arm pivoting about a second intake rocker arm axis; a first exhaust rocker arm actuating the first exhaust valve, the first exhaust rocker arm pivoting about a first exhaust rocker arm axis; and a second exhaust rocker arm actuating the second exhaust valve, the second exhaust rocker arm pivoting about a second exhaust rocker arm axis; and a plurality of push rods consisting of: a first intake push rod extending between the first intake follower and the first intake rocker arm; a second intake push rod extending between the second intake follower and the second intake rocker arm; a first exhaust push rod extending between the first exhaust follower and the first exhaust rocker arm; and a second exhaust push rod extending between the second exhaust follower and the second exhaust rocker arm.

* * * * *